(12) United States Patent
Urakabe et al.

(10) Patent No.: US 8,040,702 B2
(45) Date of Patent: Oct. 18, 2011

(54) DC/DC POWER CONVERTING APPARATUS

(75) Inventors: Takahiro Urakabe, Tokyo (JP);
Matahiko Ikeda, Tokyo (JP); Akihiko Iwata, Tokyo (JP); Kiyoharu Anzai, Tokyo (JP); Hirotoshi Maekawa, Tokyo (JP); Toshiyuki Kikunaga, Tokyo (JP); Masaru Kobayashi, Tokyo (JP); Tatsuya Okuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 388 days.

(21) Appl. No.: 12/439,829

(22) PCT Filed: May 31, 2007

(86) PCT No.: PCT/JP2007/000588
§ 371 (c)(1),
(2), (4) Date: Mar. 4, 2009

(87) PCT Pub. No.: WO2008/032425
PCT Pub. Date: Mar. 20, 2008

(65) Prior Publication Data
US 2009/0261793 A1    Oct. 22, 2009

(30) Foreign Application Priority Data

Sep. 15, 2006    (JP) ................................. 2006-250443

(51) Int. Cl.
*H02M 7/00* (2006.01)
*H02M 5/45* (2006.01)

(52) U.S. Cl. .............................. 363/65; 363/132; 363/17

(58) Field of Classification Search .................... 363/17, 363/37, 65–72, 97, 98, 127, 132
See application file for complete search history.

(56) References Cited

U.S. PATENT DOCUMENTS
5,532,718 A *    7/1996    Ishimaru ...................... 345/211
(Continued)

FOREIGN PATENT DOCUMENTS
| JP | 63 190551 | 8/1988 |
| JP | 5 49259 | 2/1993 |
| JP | 7 298608 | 11/1995 |

(Continued)

OTHER PUBLICATIONS

Sano, K. et al., "A New Control Method of a Resonant Switched-Capacitor Converter and the Application for Balancing of the Split DC Voltages in a Multilevel Inverter", The Transactions of the Institute of Electrical Engineers of Japan D, vol. 127, No. 3, pp. 16 and 330-338 (2007) (with English abstract and partial English Translation).

Deriha, F. et al., "Control Method of Resonant Switched Capacitor Converter", IEICE Technical Report, EE2005-26, pp. 7-12 (2006) (with English abstract).

Shoyama, M. et al., "Operation Analysis of Boost Resonant Switched Capacitor Converter", IEICE Communication Society Conference, p. 228 (2004) (with partial English translation).

(Continued)

*Primary Examiner* — Jessica Han
(74) *Attorney, Agent, or Firm* — Oblon, Spivak, McClelland, Maier & Neustadt, L.L.P.

(57) ABSTRACT

Three or more circuits, in which series-connected low-voltage and high-voltage side switches including MOSFETs including parasitic diodes are connected across positive and negative terminals of each of smoothing capacitors, are connected in series. One of elementary series circuits, each including a capacitor and an inductor, is disposed between any adjacent two of the circuits with the elementary series circuits set to have the same period of resonance. The MOSFETs of rectifier circuits are brought into an ON state simultaneously with the MOSFETs of a driving inverter circuit and brought into an OFF state earlier than the MOSFETs of the driving inverter circuit by a period of time not exceeding a time period equal to (period of resonance)/2. A resonance phenomenon of the capacitor and the inductor is used and conduction loss in the rectifier circuits is reduced in DC/DC power conversion performed through charging and discharging operation of the capacitor.

12 Claims, 27 Drawing Sheets

U.S. PATENT DOCUMENTS

| | | | |
|---|---|---|---|
| 6,353,547 B1 * | 3/2002 | Jang et al. | 363/132 |
| 7,403,400 B2 * | 7/2008 | Stanley | 363/16 |
| 7,729,144 B2 * | 6/2010 | Urakabe et al. | 363/71 |
| 2005/0099827 A1 | 5/2005 | Sase et al. | |
| 2005/0174098 A1 | 8/2005 | Watanabe et al. | |
| 2008/0252145 A1 | 10/2008 | Urakabe et al. | |
| 2008/0253156 A1 | 10/2008 | Urakabe et al. | |

FOREIGN PATENT DOCUMENTS

| | | |
|---|---|---|
| JP | 9 191638 | 7/1997 |
| JP | 2005 51977 | 2/2005 |
| JP | 2005 151608 | 6/2005 |
| JP | 2005 224060 | 8/2005 |
| JP | 2006 262619 | 9/2006 |

* cited by examiner

US 8,040,702 B2

DC/DC POWER CONVERTING APPARATUS

TECHNICAL FIELD

The present invention relates to a DC/DC power converting apparatus for converting a DC voltage into a raised or lowered DC voltage.

BACKGROUND ART

A DC/DC converter known as a conventional DC/DC power converting apparatus is configured with an inverter circuit provided with two or more semiconductor switches including a semiconductor switch connected to a positive potential and a semiconductor switch connected to a negative potential, and a voltage-multiplier rectifier circuit provided with a plurality of series-connected rectifiers and a plurality of series-connected capacitors, wherein the inverter circuit produces an AC voltage and, further, the voltage-multiplier rectifier circuit produces a high DC voltage which is supplied to a load (refer to Patent Document 1, for example).

A switched capacitor converter which is another example of a conventional DC/DC power converting apparatus is configured with an inverter circuit and a voltage-doubler rectifier circuit, wherein a capacitor is connected in series with an inductor. The switched capacitor converter increases charging/discharging currents to and from the capacitor by using an LC resonance phenomenon to realize power conversion in which a reduction in efficiency is insignificant even when a large amount of electric power is transferred (refer to Non-patent Document 1, for example).

Patent Document 1: Japanese Patent Application Publication No. 1996-191638

Non-patent Document 1: "Control Characteristics of Resonant Switched Capacitor Converter," Deriha, Fumitoshi, et al., Shingaku-Giho, IEICE Technical Report, EE2005-62, pp 7-12, 2006.

DISCLOSURE OF THE INVENTION

Problems to be Solved by the Invention

The aforementioned conventional DC/DC power converting apparatuses are provided with an inverter circuit and a rectifier circuit to perform DC/DC power conversion by using charging and discharging operation of capacitors. If inductors are series-connected to the capacitors and the LC resonance phenomenon is used, it is possible to transfer a large amount of electric power at high efficiency. However, conduction loss would occur in diodes used in the rectifier circuit, thus hindering an improvement of efficiency.

The present invention has been made to overcome the aforementioned problem. Accordingly, it is an object of the invention to provide a DC/DC power converting apparatus including an inverter circuit and a rectifier circuit, the DC/DC power converting apparatus being configured to use charging and discharging operation of capacitors as well as a resonance phenomenon of the capacitors and inductors connected in series in order to reduce conduction loss of the rectifier circuit and improve conversion efficiency.

Means for Solving the Problems

A DC/DC power converting apparatus according to the present invention has a plurality of circuits, each including a plurality of semiconductor switching devices whose ON/OFF operation is controlled by means of control electrodes and a smoothing capacitor. The plurality of circuits are interconnected with one of elementary series circuits, each including a capacitor and an inductor, disposed between any adjacent two of the circuits. Using at least a particular one of the plurality of circuits as a driving inverter circuit and any other one of the plurality of circuits as rectifier circuit, DC/DC conversion is performed through charging and discharging operation of the capacitor of each of the elementary series circuits.

ADVANTAGEOUS EFFECTS OF THE INVENTION

The DC/DC power converting apparatus of the present invention utilizes a resonance phenomenon of a capacitor and an inductor connected in series, and uses circuits, each including a plurality of semiconductor switching devices whose ON/OFF operation is controlled by means of control electrodes and a smoothing capacitor, as rectifier circuits. This arrangement makes it possible to reduce conduction loss of the rectifier circuit and convert a large amount of electric power at high efficiency.

BEST MODES FOR CARRYING OUT THE INVENTION

First Embodiment

Figure 1:
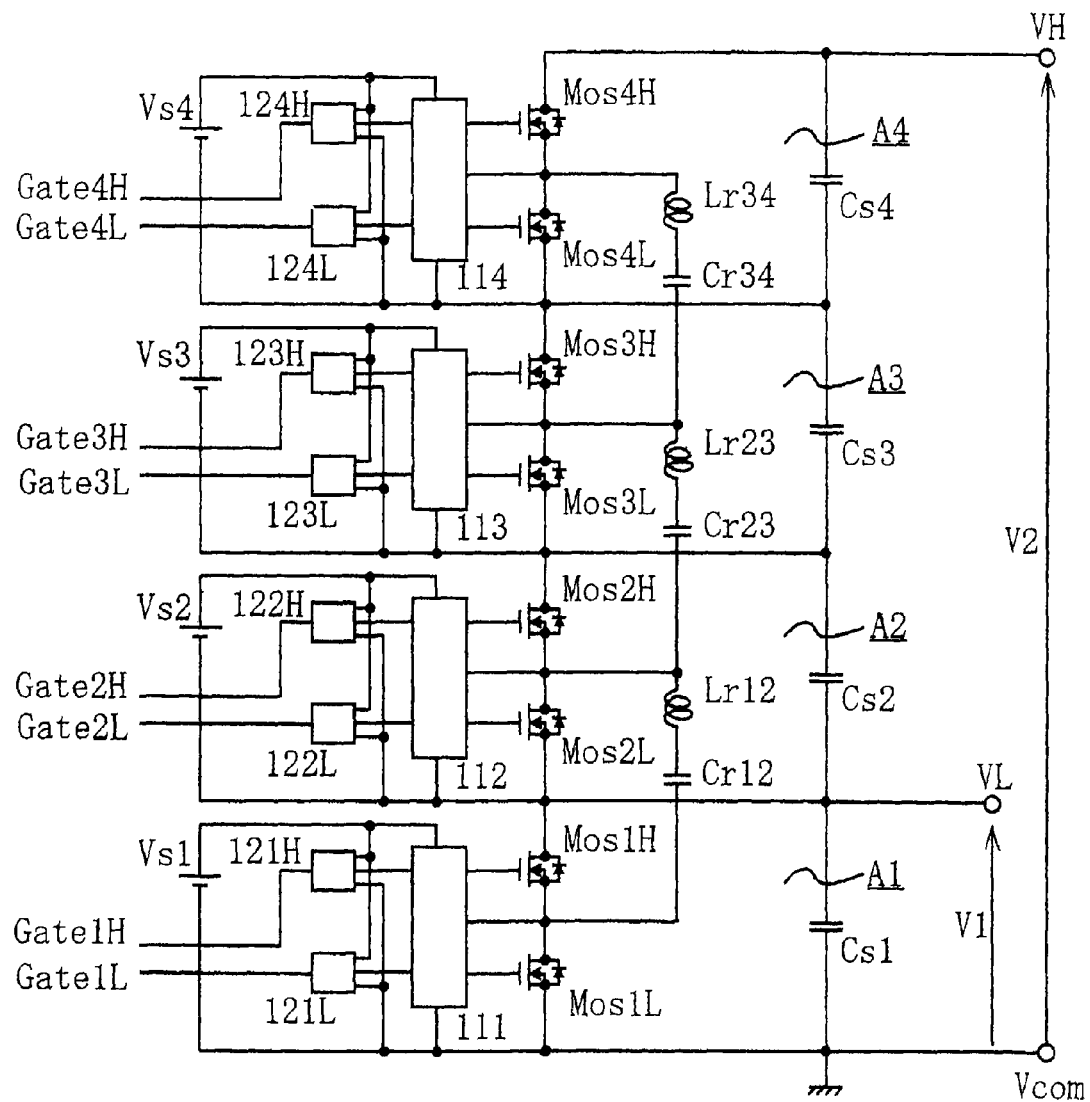
FIG. 1 is a diagram showing the circuit configuration of a principal portion of a DC/DC power converting apparatus according to a first embodiment of the present invention.
Figure 2:
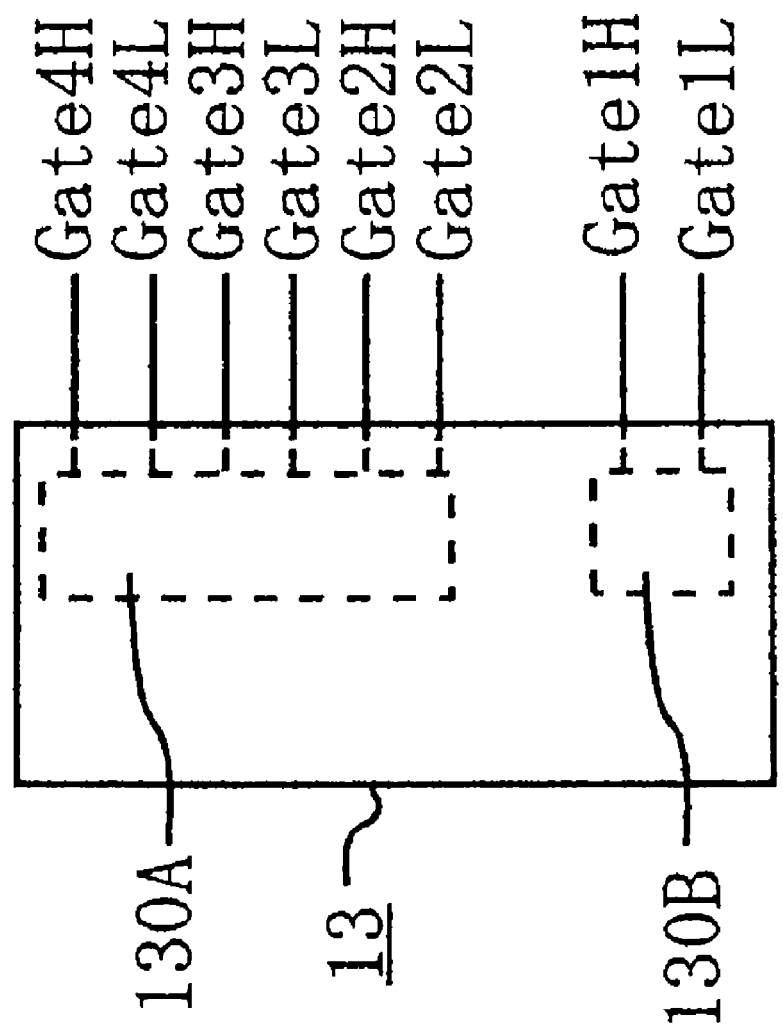
FIG. 2 is a diagram showing the circuit configuration of a gate signal generator of the DC/DC power converting apparatus according to the first embodiment of the present invention.

A DC/DC power converting apparatus according to a first embodiment of the present invention is described hereinbelow with reference to the drawings. FIGS. 1 and 2 show the circuit configuration of the DC/DC power converting apparatus according to the first embodiment of the present invention. Particularly, FIG. 1 shows a principal portion of the apparatus and FIG. 2 shows a gate signal generator.

As shown in FIG. 1, the DC/DC power converting apparatus has a function to convert a voltage V1 input from across voltage terminals VL and Vcom to a voltage V2, which is approximately four times as high as the voltage V1, and output the voltage V2 thus raised from across voltage terminals VH and Vcom.

Main circuitry of the DC/DC power converting apparatus is configured with circuits A1, A2, A3, A4 which are connected in series, together including smoothing capacitors Cs1, Cs2, Cs3, Cs4 for smoothing the input/output voltages V1, V2, serving also as voltage sources for energy transfer, and a plurality of MOSFETs.

The MOSFETs are configured to form pairs of MOSFETs (Mos1L, Mos1H), (Mos2L, Mos2H), (Mos3L, Mos3H), (Mos4L, Mos4H), wherein each pair of MOSFETs, one serving as a low-voltage side switch and the other as a high-voltage side switch which are connected in series, is connected across opposite terminals of one of the smoothing capacitors Cs1, Cs2, Cs3, Cs4. A connecting point of the two MOSFETs of each of the circuits A1, A2, A3, A4 is used as an intermediate terminal. Each of LC series circuits which function as energy transfer devices configured with elementary series circuits, each including one of capacitors Cr12, Cr23, Cr34 and one of inductors Lr12, Lr23, Lr34, is connected between the intermediate terminals of adjacent two of the individual circuits A1, A2, A3, A4.

Each of the MOSFETs is a power MOSFET in which a parasitic diode is formed between a source and a drain.

Electrical connections in the main circuitry are now described in detail. The two terminals of the smoothing capacitor Cs1 are connected to the voltage terminals VL and Vcom with the latter voltage terminal Vcom being grounded. The VL-side voltage terminal of the smoothing capacitor Cs1 is connected to one terminal of the smoothing capacitor Cs2, the other terminal of the smoothing capacitor Cs2 is connected to one terminal of the smoothing capacitor Cs3, the other terminal of the smoothing capacitor Cs3 is connected to one terminal of the smoothing capacitor Cs4, and the other terminal of the smoothing capacitor Cs4 is connected to the voltage terminal VH.

A source terminal of Mos1L is connected to the voltage terminal Vcom, a drain terminal of Mos1L is connected to a source terminal of Mos1H, and a drain terminal of Mos1H is connected to the voltage terminal VL. A source terminal of Mos2L is connected to the low-voltage side terminal of the smoothing capacitor Cs2, a drain terminal of Mos2L is connected to a source terminal of Mos2H, and a drain terminal of Mos2H is connected to the high-voltage side terminal of the smoothing capacitor Cs2. A source terminal of Mos3L is connected to the low-voltage side terminal of the smoothing capacitor Cs3, a drain terminal of Mos3L is connected to a source terminal of Mos3H, and a drain terminal of Mos3H is connected to the high-voltage side terminal of the smoothing capacitor Cs3. A source terminal of Mos4L is connected to the low-voltage side terminal of the smoothing capacitor Cs4, a drain terminal of Mos4L is connected to a source terminal of Mos4H, and a drain terminal of Mos4H is connected to the high-voltage side terminal of the smoothing capacitor Cs4.

One end of the LC series circuit including the inductor Lr12 and the capacitor Cr12 is connected to the connecting point of Mos1L and Mos1H, and the other end of the LC series circuit is connected to the connecting point of Mos2L and Mos2H. One end of the LC series circuit including the inductor Lr23 and the capacitor Cr23 is connected to the connecting point of Mos2L and Mos2H, and the other end of the LC series circuit is connected to the connecting point of Mos3L and Mos3H. One end of the LC series circuit including the inductor Lr34 and the capacitor Cr34 is connected to the connecting point of Mos3L and Mos3H, and the other end of the LC series circuit is connected to the connecting point of Mos4L and Mos4H. Values of periods of resonance determined by inductance values and capacitance values of the inductors Lr and the capacitors Cr of the individual stages are made equal to one another.

Gate terminals of Mos1L and Mos1H are connected to output terminals of a gate driving circuit 111, and gate driving signals referenced to the voltage of the source terminal of Mos1L are input into input terminals of the gate driving circuit 111. The gate driving circuit is an ordinary bootstrap-type driving circuit configured with a driver IC for driving a half-bridge inverter circuit, a capacitor for driving the high-voltage side MOSFETs, and so on. Gate terminals of Mos2L and Mos2H are connected to output terminals of a gate driving circuit 112, and gate driving signals referenced to the voltage of the source terminal of Mos2L are input into input terminals of the gate driving circuit 112. Gate terminals of Mos3L and Mos3H are connected to output terminals of a gate driving circuit 113, and gate driving signals referenced to the voltage of the source terminal of Mos3L are input into input terminals of the gate driving circuit 113. Gate terminals of Mos4L and Mos4H are connected to output terminals of a gate driving circuit 114, and gate driving signals referenced to the voltage of the source terminal of Mos4L are input into input terminals of the gate driving circuit 114.

The gate driving signal for driving Mos1L is output from a photocoupler 121L and the gate driving signal for driving Mos1H is output from a photocoupler 121H. Gate signals Gate1L, Gate1H are input into the photocouplers 121L, 121H, respectively. The photocoupler is a device having a function to electrically isolate a control circuit side signal and a gate driving side signal and optically transmit the signal while converting a reference voltage of the signal. The gate driving signal for driving Mos2L is output from a photocoupler 122L and the gate driving signal for driving Mos2H is output from a photocoupler 122H. Gate signals Gate2L, Gate2H are input into the photocouplers 122L, 122H, respectively. The gate driving signal for driving Mos3L is output from a photocoupler 123L and the gate driving signal for driving Mos3H is output from a photocoupler 123H. Gate signals Gate3L, Gate3H are input into the photocouplers 123L, 123H, respectively. The gate driving signal for driving Mos4L is output from a photocoupler 124L and the gate driving signal for driving Mos4H is output from a photocoupler 124H. Gate signals Gate4L, Gate4H are input into the photocouplers 124L, 124H, respectively.

Power supplies Vs1, Vs2, Vs3, Vs4 are power supplies referenced respectively to the source terminals of Mos1L, Mos2L, Mos3L, Mos4L for driving the MOSFETs, the gate driving circuits and the photocouplers.

The circuit A1 is used as a driving inverter circuit for transferring energy input from across the voltage terminals VL and Vcom to a high-voltage side through ON/OFF operation of the MOSFETs (Mos1L, Mos1H). Also, the circuits A2, A3, A4 are used as rectifier circuits for rectifying a current driven by the driving inverter circuit A1 and transferring the energy to the high-voltage side.

As shown in FIG. 2, the gate signals Gate1L, Gate1H, Gate2L, Gate2H, Gate3L, Gate3H, Gate4L, Gate4H are generated by a control circuit 13 which constitutes the gate signal generator. The control circuit 13 has a driving gate signal generating portion 130B for generating the driving gate signals Gate1L, Gate1H for driving the driving inverter circuit A1 and a rectification gate signal generating portion 130A for generating the rectification gate signals Gate2L, Gate2H, Gate3L, Gate3H, Gate4L, Gate4H for driving the rectifier circuits A2, A3, A4. In this case, a signal processing circuit like a microcomputer generates the driving gate signals and the rectification gate signals.

Next, the working is described.

The capacitance values of the smoothing capacitors Cs1, Cs2, Cs3, Cs4 are set at sufficiently large values as compared to the capacitance values of the capacitors Cr12, Cr23, Cr34 of the LC series circuits.

As the voltage V1 input from across the voltage terminals VL and Vcom is raised to the voltage V2 which is approximately four times as high as the voltage V1 and the voltage V2 thus raised is output from across the voltage terminals VH and Vcom as mentioned earlier, a load is connected between the voltage terminals VH and Vcom and, thus, the voltage V2 has a smaller value than 4×V1. Under steady-state conditions, the smoothing capacitor Cs1 is charged to a voltage equal to the voltage V1 and each of the smoothing capacitors Cs2, Cs3, Cs4 is charged to a voltage equal to (V2-V1)/3 on average.

Figure 3:
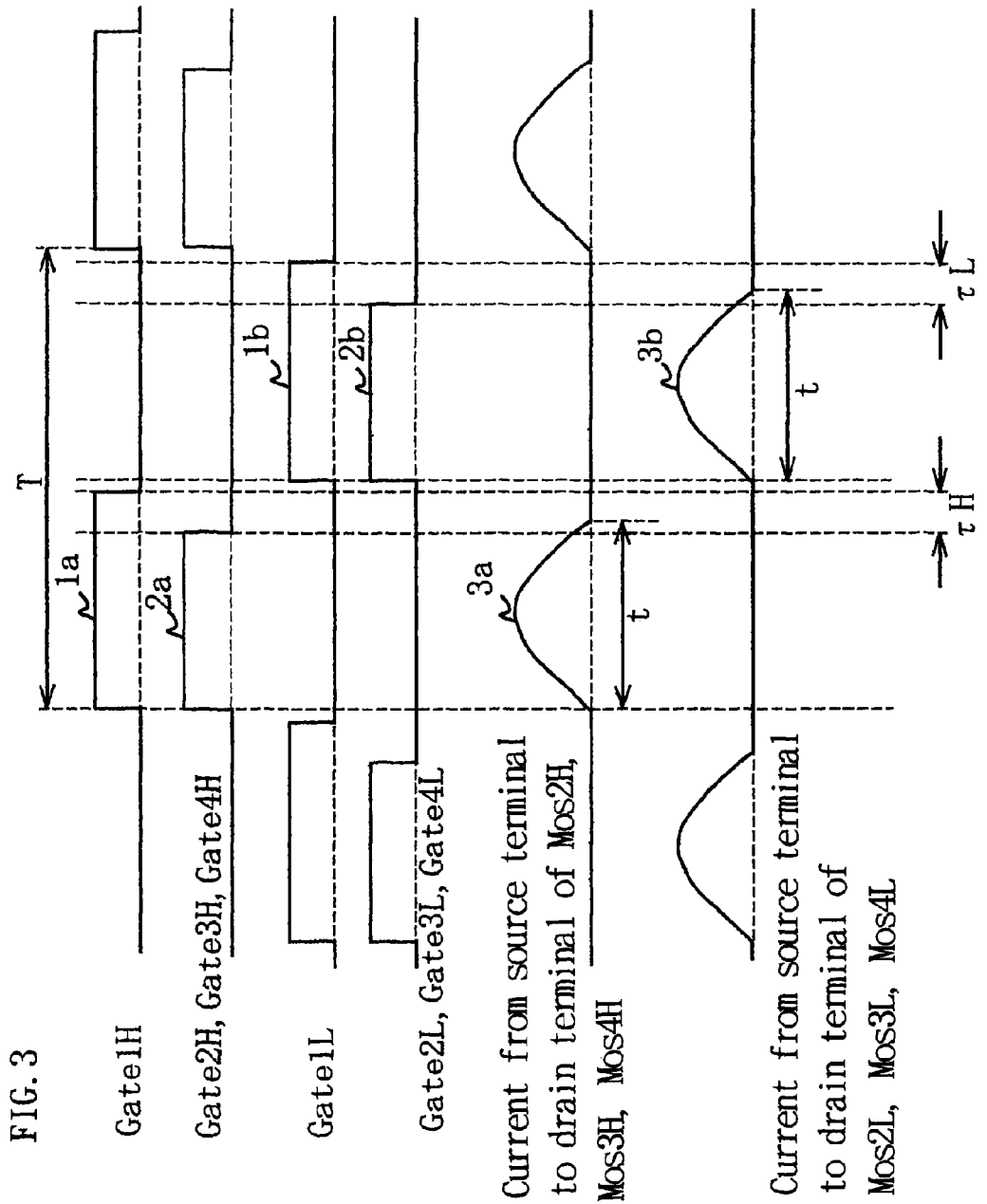
FIG. 3 is a diagram showing gate signals and current waveforms at individual points according to the first embodiment of the present invention.

FIG. 3 shows the driving gate signals Gate1L, Gate1H, the rectification gate signals Gate2L, Gate2H, Gate3L, Gate3H, Gate4L, Gate4H, and currents flowing from the sources to the drains of Mos2L, Mos2H, Mos3L, Mos3H, Mos4L, Mos4H in the respective rectifier circuits A2, A3, A4. Each of the MOSFETs turns on when the gate signal is at a high voltage.

As shown in FIG. 3, the driving gate signals Gate1H, Gate1L are ON/OFF signals having a period T which is slightly longer than the period of resonance determined by the LC series circuit of Lr and Cr and a duty cycle of about 50%. In the Figure, t indicates a period of time equal to one-half the period of resonance and 1a and 1b indicate pulses (hereinafter referred to as driving pulses) of the respective driving gate signals Gate1H, Gate1L.

The rectification gate signals Gate2H, Gate3H, Gate4H fed into the high-voltage side MOSFETs of the rectifier circuits A2, A3, A4 and the rectification gate signals Gate2L, Gate3L, Gate4L fed into the low-voltage side MOSFETs are ON/OFF signals containing pulses (hereinafter referred to as rectification pulses 2a, 2b) which are generated within the time period t from rise timings of the driving pulses 1a, 1b of the driving gate signals Gate1H, Gate1L, respectively. Here, rise timings of the rectification pulses 2a, 2b are set to coincide with the rise timings of the driving pulses 1a, 1b and fall timings of the rectification pulses 2a, 2b are set to precede fall timings of the driving pulses 1a, 1b by specific time periods τH, τL, respectively.

When Mos1L, Mos2L, Mos3L, Mos4L which are the low-voltage side MOSFETs of the individual circuits A1-A4 are brought into an ON state by the driving pulse 1b and the rectification pulse 2b of the gate signals fed into the low-voltage side MOSFETs, part of energy stored in the smoothing capacitors Cs1, Cs2, Cs3 is transferred to the capacitors Cr12, Cr23, Cr34 through paths shown below, respectively, due to the presence of voltage differences. In Mos2L, Mos3L, Mos4L, currents flow from the sources to the drains through the parasitic diodes of the respective MOSFETs even when the rectification pulse 2b is in an OFF state. Specifically, in each of the MOSFETs Mos2L, Mos3L, Mos4L, a current 3b flows during the time period t which is equal to one-half the period of resonance of the LC series circuit and, then, the current is interrupted by a reverse current preventing function of the parasitic diode.

Cs1⇒Mos2L⇒Lr12⇒Cr12⇒Mos1L
Cs1⇒Cs2⇒Mos3L⇒Lr23⇒Cr23⇒Lr12⇒Cr12⇒Mos1L
Cs1⇒Cs2⇒Cs3⇒Mos4L⇒Lr34⇒Cr34⇒Lr23⇒Cr23⇒Lr12⇒
Cr12⇒Mos1L

Subsequently, when Mos1H, Mos2H, Mos3H, Mos4H which are the high-voltage side MOSFETs of the individual circuits A1-A4 are brought into an ON state by the driving pulse 1a and the rectification pulse 2a of the gate signals fed into the high-voltage side MOSFETs, the energy charged into the capacitors Cr12, Cr23, Cr34 is transferred to the smoothing capacitors Cs2, Cs3, Cs4 through paths shown below, respectively, due to the presence of voltage differences. In Mos2H, Mos3H, Mos4H, currents flow from the sources to the drains through the parasitic diodes of the respective MOSFETs even when the rectification pulse 2a is in an OFF state. Specifically, in each of the MOSFETs Mos2H, Mos3H, Mos4H, a current 3a flows during the time period t which is equal to one-half the period of resonance of the LC series circuit and, then, the current is interrupted by the reverse current preventing function of the parasitic diode.

Mos1H⇒Cr12⇒Lr12⇒Mos2H⇒Cs2
Mos1H⇒Cr12⇒Lr12⇒Cr23⇒Lr23⇒Mos3H⇒Cs3⇒Cs2
Mos1H⇒Cr12⇒Lr12⇒Cr23⇒Lr23⇒Cr34⇒Lr34⇒
Mos4H⇒Cs4⇒Cs3⇒Cs2

The energy is transferred from the smoothing capacitor Cs1 to the smoothing capacitors Cs2, Cs3, Cs4 as a result of charging and discharging operation of the capacitors Cr12, Cr23, Cr34 as discussed above. The voltage V1 input from across the voltage terminals VL and Vcom is raised to the voltage V2 which is approximately four times as high as the voltage V1 and the voltage V2 thus raised is output from across the voltage terminals VH and Vcom. Also, the inductors Lr12, Lr23, Lr34 are series-connected to the capacitors Cr12, Cr23, Cr34, respectively, to configure the LC series circuits. This configuration utilizes a resonance phenomenon for transferring the energy, making it possible to efficiently transfer a large amount of energy.

The present embodiment employs the MOSFETs in the rectifier circuits A2-A4 so that it is possible to reduce conduction loss and improve power conversion efficiency as compared to levels achieved with a conventional arrangement using diodes.

Also, the MOSFETs of the rectifier circuits A2-A4 are brought into the ON state simultaneously with the MOSFETs of the driving inverter circuit A1 and brought into the OFF state earlier than the MOSFETs of the driving inverter circuit A1 by a period of time not exceeding the time period t. It would be possible to minimize the conduction loss if the ON period of the MOSFETs of the rectifier circuits A2-A4 is matched to the conduction period t of the MOSFETs. However, the MOSFETs of the rectifier circuits A2-A4 conduct through the parasitic diodes if the ON state of the MOSFETs is terminated earlier as discussed above, so that it is possible to transfer the energy during this conduction period as well. It is also possible to avoid problems caused by a delay in control, for instance, and improve reliability.

Additionally, since the rectification pulses 2a, 2b are generated within the time period t from the rise timings of the driving pulses 1a, 1b, respectively, currents are interrupted after flowing during the time period t which is equal to one-half the period of resonance of the LC series circuits and, thus, the currents do not flow in a reverse direction. Therefore, it is possible to effectively use the resonance phenomenon of the LC series circuits. Moreover, as the conduction loss can be reduced by use of the MOSFETs, it is possible to realize a DC/DC power converting apparatus having a high conversion efficiency.

Furthermore, since the control circuit 13 has the driving gate signal generating portion 130B and the rectification gate signal generating portion 130A to separately generate the driving gate signals Gate1L, Gate1H and the rectification gate signals Gate2L, Gate2H, Gate3L, Gate3H, Gate4L, Gate4H, it is possible to easily control the MOSFETs of the rectifier circuits A2-A4 separately from the MOSFETs of the driving inverter circuit A1 and realize the above-described desirable operation as well as a DC/DC power converting apparatus having a high conversion efficiency in a reliable fashion.

Figure 4:
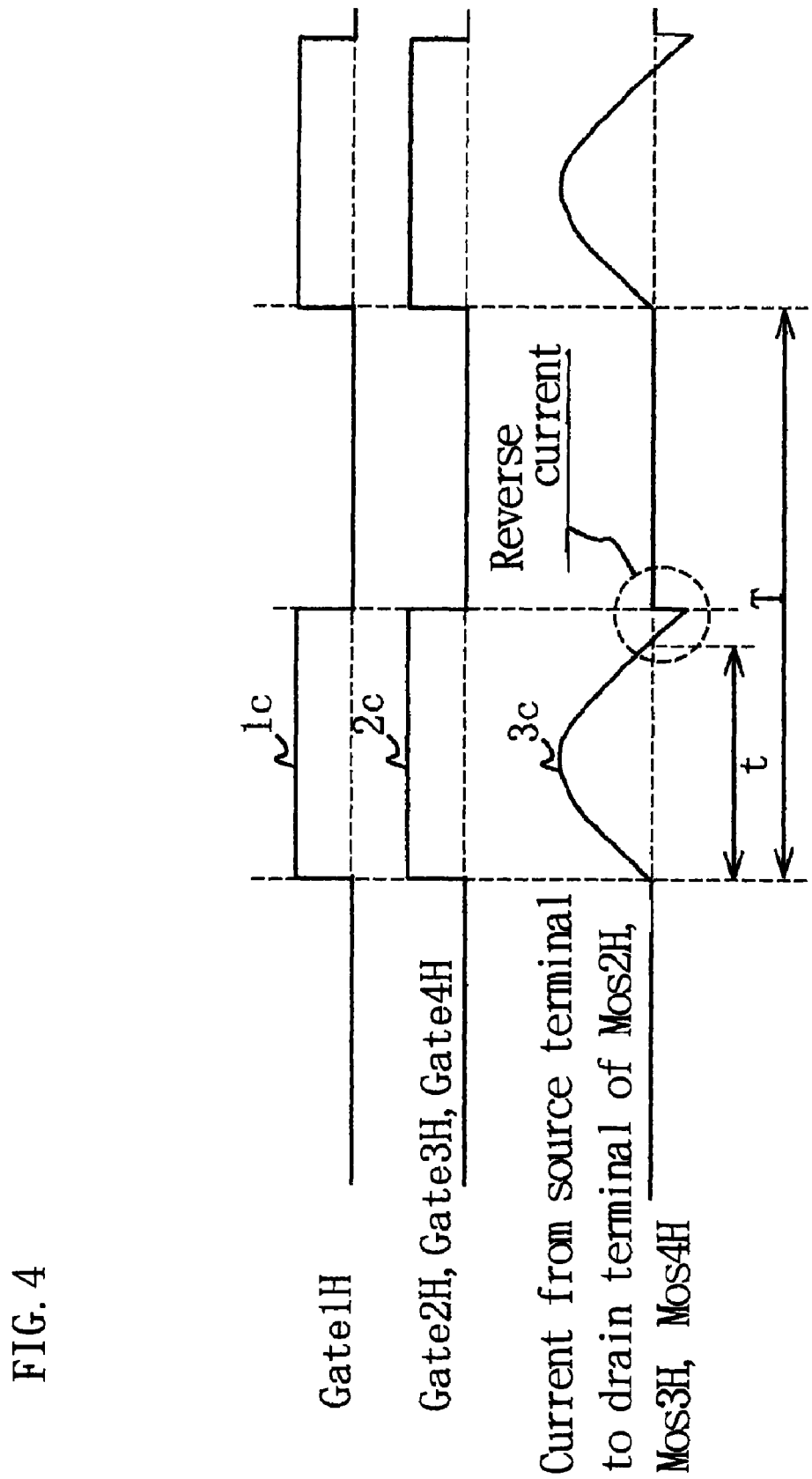
FIG. 4 is a diagram showing gate signals and a current waveform at individual points in a comparative example of the first embodiment of the present invention.

Shown in FIG. 4 is a comparative example of the present embodiment, in which the driving gate signals Gate1L, Gate1H and the rectification gate signals Gate2L, Gate2H, Gate3L, Gate3H, Gate4L, Gate4H are made all the same, all of the gate signals being ON/OFF signals having a period T which is slightly longer than a period of resonance 2t determined by the LC series circuits and a duty cycle of about 50%. In the Figure, 1c indicates one of driving pulses of the driving gate signal Gate1H and 2c indicates one of rectification pulses of the rectification gate signals Gate2H, Gate3H, Gate4H. Due to these gate signals, a current 3c flows from the source to the drain in each of the MOSFETs (Mos2H, Mos3H, Mos4H) of the rectifier circuits A2-A4.

In this case, the MOSFETs of the rectifier circuits A2-A4 go into the ON state simultaneously with the MOSFETs of the driving inverter circuit A1 and remain in the ON state even after a lapse of the time period t which is equal to one-half the period of resonance, so that reverse currents would occur. The occurrence of the reverse currents could result in not only a reduction in the amount of transferred energy but also an increase in loss and deterioration of power conversion efficiency as it becomes necessary to flow large amounts of currents to obtain a desired level of electric power.

Second Embodiment

While the boost-type DC/DC power converting apparatus which raises the voltage V1 to the voltage V2 which is approximately four times as high as the voltage V1 has been described in the foregoing first embodiment, the following discussion of the present embodiment illustrates a buck-type DC/DC power converting apparatus which lowers the voltage V2 down to the voltage V1.

While a principal portion of the circuit configuration of the DC/DC power converting apparatus according to the present embodiment is the same as the circuit configuration shown in FIG. 1, the circuit A4 is used as a driving inverter circuit and the circuits A1, A2, A3 are used as rectifier circuits in this embodiment. Also, a control circuit 13a which is a gate signal generator differing from that of the foregoing first embodiment is shown in FIG. 5.

Figure 5:
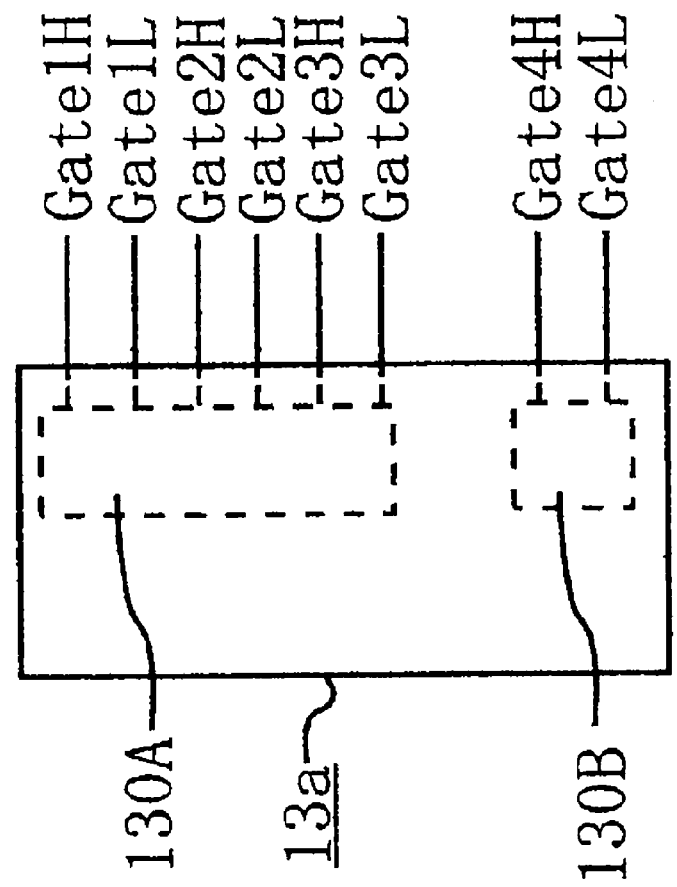
FIG. 5 is a diagram showing the circuit configuration of a gate signal generator of a DC/DC power converting apparatus according to a second embodiment of the present invention.

As shown in FIG. 5, the gate signals Gate1L, Gate1H, Gate2L, Gate2H, Gate3L, Gate3H, Gate4L, Gate4H are generated by the control circuit 13a. The control circuit 13a has a driving gate signal generating portion 130B for generating the driving gate signals Gate4L, Gate4H for driving the driving inverter circuit A4 and a rectification gate signal generating portion 130A for generating the rectification gate signals Gate1L, Gate1H, Gate2L, Gate2H, Gate3L, Gate3H for driving the rectifier circuits A1, A2, A3. A signal processing circuit like a microcomputer is used to generate the driving gate signals and the rectification gate signals in this embodiment as well.

While the circuit A1 among the rectifier circuits A1-A3 is used substantially for rectification, the circuits A2, A3 might be regarded as driving circuits because the circuits A2, A3 control the amount of transferred energy of the capacitors Cr12, Cr23 through ON/OFF operation of the MOSFETs (Mos2L, Mos2H, Mos3L, Mos3H). If, however, the gate signals Gate2L, Gate2H, Gate3L, Gate3H for driving the circuits A2, A3 are made identical to the driving gate signals Gate4L, Gate4H for driving the driving inverter circuit A4 and the MOSFETs are held in the ON state even after a lapse of the time period t which is equal to one-half the period of resonance determined by Lr and Cr during voltage-lowering operation, reverse currents would occur in the LC series circuits, resulting in a reduction in the amount of transferred energy.

Thus, in this embodiment, the rectification gate signal generating portion 130A generates the gate signals Gate2L, Gate2H, Gate3L, Gate3H as the rectification gate signals in the same way as the gate signals Gate1L, Gate1H and the circuits A2, A3 are referred to also as the rectifier circuits.

Next, the working is described.

The capacitance values of the smoothing capacitors Cs1, Cs2, Cs3, Cs4 are set at sufficiently large values as compared to the capacitance values of the capacitors Cr12, Cr23, Cr34 of the LC series circuits.

As the voltage V2 input from across the voltage terminals VH and Vcom is lowered to the voltage V1 which is approximately ¼ times the voltage V2 and the voltage V1 thus lowered is output from across the voltage terminals VL and Vcom, a load is connected between the voltage terminals VL and Vcom and, thus, the voltage V2 has a larger value than 4×V1.

Figure 6:
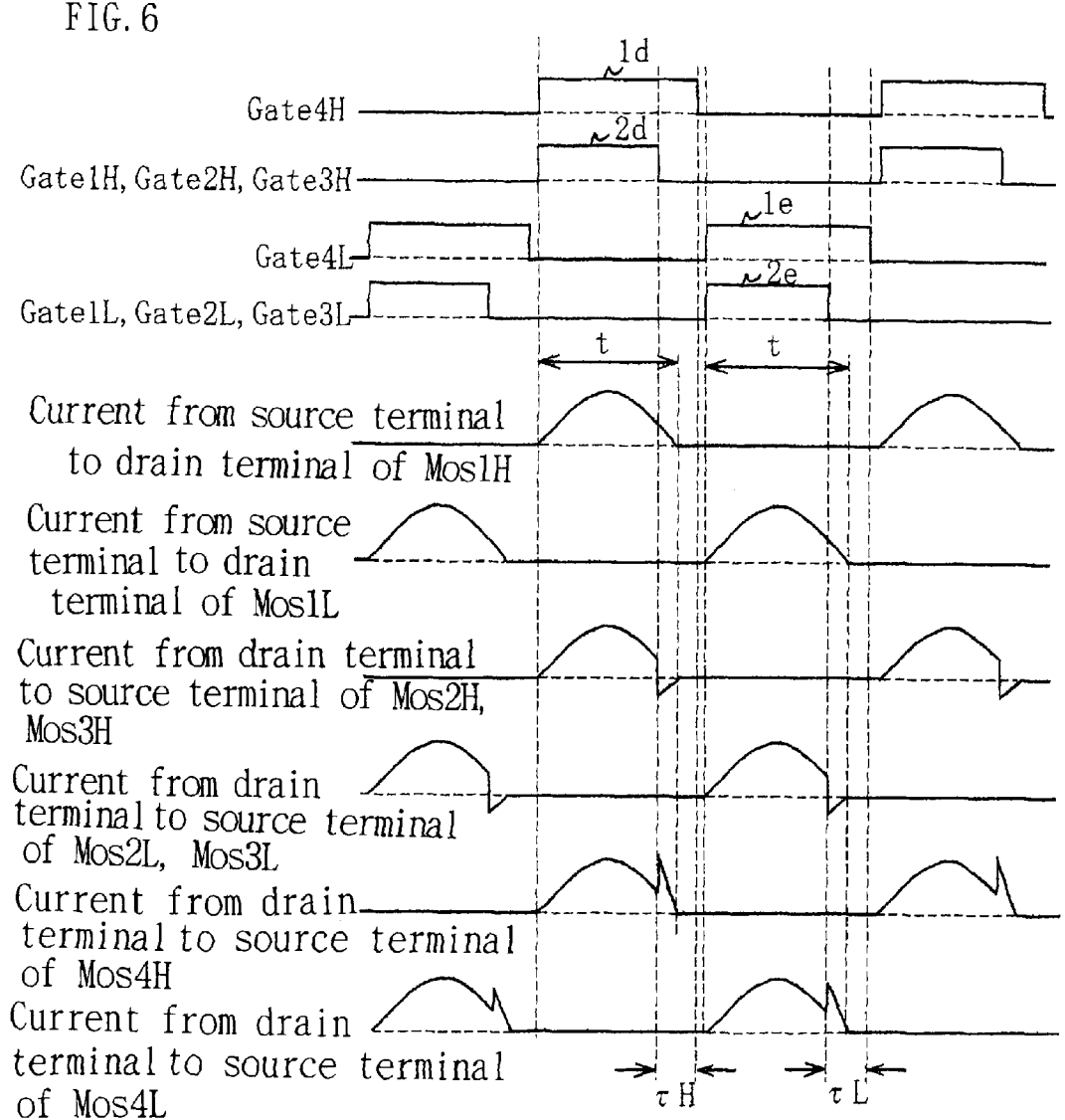
FIG. 6 is a diagram showing gate signals and current waveforms at individual points according to the second embodiment of the present invention.

FIG. 6 shows the driving gate signals Gate4L, Gate4H, the rectification gate signals Gate1L, Gate1H, Gate2L, Gate2H, Gate3L, Gate3H, currents flowing from the sources to the drains of Mos1L, Mos1H, currents flowing from the drains to the sources of Mos2L, Mos2H, Mos3L, Mos3H, and currents flowing from the drains to the sources of Mos4L, Mos4H. Each of the MOSFETs turns on when the gate signal is at the high voltage.

As shown in FIG. 6, the driving gate signals Gate4H, Gate4L are ON/OFF signals having a period T which is slightly longer than the period of resonance 2t determined by the LC series circuit of Lr and Cr and a duty cycle of about 50%. In the Figure, 1d and 1e indicate pulses (hereinafter referred to as driving pulses) of the respective driving gate signals Gate4H, Gate4L.

The rectification gate signals Gate1H, Gate2H, Gate3H fed into the high-voltage side MOSFETs of the rectifier circuits A1, A2, A3 and the rectification gate signals Gate1L, Gate2L, Gate3L fed into the low-voltage side MOSFETs are ON/OFF signals containing pulses (hereinafter referred to as rectification pulses 2d, 2e) which are generated within the time period t from rise timings of the driving pulses 1d, 1e of the driving gate signals Gate4H, Gate4L, respectively. Here, rise timings of the rectification pulses 2d, 2e are set to coincide with the rise timings of the driving pulses 1d, 1e and fall timings of the rectification pulses 2d, 2e are set to precede fall timings of the driving pulses 1d, 1e by the specific time periods τH, τL, respectively.

When Mos4H, Mos1H, Mos2H, Mos3H which are the high-voltage side MOSFETs of the individual circuits A4, A1-A3 are brought into the ON state by the driving pulse 1d and the rectification pulse 2d of the gate signals fed into the high-voltage side MOSFETs, part of energy stored in the smoothing capacitors Cs2, Cs3, Cs4 is transferred to the capacitors Cr12, Cr23, Cr34 through paths shown below, respectively, due to the presence of voltage differences.

Cs2⇒Cs3⇒Cs4⇒Mos4H⇒Lr34⇒Cr34⇒Lr23⇒Cr23⇒Lr12⇒
Cr12⇒Mos1H
Cs2⇒Cs3⇒Mos3H⇒Lr23⇒Cr23⇒Lr12⇒Cr12⇒Mos1H
Cs2⇒Mos2H⇒Lr12⇒Cr12⇒Mos1H

When Mos1H, Mos2H, Mos3H of the rectifier circuits A1-A3 turn off, currents flow from the sources to the drains of Mos1H, Mos2H, Mos3H through the parasitic diodes of the respective MOSFETs. While the energy transfer paths vary as shown below in this case, the energy of Cs2, Cs3, Cs4 continues to be transferred to Cr12, Cr23, Cr34, respectively. Then, after the currents have flowed during the time period t which is equal to one-half the period of resonance of the LC series circuit, the currents are interrupted.

Cs2⇒Cs3⇒Cs4⇒Mos4H⇒Lr34⇒Cr34⇒Lr23⇒Cr23⇒Lr12⇒
Cr12⇒Mos1H
Cs3⇒Cs4⇒Mos4H⇒Lr34⇒Cr34⇒Lr23⇒Cr23⇒Mos2H
Cs4⇒Mos4H⇒Lr34⇒Cr34⇒Mos3H

Subsequently, when Mos4L, Mos1L, Mos2L, Mos3L which are the low-voltage side MOSFETs of the individual circuits A4, A1-A3 are brought into the ON state by the driving pulse 1e and the rectification pulse 2e of the gate signals fed into the low-voltage side MOSFETs, the energy charged into the capacitors Cr12, Cr23, Cr34 is transferred to the smoothing capacitors Cs1, Cs2, Cs3 through paths shown below, respectively, due to the presence of voltage differences.

Cr12⇒Lr12⇒Cr23⇒Lr23⇒Cr34⇒Lr34⇒Mos4L⇒
Cs3⇒Cs2 ⇒Cs1⇒Mos1L
Cr12⇒Lr12⇒Cr23⇒Lr23⇒Mos3L⇒Cs2⇒Cs1⇒Mos1L
Cr12⇒Lr12⇒Mos2L⇒Cs1⇒Mos1L

When Mos1L, Mos2L, Mos3L of the rectifier circuits A1-A3 turn off, currents flow from the sources to the drains of Mos1L, Mos2L, Mos3L through the parasitic diodes of the respective MOSFETs. While the energy transfer paths vary as shown below in this case, the energy of Cr12, Cr23, Cr34 continues to be transferred to Cs1, Cs2, Cs3, respectively. Then, after the currents have flowed during the time period t which is equal to one-half the period of resonance of the LC series circuit, the currents are interrupted.

Cr12⇒Lr12⇒Cr23⇒Lr23⇒Cr34⇒Lr34⇒Mos4L⇒
Cs3⇒Cs2 ⇒Cs1⇒Mos1L
Cr23⇒Lr23⇒Cr34⇒Lr34⇒Mos4L⇒Cs3⇒Cs2⇒Mos2L
Cr34⇒Lr34⇒Mos4L⇒Cs3⇒Mos3L

The energy is transferred from the smoothing capacitors Cs2, Cs3, Cs4 to the smoothing capacitor Cs1 as a result of charging and discharging operation of the capacitors Cr12, Cr23, Cr34 as discussed above. The voltage V2 input from across the voltage terminals VH and Vcom is lowered to the voltage V1 which is approximately ¼ times the voltage V2 and the voltage V1 thus lowered is output from across the voltage terminals VL and Vcom. Also, the inductors Lr12, Lr23, Lr34 are series-connected to the capacitors Cr12, Cr23, Cr34, respectively, to configure the LC series circuits. This configuration utilizes the resonance phenomenon for transferring the energy, making it possible to efficiently transfer a large amount of energy.

The present embodiment employs the MOSFETs in the rectifier circuits A1-A3 so that it is possible to reduce conduction loss and improve power conversion efficiency as compared to the conventionally achieved levels.

Also, the MOSFETs of the rectifier circuits A1-A3 are brought into the ON state simultaneously with the MOSFETs of the driving inverter circuit A4 and brought into the OFF state earlier than the MOSFETs of the driving inverter circuit A4 by a period of time not exceeding the time period t. It would be possible to minimize the conduction loss if the ON period of the MOSFETs of the rectifier circuits A1-A3 is matched to the conduction period t of the MOSFETs. However, the MOSFETs of the rectifier circuits A1-A3 conduct through the parasitic diodes if the ON state of the MOSFETs is terminated earlier as discussed above, so that it is possible to transfer the energy during this conduction period as well. It is also possible to avoid problems caused by a delay in control, for instance, and improve reliability.

Additionally, since the rectification pulses 2d, 2e are generated within the time period t from the rise timings of the driving pulses 1d, 1e, respectively, currents are interrupted after flowing during the time period t which is equal to one-half the period of resonance of the LC series circuits and, thus, the currents do not flow in the reverse direction. Therefore, it is possible to effectively use the resonance phenomenon of the LC series circuits. Moreover, as the conduction loss can be reduced by use of the MOSFETs, it is possible to realize a DC/DC power converting apparatus having a high conversion efficiency.

Furthermore, since the control circuit 13a has the driving gate signal generating portion 130B and the rectification gate signal generating portion 130A to separately generate the driving gate signals Gate4L, Gate4H and the rectification gate signals Gate1L, Gate1H, Gate2L, Gate2H, Gate3L, Gate3H, it is possible to easily control the MOSFETs of the rectifier circuits A1-A3 separately from the MOSFETs of the driving inverter circuit A4 and realize the above-described desirable operation as well as a DC/DC power converting apparatus having a high conversion efficiency in a reliable fashion.

Third Embodiment

While the boost-type DC/DC power converting apparatus for raising V1 to V2 has been described in the foregoing first embodiment and the buck-type DC/DC power converting apparatus for lowering V2 to V1 has been described in the foregoing second embodiment, the following discussion of the present embodiment illustrates a buck-boost DC/DC power converting apparatus having the functions of both the aforementioned first and second embodiments to realize bi-directional energy transfer.

A principal portion of the circuit configuration of the DC/DC power converting apparatus according to the present embodiment is the same as that of the first and second embodiments shown in FIG. 1. In this embodiment, the circuit A1 is used as a driving inverter circuit and the circuits A2, A3, A4 are used as rectifier circuits in voltage-boosting mode, while the circuit A4 is used as a driving inverter circuit and the circuits A1, A2, A3 are used as rectifier circuits in voltage-lowering mode. Also, a control circuit 13b which is a gate signal generator differing from those of the foregoing first and second embodiments is shown in FIG. 7.

Figure 7:
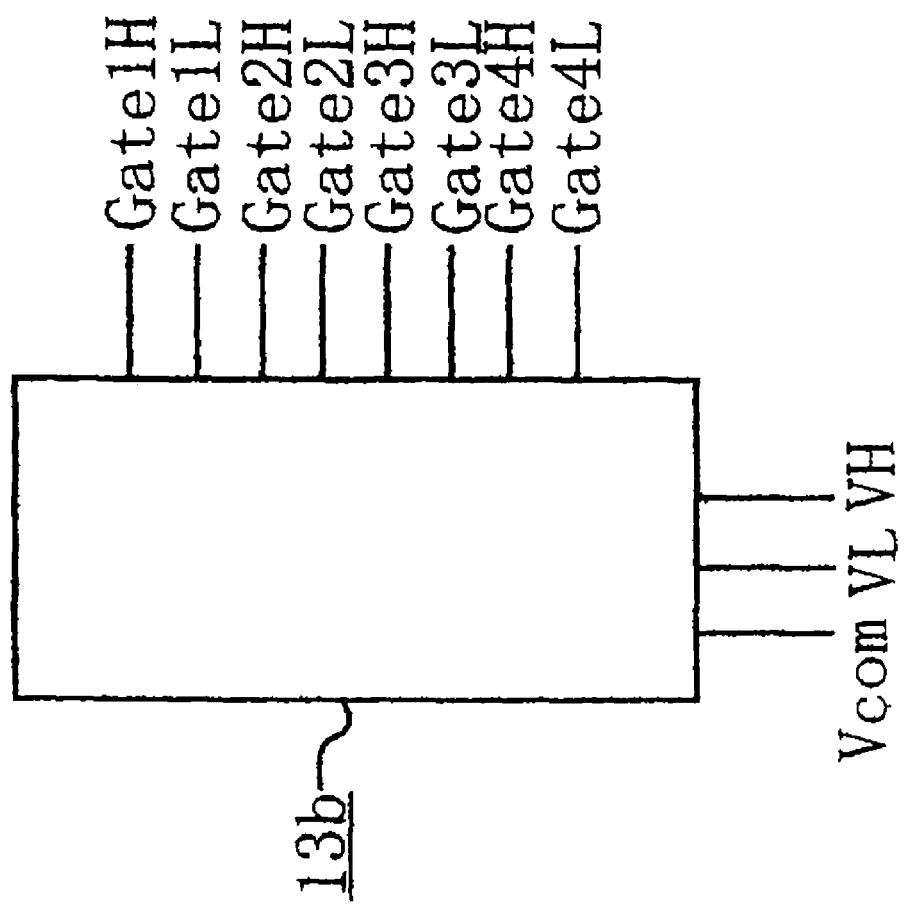
FIG. 7 is a diagram showing the circuit configuration of a gate signal generator of a DC/DC power converting apparatus according to a third embodiment of the present invention.

As shown in FIG. 7, voltages of the voltage terminals Vcom, VL, VH are input into the control circuit 13b, and the control circuit 13b generates and outputs the gate signals Gate1L, Gate1H, Gate2L, Gate2H, Gate3L, Gate3H, Gate4L, Gate4H. The control circuit 13b calculates V1 and V2 (V1: VL-Vcom, V2: VH-Vcom) from the individual terminal voltages that are input. Then, if V1×4>V2, the control circuit 13b recognizes that the voltage-boosting mode is currently selected and outputs gate signals in the same way as described in the foregoing first embodiment. If V1×4<V2, on the other hand, the control circuit 13b recognizes that the voltage-lowering mode is currently selected and outputs the gate signals in the same way as described in the foregoing second embodiment.

The buck-boost DC/DC power converting apparatus thus controlled makes it possible to obtain the same advantageous effects as discussed in the aforementioned first and second embodiments and realize bi-directional energy transfer with a single circuit, so that the apparatus is widely applicable.

Fourth Embodiment

Figure 8:
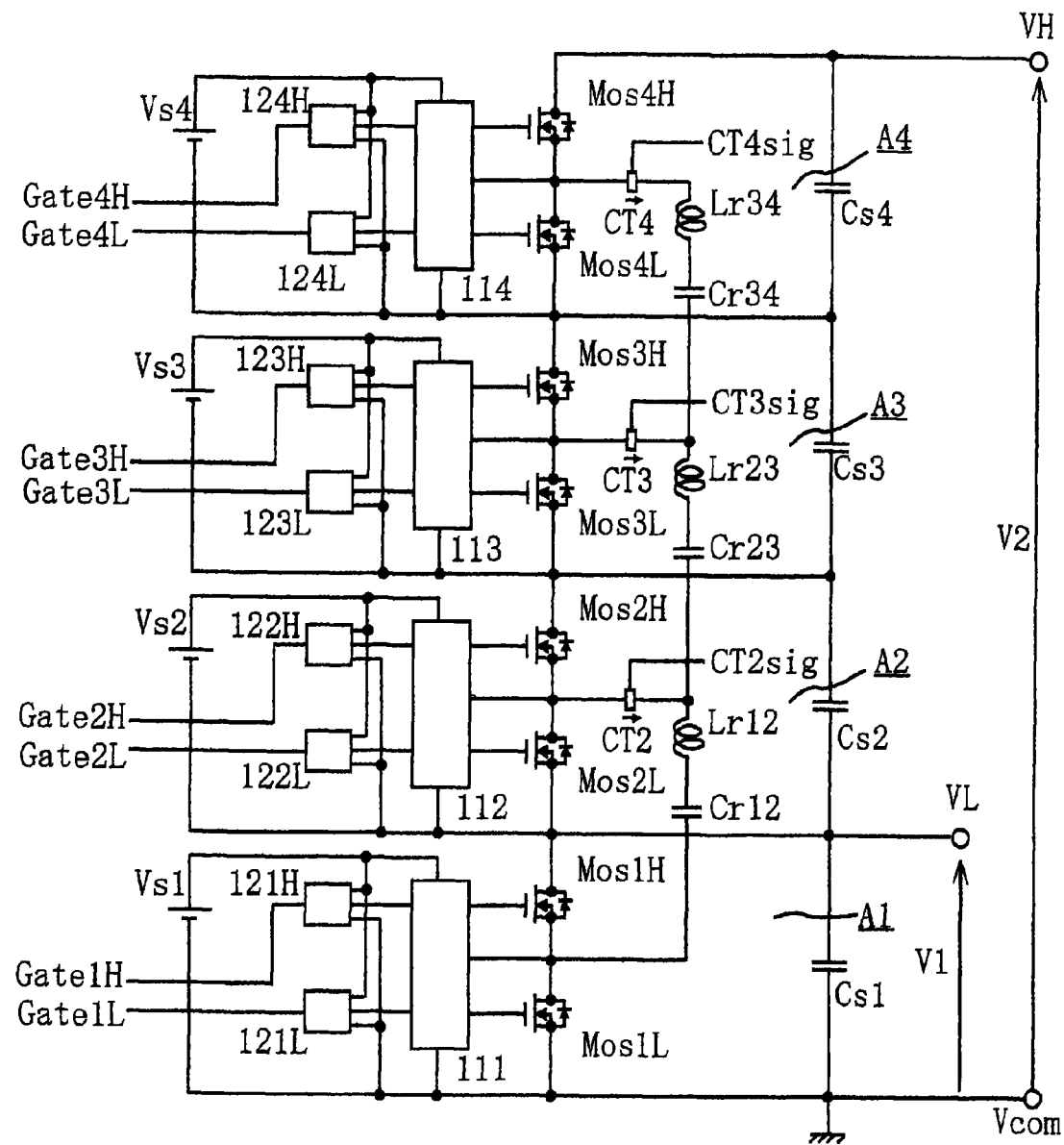
FIG. 8 is a diagram showing the circuit configuration of a principal portion of a DC/DC power converting apparatus according to a fourth embodiment of the present invention.
Figure 9:
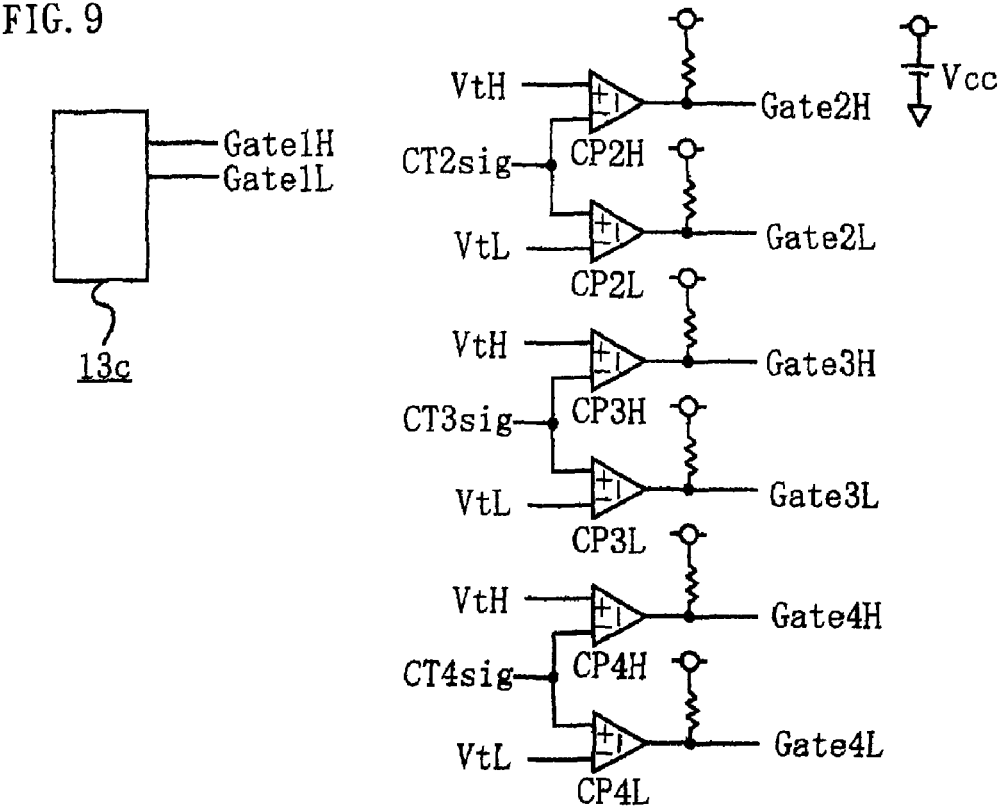
FIG. 9 is a diagram showing the circuit configuration of a gate signal generator of the DC/DC power converting apparatus according to the fourth embodiment of the present invention.

Next, a boost-type DC/DC power converting apparatus according to a fourth embodiment of the present invention is described with reference to the drawings. FIGS. 8 and 9 show the circuit configuration of the DC/DC power converting apparatus according to the fourth embodiment of the present invention. Particularly, FIG. 8 shows a principal portion of the apparatus and FIG. 9 shows a gate signal generator.

As shown in FIG. 8, the DC/DC power converting apparatus converts a voltage V1 input from across voltage terminals VL and Vcom to a voltage V2, which is approximately four times as high as the voltage V1, and outputs the voltage V2 from across voltage terminals VH and Vcom in the same way as in the aforementioned first embodiment. This DC/DC power converting apparatus is provided with current sensors CT2, CT3, CT4 serving as current sensing means in addition to the circuit configuration shown in FIG. 1.

The current sensor CT2 is disposed on a line between the connecting point of Mos2L and Mos2H and the LC series circuit of Lr12 and Cr12 to detect a current flowing from the connecting point of Mos2L and Mos2H. The current sensor CT3 is disposed on a line between the connecting point of Mos3L and Mos3H and the LC series circuit of Lr23 and Cr23 to detect a current flowing from the connecting point of Mos3L and Mos3H. The current sensor CT4 is disposed on a line between the connecting point of Mos4L and Mos4H and the LC series circuit of Lr34 and Cr34 to detect a current flowing from the connecting point of Mos4L and Mos4H.

In this embodiment, the circuit A1 is also used as a driving inverter circuit for transferring energy input from across the voltage terminals VL and Vcom to the high-voltage side through ON/OFF operation of the MOSFETs (Mos1L, Mos1H) as in the aforementioned first embodiment. Also, the circuits A2, A3, A4 are used as rectifier circuits for rectifying a current driven by the driving inverter circuit A1 and transferring the energy to the high-voltage side.

As shown in FIG. 9, the driving gate signals Gate1L, Gate1H for driving the driving inverter circuit A1 are generated by a control circuit 13c in the gate signal generator. Also, the rectification gate signal Gate2L is generated by a comparator CP2L based on an output signal CT2sig of the current sensor CT2 and a threshold voltage VtL input into the comparator CP2L, and the rectification gate signal Gate2H is generated by a comparator CP2H based on CT2sig and a threshold voltage VtH input into the comparator CP2H. The rectification gate signal Gate3L is generated by a comparator CP3L based on an output signal CT3sig of the current sensor CT3 and the threshold voltage VtL input into the comparator CP3L, and the rectification gate signal Gate3H is generated by a comparator CP3H based on CT3sig and the threshold voltage VtH input into the comparator CP3H. The rectification gate signal Gate4L is generated by a comparator CP4L based on an output signal CT4sig of the current sensor CT4 and the threshold voltage VtL input into the comparator CP4L, and the rectification gate signal Gate4H is generated by a comparator CP4H based on CT4sig and the threshold voltage VtH input into the comparator CP4H. It is to be noted that the output signals CT2sig, CT3sig, CT4sig of the respective current sensors CT2, CT3, CT4 are voltage signals referenced to a zero-ampere voltage Vref, and Vcc is a control power supply voltage.

Figure 10:
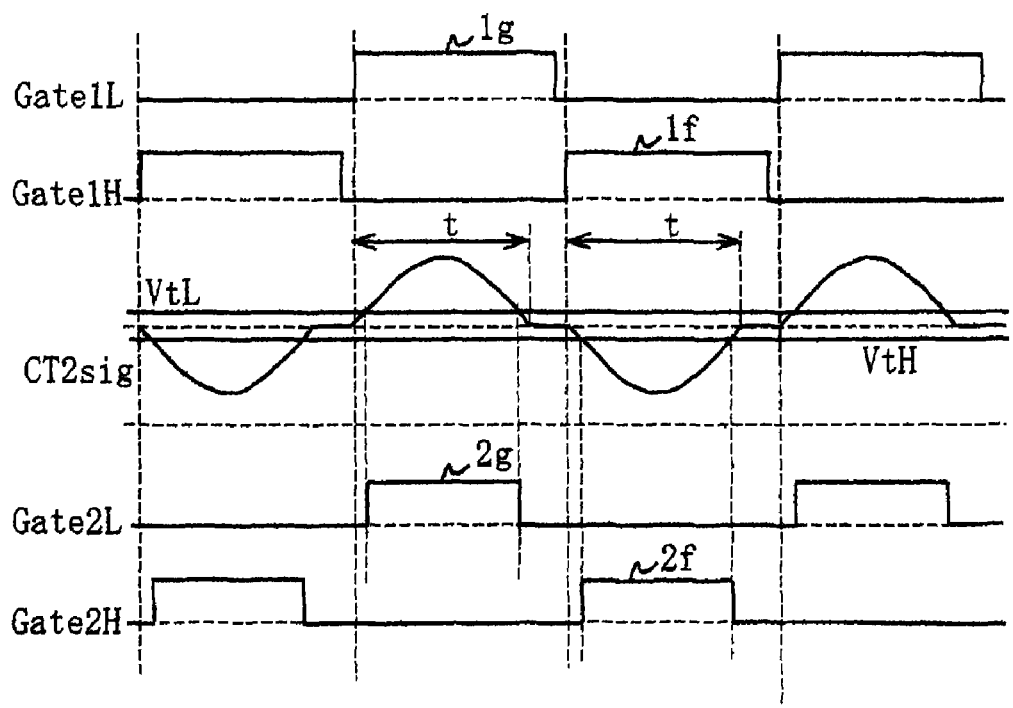
FIG. 10 is a diagram showing gate signals and current waveforms at individual points according to the fourth embodiment of the present invention.

FIG. 10 shows voltage waveforms of the driving gate signals Gate1L, Gate1H, the rectification gate signals Gate2L, Gate2H for driving the rectifier circuit A2, the output signal CT2sig of the current sensor CT2 and the threshold voltages VtL, VtH. Since the voltage waveforms observed in the rectifier circuits A3, A4 are the same as observed in the rectifier circuit A2, figural representation and description of these voltage waveforms of the rectifier circuits A3, A4 are not provided herein. It is to be noted that the threshold voltages VtL, VtH are set at such voltage levels which permit the current sensor CT2 to detect a current flowing in either a positive or negative direction.

As shown in FIG. 10, the driving gate signals Gate1L, Gate1H are ON/OFF signals having a period T which is slightly longer than the period of resonance 2*t* determined by the LC series circuit of Lr and Cr and a duty cycle of about 50%. In the Figure, 1*g* and 1*f* indicate pulses (hereinafter referred to as driving pulses) of the respective driving gate signals Gate1L, Gate1H. The rectification gate signals Gate2L, Gate2H are generated based on a comparison of the output signal CT2*sig* of the current sensor CT2 with the threshold voltages VtL, VtH, respectively. Specifically, when the current from the connecting point of Mos2L and Mos2H flows in the positive direction, the control circuit 13*c* generates a rectification pulse 2*g* to turn on Mos2L, and when the current flows in the negative direction, the control circuit 13*c* generates a rectification pulse 2*f* to turn on Mos2H. As a result, Mos2L, Mos2H turn on during periods when the parasitic diodes of the respective MOSFETs conduct.

Due to the aforementioned gate signals Gate1L, Gate1H, Gate2L, Gate2H, Gate3L, Gate3H, Gate4L, Gate4H, currents flow through the same current paths as shown in the aforementioned first embodiment and the energy is transferred from the smoothing capacitor Cs1 to the smoothing capacitors Cs2, Cs3, Cs4 as a result of charging and discharging operation of the capacitors Cr12, Cr23, Cr34. The voltage V1 input from across the voltage terminals VL and Vcom is raised to the voltage V2 which is approximately four times as high as the voltage V1 and the voltage V2 thus raised is output from across the voltage terminals VH and Vcom.

In this embodiment, there are provided the current sensors CT2, CT3, CT4 for detecting output currents from the connecting points of the high-voltage side MOSFETs and the low-voltage side MOSFETs of the rectifier circuits A2-A4, and the rectification gate signals Gate2L, Gate2H, Gate3L, Gate3H, Gate4L, Gate4H are generated according to the detected currents, respectively. It is therefore possible to cause the MOSFETs of the rectifier circuits A2-A4 to turn on during the periods when the parasitic diodes of the respective MOSFETs conduct. For this reason, it is possible to generate the rectification pulses 2*f*, 2*g* within the time period t which is equal to one-half the period of resonance of the LC series circuits from rise timings of the respective driving pulses 1*g*, 1*f* in a reliable fashion. The currents are interrupted after flowing during the time period t so that the currents do not flow in the reverse direction. Therefore, it is possible to effectively use the resonance phenomenon of the LC series circuits. Moreover, as the conduction loss can be reduced by use of the MOSFETs in the rectifier circuits A2-A4, it is possible to realize a DC/DC power converting apparatus having a high conversion efficiency.

It is possible to generally match the rectification pulses 2*f*, 2*g* to the conduction period t of the MOSFETs and minimize the conduction loss by properly setting the threshold voltages VtL, VtH.

The driving gate signals Gate1L, Gate1H are generated by the control circuit 13*c* serving as driving gate signal generating means, while the rectification gate signals Gate2L, Gate2H, Gate3L, Gate3H, Gate4L, Gate4H are generated by the comparators CP2L, CP2H, CP3L, CP3H, CP4L, CP4H serving as rectification gate signal generating means according to the currents detected by the current sensors CT2, CT3, CT4. Since the driving gate signals Gate1L, Gate1H and the rectification gate signals Gate2L, Gate2H, Gate3L, Gate3H, Gate4L, Gate4H are separately generated in this fashion, it is possible to easily control the MOSFETs of the rectifier circuits A2-A4 separately from the MOSFETs of the driving inverter circuit A1 and realize the above-described desirable operation as well as a DC/DC power converting apparatus having a high conversion efficiency in a reliable fashion.

Fifth Embodiment

A fifth embodiment described below deals with a buck-type DC/DC power converting apparatus for lowering a voltage V2 down to a voltage V1 which is approximately ¼ times the voltage V2 as discussed in the aforementioned second embodiment. A principal portion of the circuit configuration of the DC/DC power converting apparatus according to the present embodiment is shown in FIG. 11, and a gate signal generator of the same is shown in FIG. 12.

Figure 11:
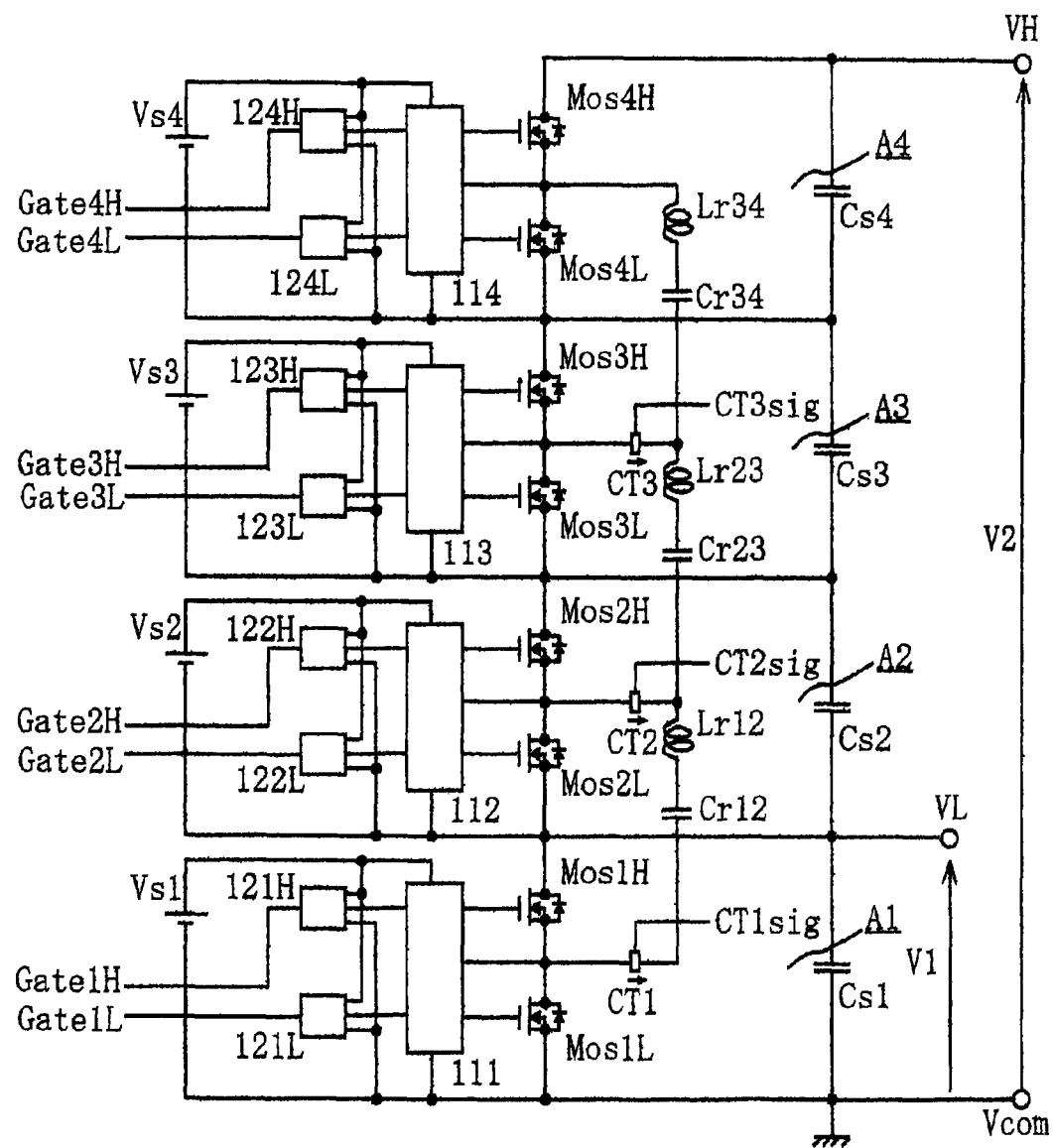
FIG. 11 is a diagram showing the circuit configuration of a principal portion of a DC/DC power converting apparatus according to a fifth embodiment of the present invention.

As shown in FIG. 11, the DC/DC power converting apparatus is provided with current sensors CT1, CT2, CT3 serving as current sensing means in addition to the circuit configuration shown in FIG. 1. In this embodiment, the circuit A4 is used as a driving inverter circuit and the circuits A1, A2, A3 are used as rectifier circuits. The current sensors CT1, CT2, CT3 detect output currents from the connecting points of the high-voltage side MOSFETs and the low-voltage side MOSFETs of the rectifier circuits A1-A3, respectively.

Figure 12:
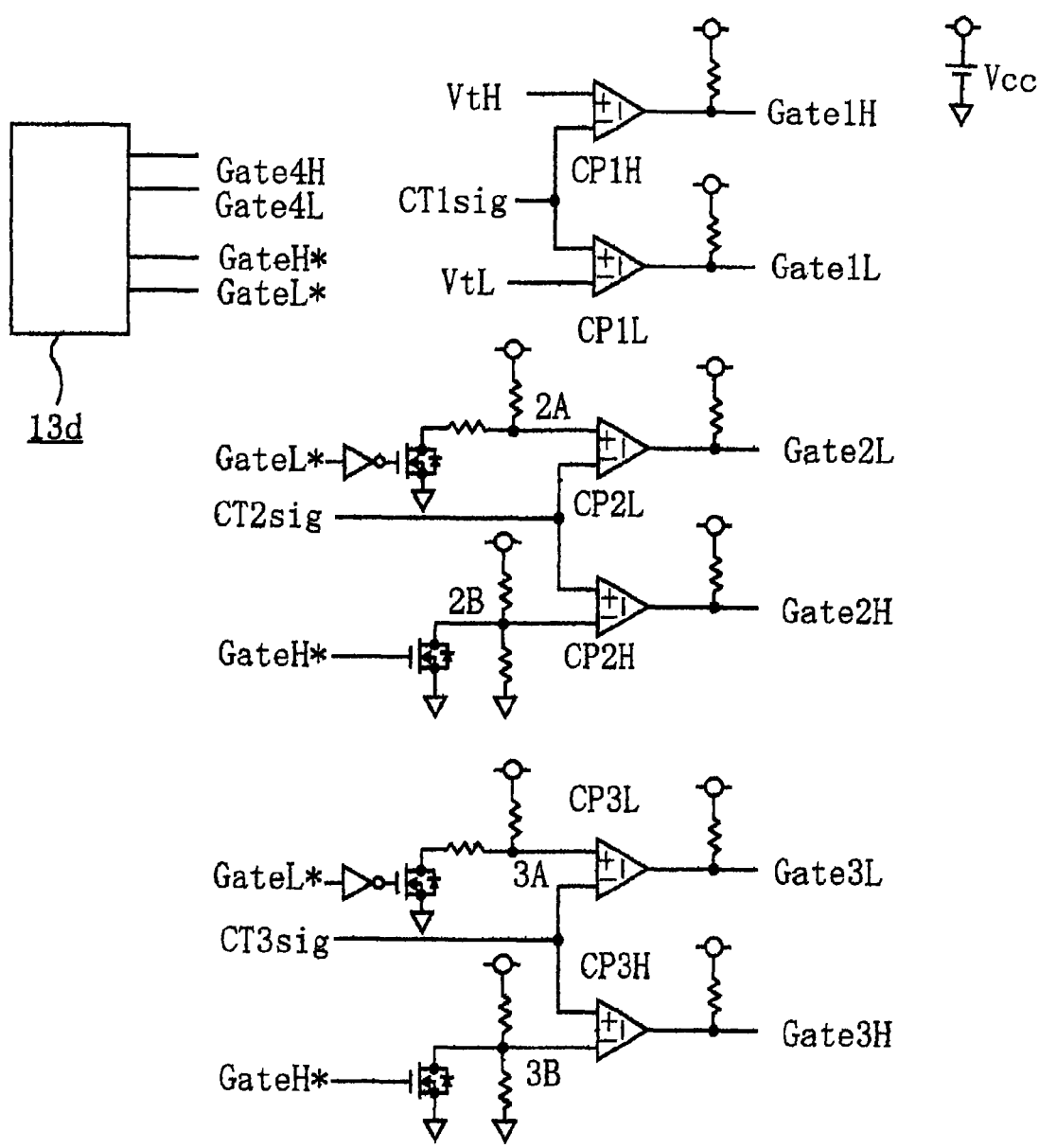
FIG. 12 is a diagram showing the circuit configuration of a gate signal generator of the DC/DC power converting apparatus according to the fifth embodiment of the present invention.

As shown in FIG. 12, the driving gate signals Gate4L, Gate4H for driving the driving inverter circuit A4 and rectifier circuit ON signals GateL*, GateH* are generated by a control circuit 13*d* in the gate signal generator.

Also, the rectification gate signal Gate1L is generated by a comparator CP1L based on an output signal CT1*sig* of the current sensor CT1 and the threshold voltage VtL input into the comparator CP1L, and the rectification gate signal Gate1H is generated by a comparator CP1H based on CT1*sig* and the threshold voltage VtH input into the comparator CP1H. The rectification gate signals Gate2L, Gate3L are generated by comparators CP2L, CP3L based on output signals CT2*sig*, CT3*sig* of the current sensors CT2, CT3 and the rectifier circuit ON signal GateL*, respectively, and the rectification gate signals Gate2H, Gate3H are generated by comparators CP2H, CP3H based on CT2*sig*, CT3*sig* and GateH*, respectively. It is to be noted that the output signals CT1*sig*, CT2*sig*, CT3*sig* of the respective current sensors CT1, CT2, CT3 are voltage signals referenced to a zero-ampere voltage Vref.

Figure 13:
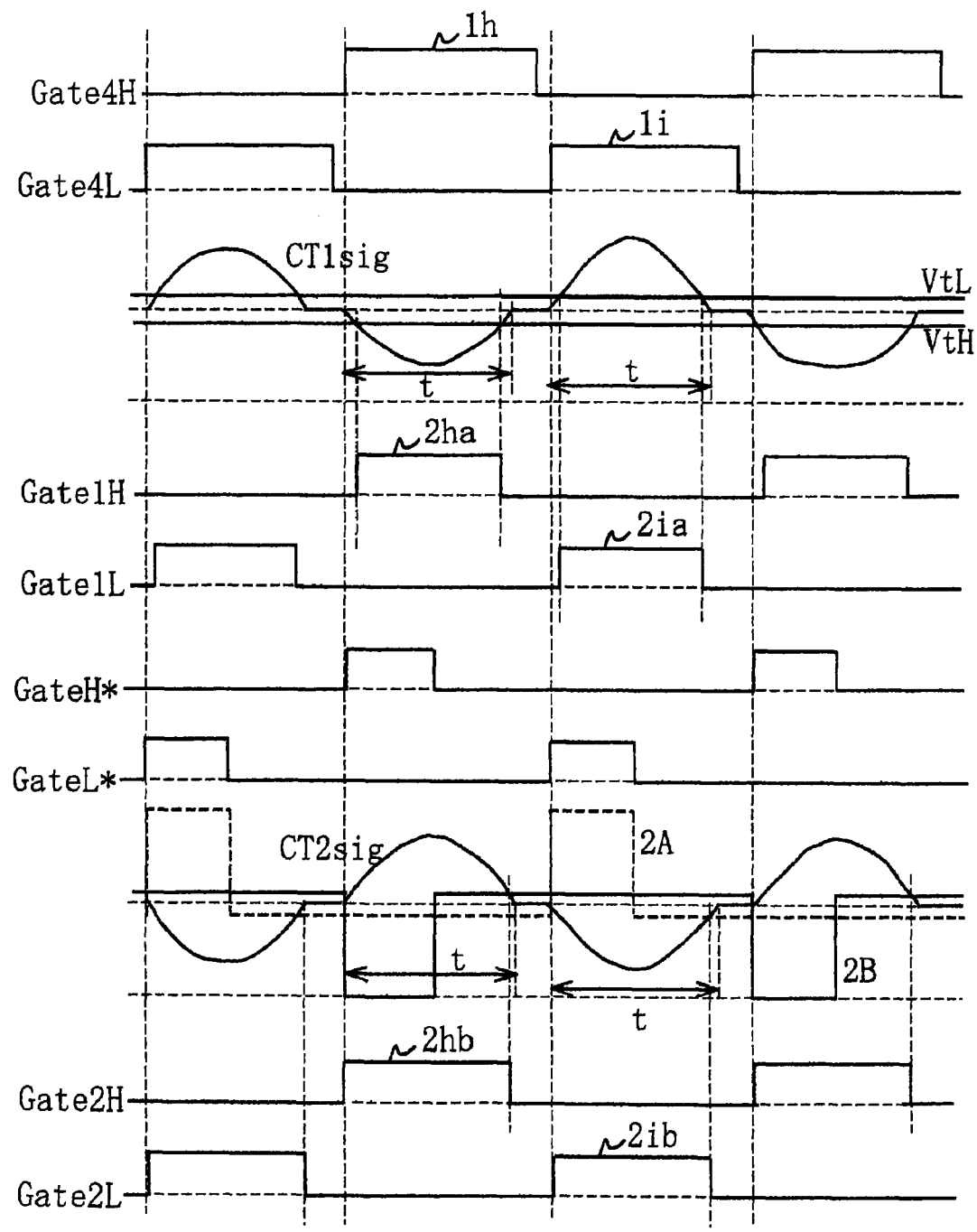
FIG. 13 is a diagram showing gate signals and current waveforms at individual points according to the fifth embodiment of the present invention.

FIG. 13 shows voltage waveforms of the driving gate signals Gate4L, Gate4H, the rectification gate signals Gate1L, Gate1H for driving the rectifier circuit A1, the rectification gate signals Gate2L, Gate2H for driving the rectifier circuit A2, the output signals CT1*sig*, CT2*sig* of the current sensors CT1, CT2, the threshold voltages VtL, VtH, the rectifier circuit ON signals GateL*, GateH*, an input terminal voltage 2A at a GateL* input side of the comparator CP2L, and an input terminal voltage 2B at a GateH* input side of the comparator CP2H. Since the voltage waveforms observed in the rectifier circuit A3 are the same as observed in the rectifier circuit A2, and the rectification gate signals Gate3L, Gate3H are generated in the same way as the rectification gate signals Gate2L, Gate2H, figural representation and description of these voltage waveforms of the rectifier circuit A3 are not provided here.

As shown in FIG. 13, the driving gate signals Gate4L, Gate4H are ON/OFF signals having a period which is slightly longer than the period of resonance 2*t* determined by the LC series circuit of Lr and Cr and a duty cycle of about 50%. In the Figure, 1*i* and 1*h* indicate pulses (hereinafter referred to as driving pulses) of the respective driving gate signals Gate4L, Gate4H.

The rectification gate signals Gate1L, Gate1H are generated based on a comparison of the output signal CT1*sig* of the current sensor CT1 with the threshold voltages VtL, VtH, respectively. Specifically, when the current from the connecting point of Mos1L and Mos1H flows in the positive direction, the control circuit 13*d* generates a rectification pulse 2*ia* to turn on Mos1L, and when the current flows in the negative direction, the control circuit 13*d* generates a rectification pulse 2*ha* to turn on Mos1H. As a result, Mos1L, Mos1H turn on during periods when the parasitic diodes of the respective MOSFETs conduct.

The rectification gate signals Gate2L, Gate2H are generated from the rectifier circuit ON signals GateL*, GateH* and the output signal CT2*sig* of the current sensor CT1. The rectifier circuit ON signals GateL*, GateH* are signals of which ON timings are matched to rise timings of the driving pulses 1*i*, 1*h*, the signals having an on-duty ratio of about 25%. Gate2L is turned to the high voltage by making the input terminal voltage 2A of the comparator CP2L equal to the control power supply voltage Vcc during a high-voltage period of GateL* in order to generate a rectification pulse 2*ib* so that Mos2L turns on and conducts. Then, GateL* is turned to a low voltage during a period when a current is flowing, so that the voltage 2A becomes a voltage (produced by dividing the voltage Vcc by a resistor) slightly lower than the voltage Vref. When the current becomes approximately zero, the voltage 2A and the voltage of CT2*sig* are reversed in voltage level and Gate2L is turned to the low voltage. Gate2H is turned to the high voltage by making the input terminal voltage 2B of the comparator CP2H equal to a zero voltage of a control power supply during a high-voltage period of GateH* in order to generate a rectification pulse 2*hb* so that Gate2H turns on and conducts. Then, GateH* is turned to the low voltage during a period when a current is flowing, so that the voltage 2B becomes a voltage (produced by dividing the voltage Vcc by a resistor) slightly higher than the voltage Vref. When the current becomes approximately zero, the voltage 2B and the voltage of CT2*sig* are reversed in voltage level and Gate2H is turned to the low voltage.

Due to the aforementioned gate signals Gate1L, Gate1H, Gate2L, Gate2H, Gate3L, Gate3H, Gate4L, Gate4H, currents flow through the same current paths as shown in the aforementioned second embodiment and the energy is transferred from the smoothing capacitors Cs2, Cs3, Cs4 to the smoothing capacitors Cs1, Cs2, Cs3, respectively, as a result of charging and discharging operation of the capacitors Cr12, Cr23, Cr24. The voltage V2 input from across the voltage terminals VH and Vcom is lowered to the voltage V1 which is approximately ¼ times the voltage V2 and the voltage V1 thus lowered is output from across the voltage terminals VL and Vcom.

In this embodiment, there are provided the current sensors CT1, CT2, CT3 for detecting output currents from the connecting points of the high-voltage side MOSFETs and the low-voltage side MOSFETs of the rectifier circuits A1-A3 and the rectification gate signals Gate1L, Gate1H, Gate2L, Gate2H, Gate3L, Gate3H are generated according to the detected currents, respectively, as discussed above. For this reason, it is possible to generate the rectification pulses 2*ha*, 2*ia*, 2*hb*, 2*ib* within the time period t which is equal to one-half the period of resonance of the LC series circuits from the rise timings of the respective driving pulses 1*i*, 1*h* in a reliable fashion. The currents are interrupted after flowing during the time period t so that the currents do not flow in the reverse direction. Therefore, it is possible to effectively use the resonance phenomenon of the LC series circuits. Moreover, as the conduction loss can be reduced by use of the MOSFETs in the rectifier circuits A1-A3, it is possible to realize a DC/DC power converting apparatus having a high conversion efficiency.

It is possible to generally match the rectification pulses 2*ha*, 2*ia* to the conduction period t of the MOSFETs by properly setting the threshold voltages VtL, VtH, and to generally match the rectification pulses 2*hb*, 2*ib* to the conduction period t of the MOSFETs by properly setting the voltages 2A, 2B used for comparison with the output signal of the current sensor CT2, so that the conduction loss can be further reduced.

Also, since the apparatus is configured to separately generate the driving gate signals Gate4L, Gate4H and the rectification gate signals Gate1L, Gate1H, Gate2L, Gate2H, Gate3L, Gate3H in this embodiment as well, it is possible to easily control the MOSFETs of the rectifier circuits A1-A3 separately from the MOSFETs of the driving inverter circuit A4 and realize the above-described desirable operation as well as a DC/DC power converting apparatus having a high conversion efficiency in a reliable fashion.

Sixth Embodiment

While the boost-type DC/DC power converting apparatus for raising V1 to V2 has been described in the foregoing fourth embodiment and the buck-type DC/DC power converting apparatus for lowering V2 to V1 has been described in the foregoing fifth embodiment, the following discussion of the present embodiment illustrates a buck-boost DC/DC power converting apparatus having the functions of both the aforementioned fourth and fifth embodiments to realize bi-directional energy transfer.

Figure 14:
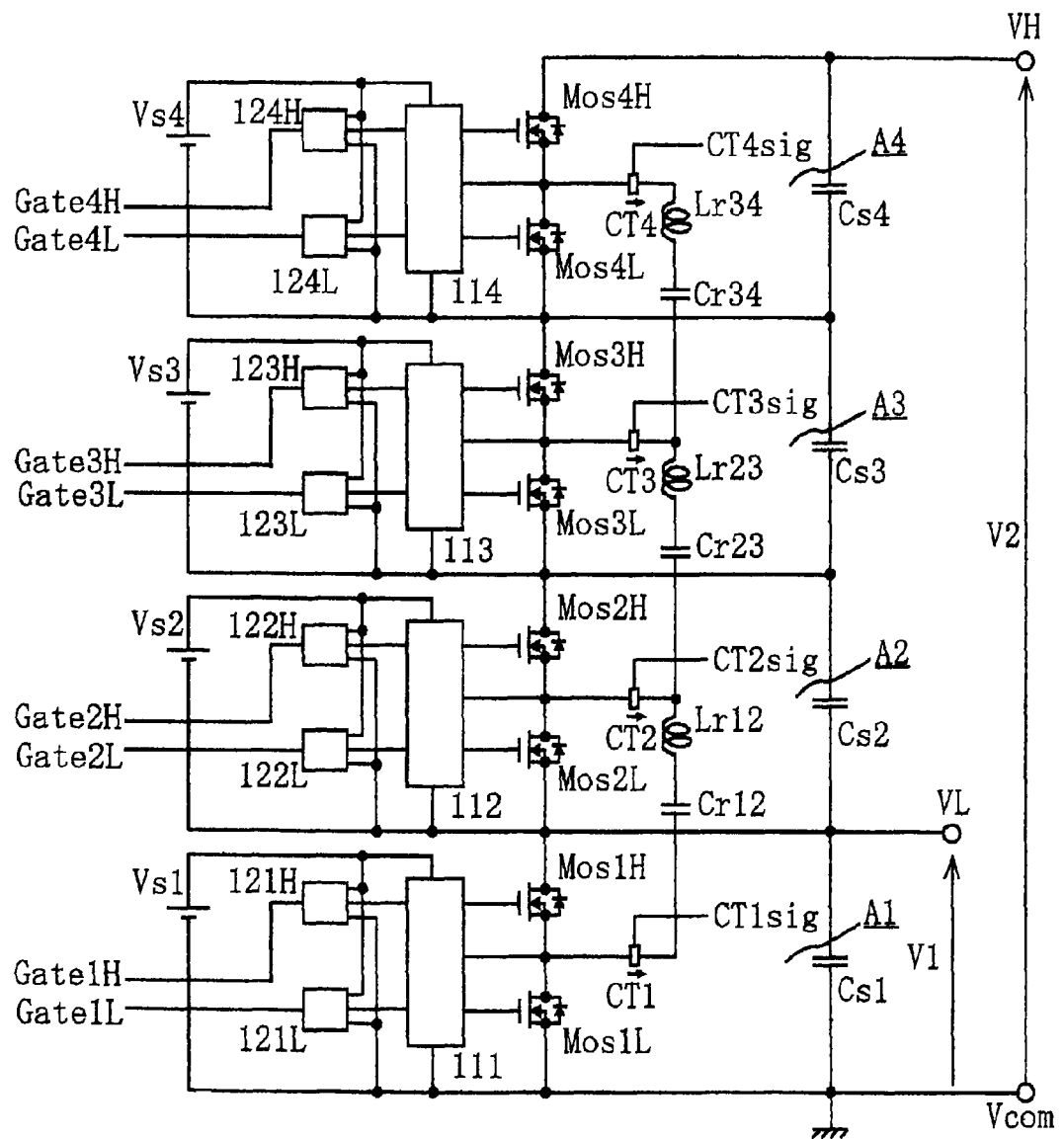
FIG. 14 is a diagram showing the circuit configuration of a principal portion of a DC/DC power converting apparatus according to a sixth embodiment of the present invention.
Figure 15:
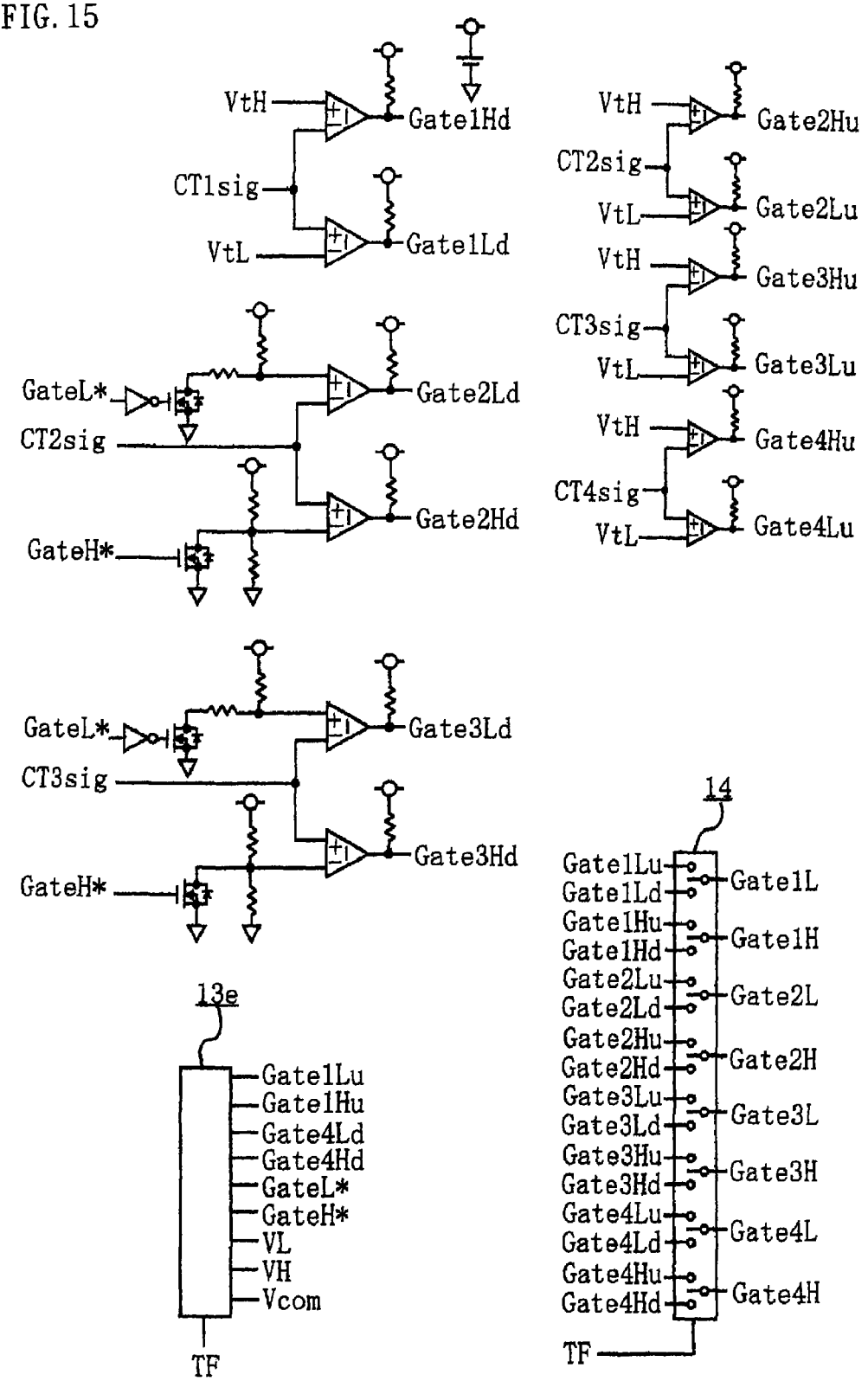
FIG. 15 is a diagram showing the circuit configuration of a gate signal generator of the DC/DC power converting apparatus according to the sixth embodiment of the present invention.

FIG. 14 shows a principal portion of the circuit configuration of the DC/DC power converting apparatus according to the present embodiment, and FIG. 15 shows a gate signal generator. As shown in FIG. 14, the DC/DC power converting apparatus is provided with current sensors CT1, CT2, CT3, CT4 serving as current sensing means in addition to the circuit configuration shown in FIG. 1. The current sensors CT1, CT2, CT3, CT4 detect output currents from the connecting points of the high-voltage side MOSFETs and the low-voltage side MOSFETs of the circuits A1-A4 and then output signals CT1*sig*, CT2*sig*, CT3*sig*, CT4*sig*. In this embodiment, the circuit A1 is used as a driving inverter circuit and the circuits A2, A3, A4 are used as rectifier circuits in the voltage-boosting mode, while the circuit A4 is used as a driving inverter circuit and the circuits A1, A2, A3 are used as rectifier circuits in the voltage-lowering mode.

As shown in FIG. 15, voltages of the voltage terminals Vcom, VL, VH are input into a control circuit 13*e* of the gate signal generator, and the control circuit 13*e* outputs driving gate signals Gate1Lu, Gate1Hu for operation in the voltage-boosting mode, driving gate signals Gate4Ld, Gate4Hd for operation in the voltage-lowering mode, rectifier circuit ON signals GateL*, GateH*, and a signal TF for switching the gate signals for the voltage-boosting mode operation and the voltage-lowering mode operation.

During the voltage-boosting mode operation, rectification gate signals Gate2Lu, Gate2Hu, Gate3Lu, Gate3Hu, Gate4Lu, Gate4Hu are generated by the same circuit block as that of the aforementioned fourth embodiment and input into a gate signal switcher 14. During the voltage-lowering mode operation, rectification gate signals Gate1Ld, Gate1Hd, Gate2Ld, Gate2Hd, Gate3Ld, Gate3Hd are generated by the same circuit block as that of the aforementioned fifth embodiment and input into the gate signal switcher 14. The control circuit 13*e* calculates V1 and V2 (V1: VL-Vcom, V2: VH- Vcom) from the individual terminal voltages that are input. If V1×4>V2, the control circuit 13e recognizes that the voltage-boosting mode is currently selected, and if V1×4<V2, the control circuit 13e recognizes that the voltage-lowering mode is currently selected. Then, the control circuit 13e outputs the relevant switching signal TF to the gate signal switcher 14, and the gate signal switcher 14 switches the DC/DC power converting apparatus between the voltage-boosting mode operation and the voltage-lowering mode operation accordingly.

The buck-boost DC/DC power converting apparatus thus controlled makes it possible to obtain the same advantageous effects as discussed in the aforementioned fourth and fifth embodiments and realize bi-directional energy transfer with a single circuit, so that the apparatus is widely applicable.

While each of the current sensors is disposed on a line between the connecting point of the high-voltage and low-voltage side MOSFETs and the LC series circuit of Lr and Cr to detect a current in the foregoing fourth to sixth embodiments, currents flowing in the individual MOSFETs may be detected by the current sensors.

Seventh Embodiment

While the output currents from the intermediate terminals of the individual circuits A1-A4 (i.e., the connecting points of the high-voltage side MOSFETs and the low-voltage side MOSFETs) are detected and the rectification gate signals are generated according to the detected currents in the foregoing fourth to sixth embodiments, currents flowing through the LC series circuits of Lr and Cr may be detected. The present embodiment employs an arrangement for detecting currents flowing through the capacitors Cr for energy transfer.

Each of the LC series circuits of Lr and Cr is connected between the intermediate terminals of adjacent two of the circuits A1-A4, and the individual LC series circuits are configured to have the same resonant frequency. Thus, although the currents flowing through the individual capacitors Cr differ from the detected currents of the foregoing fourth to sixth embodiments in amplitude value, the former and the latter generally coincide with one another in phase. Therefore, it is possible to generate the rectification gate signals in the same way as in the foregoing fourth to sixth embodiments according to the detected currents which flow through the individual capacitors Cr.

Figure 16:
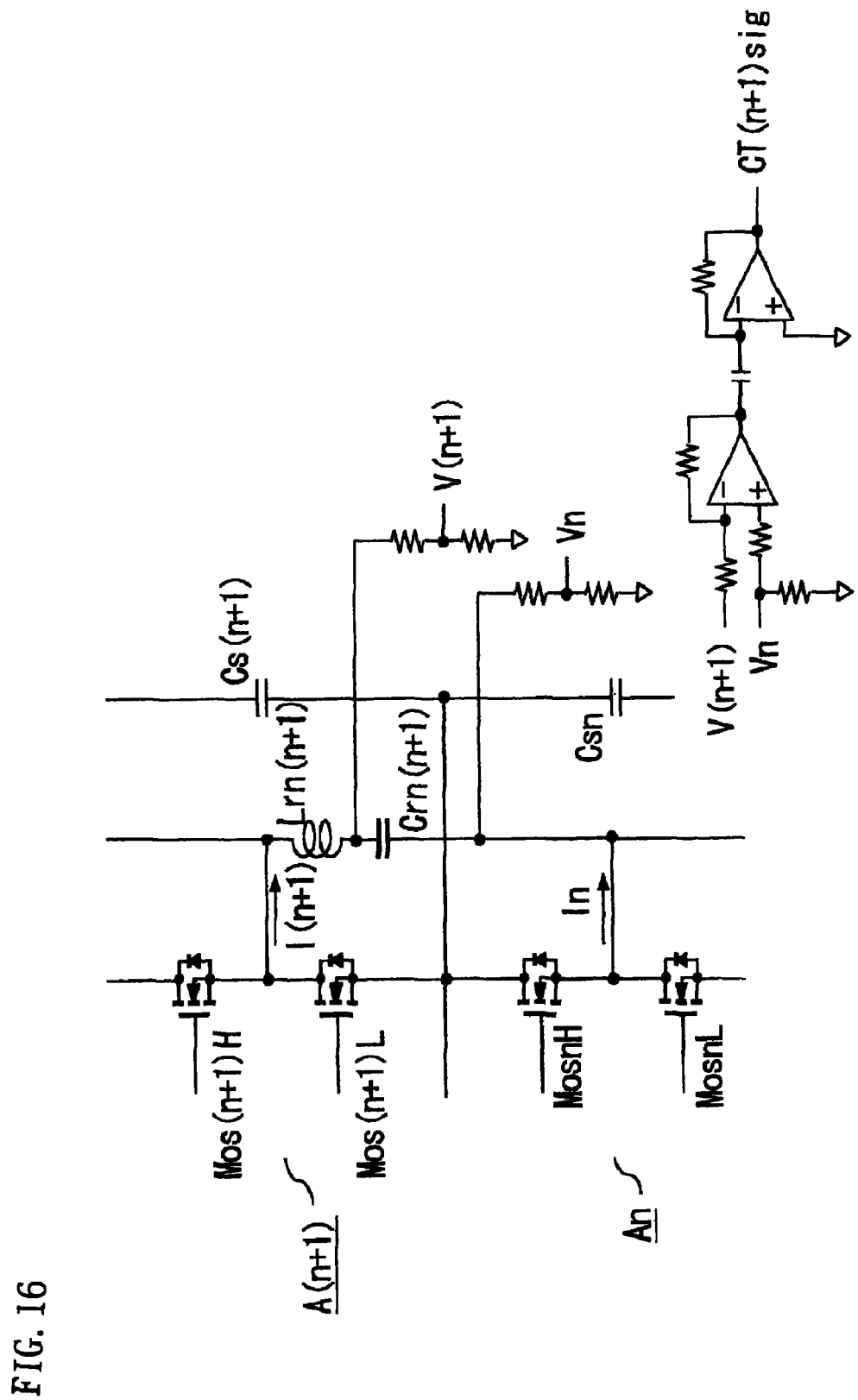
FIG. 16 is a fragmentary circuit diagram of a DC/DC power converting apparatus according to a seventh embodiment of the present invention.

FIG. 16 is a fragmentary circuit diagram of a DC/DC power converting apparatus according to the present embodiment, showing in particular a circuit for detecting a current flowing through a capacitor Crn(n+1) connected between the intermediate terminals of the adjacent circuits An, A(n+1)

As shown in the Figure, the current flowing through the capacitor Crn(n+1) is detected by differentiating a voltage difference between a voltage V(n+1) obtained by dividing a voltage of the capacitor Crn(n+1) on a side of the circuit A(n+1) and a voltage Vn obtained by dividing a voltage of the capacitor Crn(n+1) on a side of the circuit An. A current signal thus detected is output as a signal CT(n+1)sig.

Although the signal CT(n+1)sig thus output differs from the output signals of the current sensors CT1-CT4 of the foregoing fourth to sixth embodiments with respect to the amplitude value of the voltage Vref at zero current, it is possible to generate the rectification gate signals in the same way as in the foregoing fourth to sixth embodiments by using the signal CT(n+1)sig after gain adjustment and offset adjustment and thus obtain the same advantageous effects.

Eighth Embodiment

While the currents flowing through the capacitors Cr are detected in the foregoing seventh embodiment, currents flowing through the inductors Lr may be detected instead. It is to be noted that the currents flowing through the capacitors Cr are identical to the currents flowing through the inductors Lr.

Figure 17:
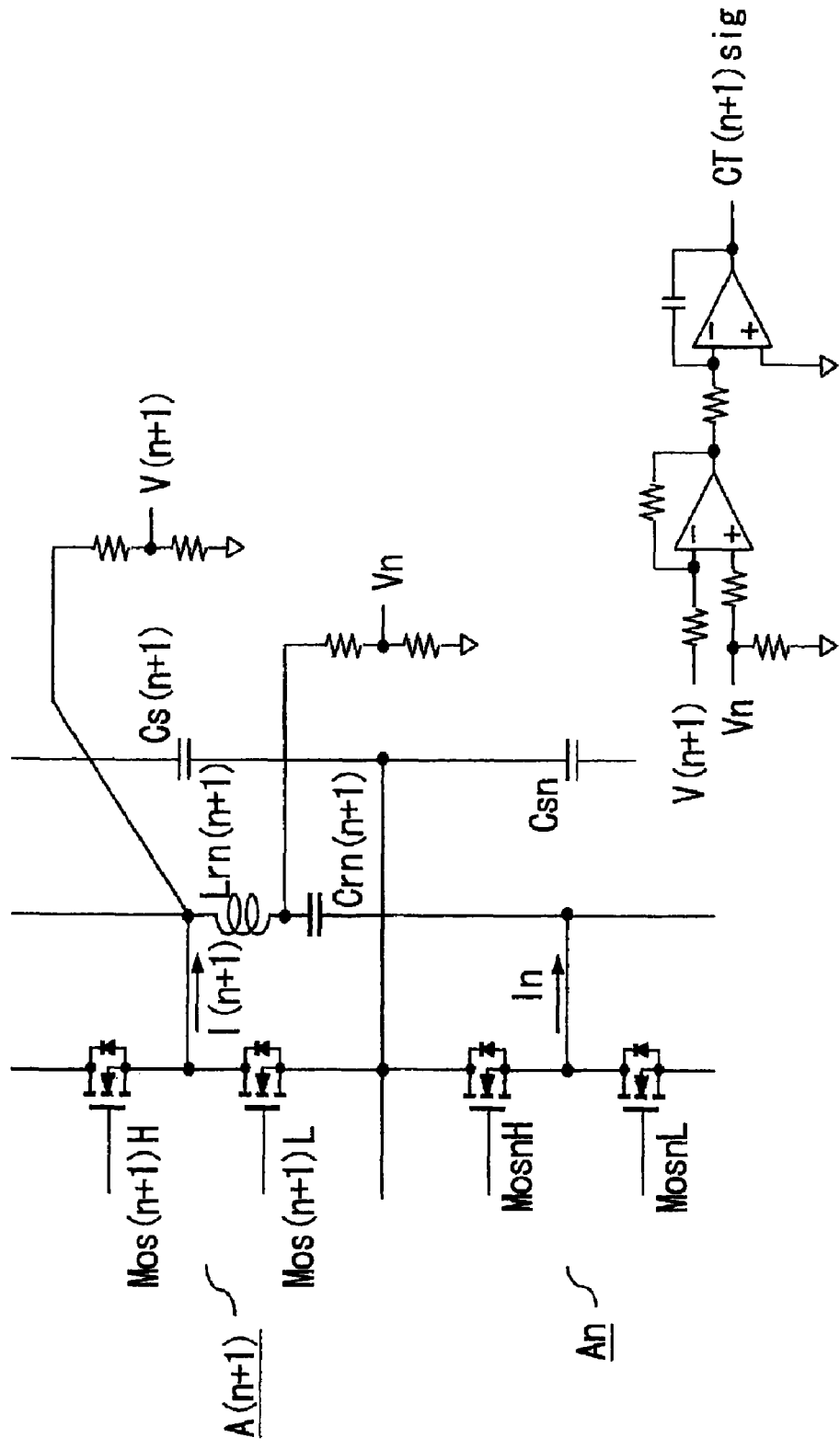
FIG. 17 is a fragmentary circuit diagram of a DC/DC power converting apparatus according to an eighth embodiment of the present invention.

FIG. 17 is a fragmentary circuit diagram of a DC/DC power converting apparatus according to the present embodiment, showing in particular a circuit for detecting a current flowing through an inductor Lrn(n+1) connected between the intermediate terminals of the adjacent circuits An, A(n+1).

As shown in the Figure, the current flowing through the inductor Lrn(n+1) is detected by integrating a voltage difference between a voltage V(n+1) obtained by dividing a voltage of the inductor Lrn(n+1) on a side of the circuit A(n+1) and a voltage Vn obtained by dividing a voltage of the inductor Lrn(n+1) on a side of the circuit An. A current signal thus detected is output as a signal CT(n+1)sig. Then, it is possible to generate the rectification gate signals in the same way as in the foregoing seventh embodiment and thus obtain the same advantageous effects.

While the four-times boost-type or ¼-times buck-type DC/DC power converting apparatuses have been described in the foregoing first to eighth embodiments, it goes without saying that the invention is also applicable to DC/DC power converting apparatuses having various voltage ratios configured with varying numbers of stages of rectifier circuits.

Ninth Embodiment

The foregoing discussion has dealt with the embodiments of a type in which the input/output voltages (V1, V2) are not insulated from each other. Described hereinbelow is a DC/DC power converting apparatus in which the input/output voltages are insulated from each other with the provision of a transformer.

Figure 18:
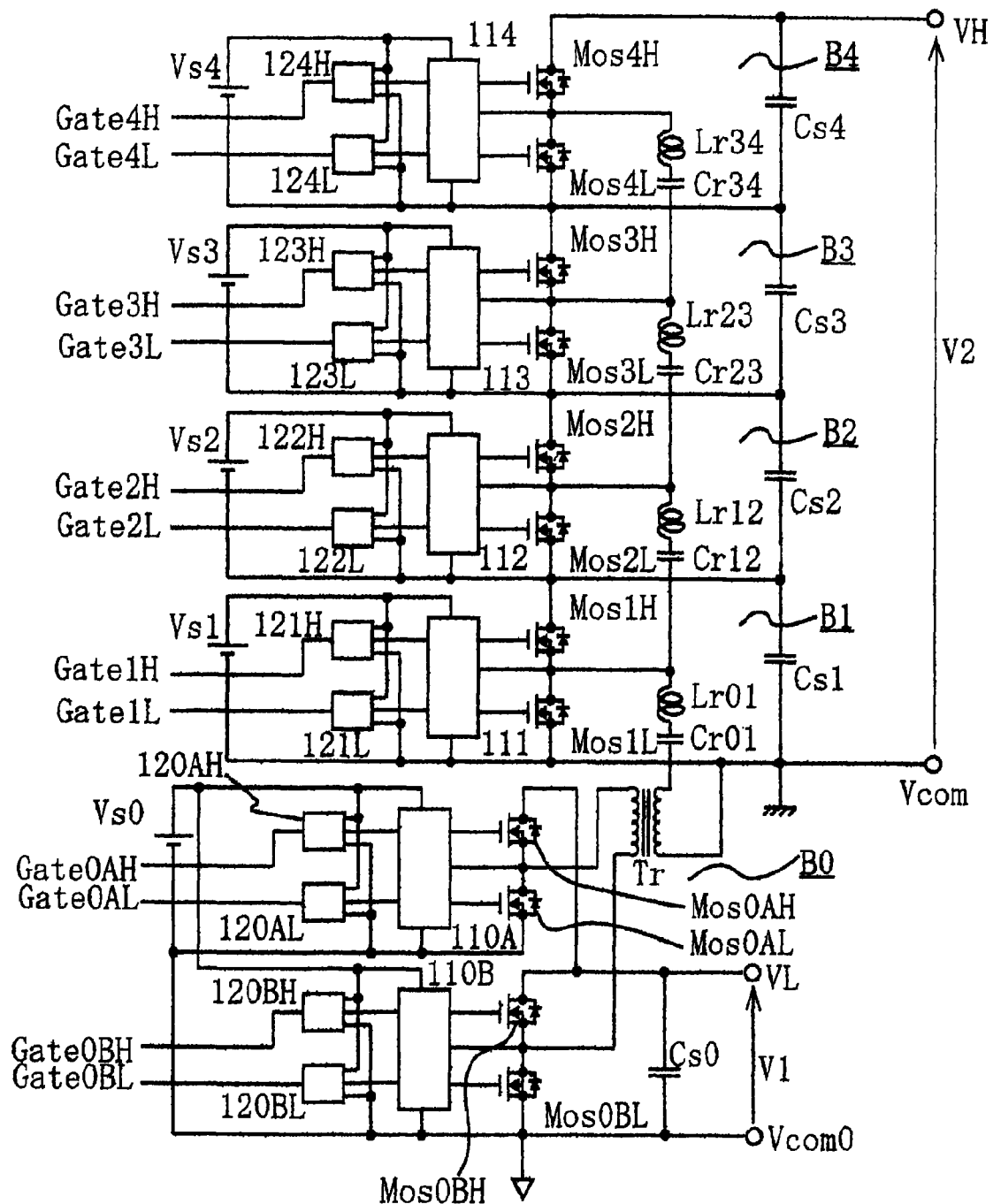
FIG. 18 is a diagram showing the circuit configuration of a principal portion of a DC/DC power converting apparatus according to a ninth embodiment of the present invention.
Figure 19:
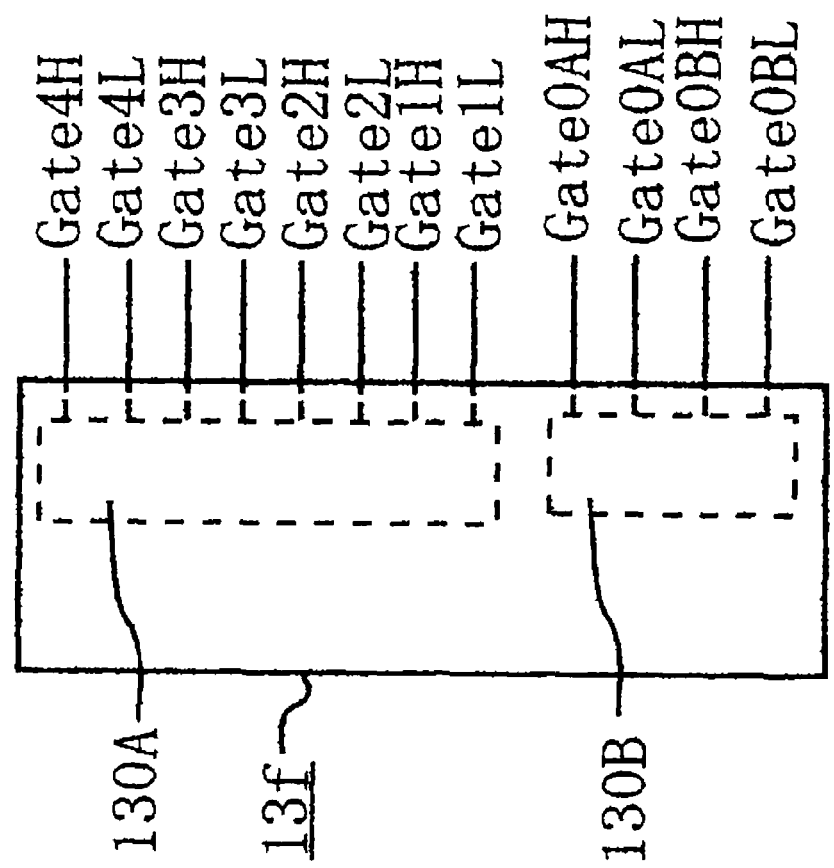
FIG. 19 is a diagram showing the circuit configuration of a gate signal generator of the DC/DC power converting apparatus according to the ninth embodiment of the present invention.

FIGS. 18 and 19 show the circuit configuration of the DC/DC power converting apparatus according to a ninth embodiment of the present invention. Particularly, FIG. 18 shows a principal portion of the apparatus and FIG. 19 shows a gate signal generator.

As shown in FIG. 18, the DC/DC power converting apparatus has a function to convert a voltage V1 input from across voltage terminals VL and Vcom0 to a voltage V2, which is approximately eight times as high as the voltage V1, and output the voltage V2 thus raised from across voltage terminals VH and Vcom having a reference voltage level differing from that of the voltage terminals VL and Vcom0.

As depicted in FIG. 18, there are provided a driving inverter circuit B0 serving as a first circuit and rectifier circuits B1-B4 serving as second circuits, the driving inverter circuit B0 and the rectifier circuit B1 being connected to each other through a transformer Tr having a turns ratio of 1:1.

The driving inverter circuit B0 is configured with a smoothing capacitor Cs0 for smoothing the input voltage V1, serving also as a voltage source for energy transfer, and a plurality of MOSFETs (Mos0AH, Mos0AL, Mos0BH, Mos0BL).

One end of a primary winding of the transformer Tr is connected to a connecting point of a source terminal of Mos0AH and a drain terminal of Mos0AL, and the other end is connected to a connecting point of a source terminal of Mos0BH and a drain terminal of Mos0BL. Drain terminals of Mos0AH and Mos0BH are connected to the voltage terminal VL, and source terminals of Mos0AL and Mos0BL are connected to the voltage terminal Vcom0. The smoothing capacitor Cs0 is connected between the voltage terminals VL and Vcom0.

The rectifier circuits B1-B4 have the same configuration as the circuits A1-A4 of the aforementioned first embodiment, and each of LC series circuits of Lr and Cr is connected between intermediate terminals of adjacent two of the rectifier circuits B1-B4. Also, one end of an LC series circuit of an inductor Lr01 and a capacitor Cr01 is connected to an intermediate terminal of the rectifier circuit B1 (i.e., the connecting point of Mos1H and Mos1L) and the other end of this LC series circuit is connected to one end of a secondary winding of the transformer Tr. With this arrangement, the individual LC series circuits and the secondary winding of the transformer Tr are connected in series. Also, the other end of the secondary winding of the transformer Tr is connected to the voltage terminal Vcom.

Values of periods of resonance determined by inductance values and capacitance values of the inductors Lr and the capacitors Cr of the individual stages are made equal to one another.

Driving gate signals Gate0AH, Gate0AL for controlling ON/OFF operation of Mos0AH, Mos0AL are supplied from a control circuit 13$f$ which constitutes the gate signal generator to a gate driving circuit 110A through photocouplers 120AH, 120AL, respectively, and Mos0AH, Mos0AL are driven by the gate driving circuit 110A. Driving gate signals Gate0BH, Gate0BL for controlling ON/OFF operation of Mos0BH, Mos0BL are supplied from the control circuit 13$f$ to a gate driving circuit 110B through photocouplers 120BH, 120BL, respectively, and Mos0BH, Mos0BL are driven by the gate driving circuit 110B. The gate driving circuits and the photocouplers are driven by a power supply Vs0.

The control circuit 13$f$ has a driving gate signal generating portion 130B for generating the driving gate signals Gate0AL, Gate0AH, Gate0BL, Gate0BH for driving the driving inverter circuit B0 and a rectification gate signal generating portion 130A for generating rectification gate signals Gate1L, Gate1H, Gate2L, Gate2H, Gate3L, Gate3H, Gate4L, Gate4H for driving the rectifier circuits B1-B4.

Next, the working is described.

The capacitance values of the smoothing capacitors Cs0-Cs4 are set at sufficiently large values as compared to the capacitance values of the capacitors Cr01-Cr34 of the LC series circuits.

As the voltage V1 input from across the voltage terminals VL and Vcom0 is raised to the voltage V2 which is approximately eight times as high as the voltage V1 and the voltage V2 thus raised is output from across the voltage terminals VH and Vcom as mentioned earlier, the voltage V2 has a smaller value than 8×V1.

Figure 20:
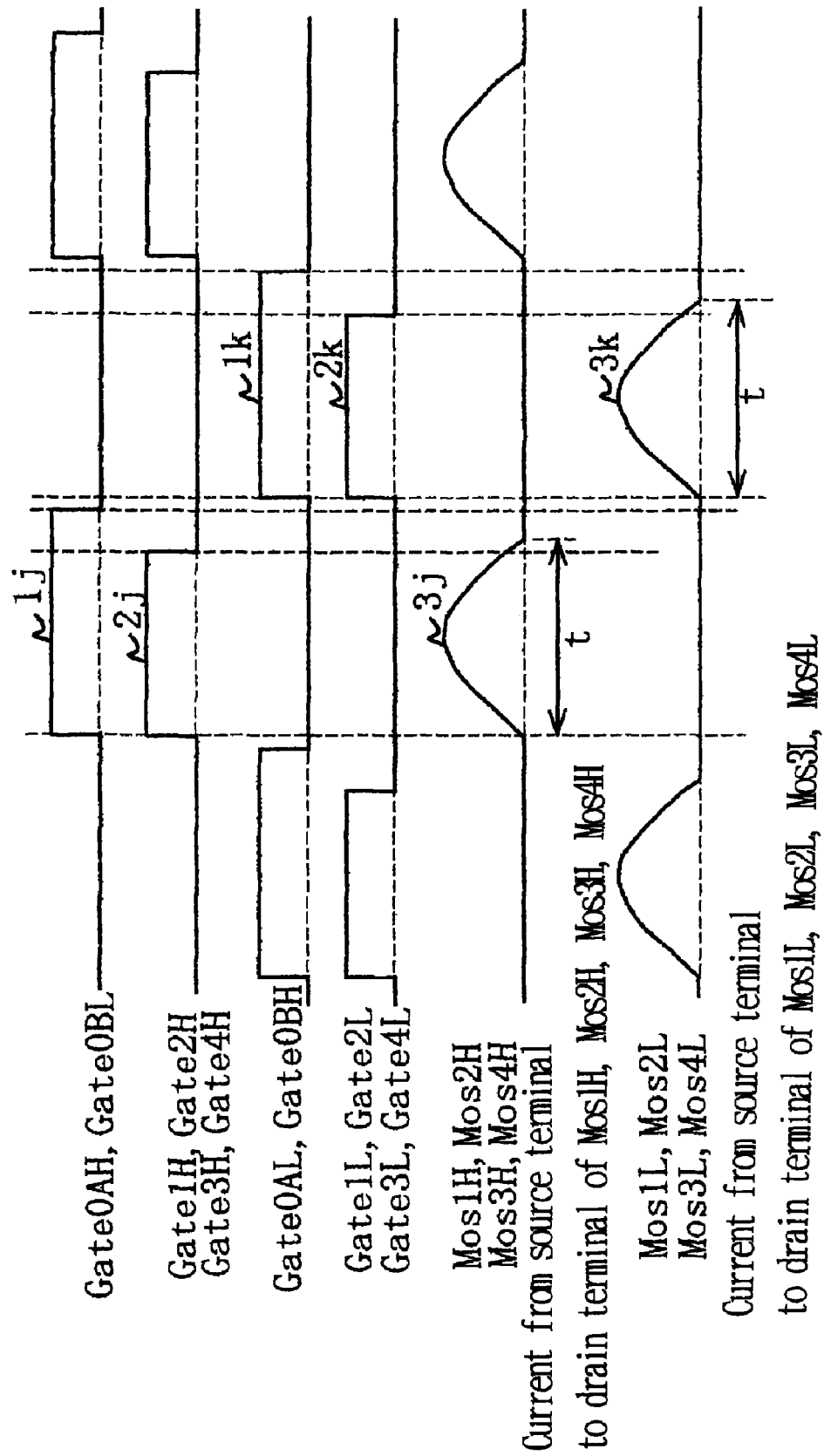
FIG. 20 is a diagram showing gate signals and current waveforms at individual points according to the ninth embodiment of the present invention.

FIG. 20 shows the driving gate signals Gate0AL, Gate0AH, Gate0BL, Gate0BH, the rectification gate signals Gate1L, Gate1H, Gate2L, Gate2H, Gate3L, Gate3H, Gate4L, Gate4H, and currents flowing from the sources to the drains of Mos1L, Mos1H, Mos2L, Mos2H, Mos3L, Mos3H, Mos4L, Mos4H in the rectifier circuits B1-B4. Each of the MOSFETs turns on when the gate signal is at the high voltage and turns off when the gate signal is at the low voltage.

As shown in FIG. 20, the driving gate signals Gate0AH and Gate0BL are like signals and the driving gate signals Gate0AL and Gate0BH are like signals, (Gate0AH, Gate0BL) and (Gate0AL, Gate0BH) being ON/OFF signals having a period T which is slightly longer than the period of resonance 2$t$ determined by the LC series circuit of Lr and Cr and a duty cycle of about 50%. In the Figure, 1$j$ and 1$k$ indicate pulses (hereinafter referred to as driving pulses) of the driving gate signals (Gate0AH, Gate0BL) and (Gate0AL, Gate0BH), respectively.

The rectification gate signals Gate1H-Gate4H fed into the high-voltage side MOSFETs of the rectifier circuits B1-B4 and the rectification gate signals Gate1L-Gate4L fed into the low-voltage side MOSFETs are ON/OFF signals containing pulses (hereinafter referred to as rectification pulses 2$j$, 2$k$) which are generated within the time period t from rise timings of the driving pulses 1$j$, 1$k$ of the driving gate signals (Gate0AH, Gate0BL) and (Gate0AL, Gate0BH), respectively. Here, rise timings of the rectification pulses 2$j$, 2$k$ are set to coincide with the rise timings of the driving pulses 1$j$, 1$k$ and fall timings of the rectification pulses 2$j$, 2$k$ are set to precede fall timings of the driving pulses 1$j$, 1$k$ by specific time periods, respectively.

When Mos0AL, Mos0BH of the driving inverter circuit B0 and Mos1L, Mos2L, Mos3L, Mos4L which are the low-voltage side MOSFETs of the rectifier circuits B1-B4 are brought into the ON state by the driving pulse 1$k$ and the rectification pulse 2$k$, the voltage V1 is applied to the primary winding of the transformer Tr in a negative voltage direction thereof and, at the same time, the voltage V1 appears in the secondary winding of the transformer Tr in a negative voltage direction thereof, so that part of energy stored in the smoothing capacitors Cs0, Cs1, Cs2, Cs3 is transferred to Cr01, Cr12, Cr23, Cr34 through paths shown below, respectively. In Mos1L-Mos4L, currents flow from the sources to the drains through the parasitic diodes of the respective MOSFETs even when the rectification pulse 2$k$ is in the OFF state. Specifically, in each of the MOSFETs Mos1L-Mos4L, a current 3$k$ flows during the time period t which is equal to one-half the period of resonance of the LC series circuit and, then, the current is interrupted by the reverse current preventing function of the parasitic diode.

Vcom⇒Mos1L⇒Lr01⇒Cr01⇒Tr
Cs1⇒Mos2L⇒Lr12⇒Cr12⇒Lr01⇒Cr01⇒Tr
Cs1⇒Cs2⇒Mos3L⇒Lr23⇒Cr23⇒Lr12⇒Cr12⇒Lr01⇒Cr01 ⇒Tr
Cs1⇒Cs2⇒Cs3⇒Mos4L⇒Lr34⇒Cr34⇒Lr23⇒Cr23⇒Lr12⇒
Cr12⇒Lr01⇒Cr01⇒Tr Subsequently, when Mos0AH, Mos0BL of the driving inverter circuit B0 and Mos1H, Mos2H, Mos3H, Mos4H which are the high-voltage side MOSFETs of the rectifier circuits B1-B4 are brought into the ON state by the driving pulse 1$j$ and the rectification pulse 2$j$, the voltage V1 is applied to the primary winding of the transformer Tr in a positive voltage direction thereof and, at the same time, the voltage V1 appears in the secondary winding of the transformer Tr in a positive voltage direction thereof, so that the energy charged into the capacitors Cr01, Cr12, Cr23, Cr34 is transferred to the smoothing capacitors Cs1, Cs2, Cs3, Cs4 through paths shown below, respectively. In Mos1H-Mos4H, currents flow from the sources to the drains through the parasitic diodes of the respective MOSFETs even when the rectification pulse 2$j$ is in an OFF state. Specifically, in each of the MOSFETs Mos1H-Mos4H, a current 3$j$ flows during the time period t which is equal to one-half the period of resonance of the LC series circuit and, then, the current is interrupted by the reverse current preventing function of the parasitic diode.

Tr⇒Cr01⇒Lr01⇒Mos1H⇒Cs1
Tr⇒Cr01⇒Lr01⇒Cr12⇒Lr12⇒Mos2H⇒Cs2⇒Cs1
Tr⇒Cr01⇒Lr01⇒Cr12⇒Lr12⇒Cr23⇒Lr23⇒Mos3H⇒ Cs3⇒
Cs2⇒Cs1
Tr⇒Cr01⇒Lr01⇒Cr12⇒Lr12⇒Cr23⇒Lr23⇒Cr34⇒ Lr34⇒
Mos4H⇒Cs4⇒Cs3⇒Cs2⇒Cs1

The energy is transferred from the smoothing capacitor Cs0 to the smoothing capacitors Cs1, Cs2, Cs3, Cs4 as a result of charging and discharging operation of the capacitors Cr01, Cr12, Cr23, Cr34 as discussed above. The voltage V1 input from across the voltage terminals VL and Vcom0 is raised to the voltage V2 which is approximately eight times as high as the voltage V1 and the voltage V2 thus raised is output from across the voltage terminals VH and Vcom. Also, the inductors Lr01, Lr12, Lr23, Lr34 are series-connected to the capacitors Cr01, Cr12, Cr23, Cr34, respectively, to configure the LC series circuits. This configuration utilizes the resonance phenomenon for transferring the energy, making it possible to efficiently transfer a large amount of energy.

Since the rectification pulses 2j, 2k are generated within the time period t from the rise timings of the driving pulses 1j, 1k, respectively, in this embodiment as well, currents are interrupted after flowing during the time period t which is equal to one-half the period of resonance of the LC series circuits and, thus, the currents do not flow in the reverse direction. Therefore, it is possible to effectively use the resonance phenomenon of the LC series circuits. Moreover, as the conduction loss can be reduced by use of the MOSFETs in the rectifier circuits B1-B4, it is possible to realize a DC/DC power converting apparatus having a high conversion efficiency.

Furthermore, since the control circuit 13f has the driving gate signal generating portion 130B and the rectification gate signal generating portion 130A to separately generate the driving gate signals and the rectification gate signals, it is possible to easily control the MOSFETs of the rectifier circuits B1-B4 separately from the MOSFETs of the driving inverter circuit B0 and realize the above-described desirable operation as well as a DC/DC power converting apparatus having a high conversion efficiency in a reliable fashion.

While the gate signals for the driving inverter circuit B0 and the gate signals for the rectifier circuits B1-B4 are generated by the control circuit 13f in this ninth embodiment, the gate signals for the rectifier circuits B1-B4 may be generated by detecting the flowing currents as in the foregoing fourth, seventh and eighth embodiments.

Tenth Embodiment

While the boost-type DC/DC power converting apparatus which raises the voltage V1 to the voltage V2 which is approximately eight times as high as the voltage V1 has been described in the foregoing ninth embodiment, the following discussion of the present embodiment illustrates a buck-type DC/DC power converting apparatus which lowers the voltage V2 down to the voltage V1.

While a principal portion of the circuit configuration of the DC/DC power converting apparatus according to the present embodiment is the same as the circuit configuration shown in FIG. 18, the circuit B4 is used as a driving inverter circuit and the circuits B0, B1, B2, B3 are used as rectifier circuits in this embodiment. Also, a control circuit 13g which is a gate signal generator differing from that of the foregoing ninth embodiment is shown in FIG. 21.

Figure 21:
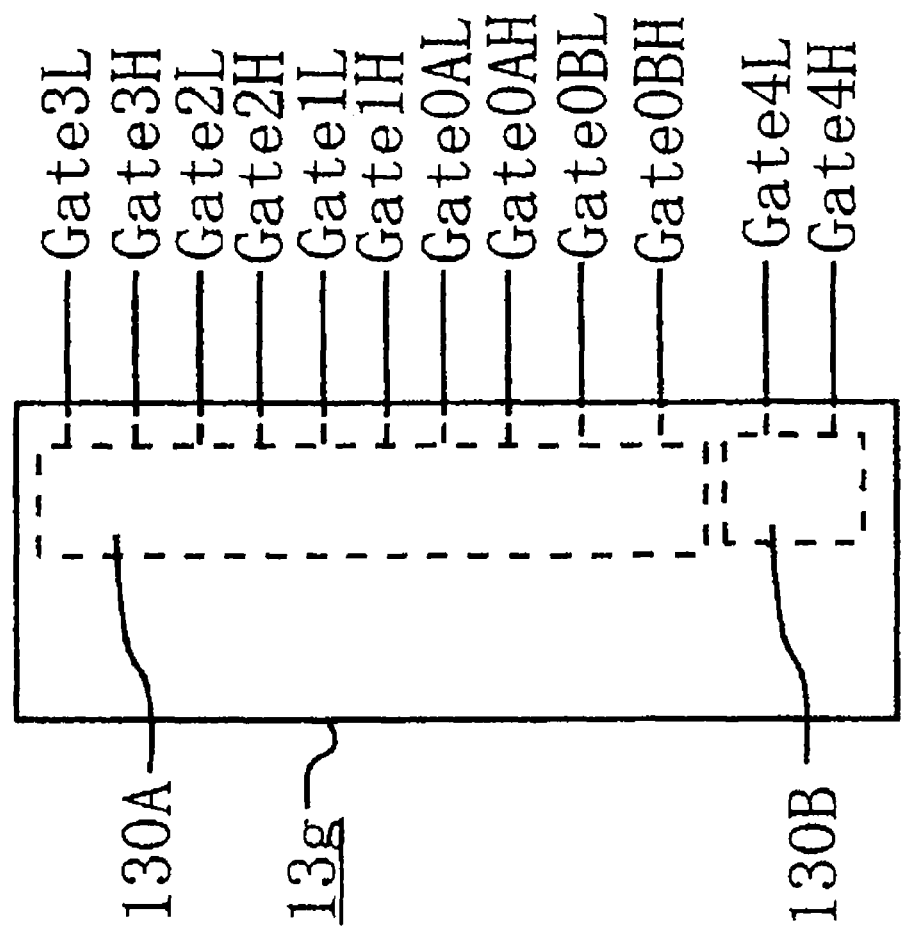
FIG. 21 is a diagram showing the circuit configuration of a gate signal generator of a DC/DC power converting apparatus according to a tenth embodiment of the present invention.

As shown in FIG. 21, the control circuit 13g has a driving gate signal generating portion 130B for generating the driving gate signals Gate4L, Gate4H for driving the driving inverter circuit B4 and a rectification gate signal generating portion 130A for generating the rectification gate signals Gate0AL, Gate0AH, Gate0BL, Gate0BH, Gate1L, Gate1H, Gate2L, Gate2H, Gate3L, Gate3H for driving the rectifier circuits B0-B3.

While the circuit B0 among the rectifier circuits B0-B3 is used substantially for rectification, the circuits B1-B3 might be regarded as driving circuits because the circuits B1-B3 control the amount of transferred energy of the capacitors Cr01, Cr12, Cr23 through ON/OFF operation of the MOSFETs. If, however, the gate signals Gate1L, Gate1H, Gate2L, Gate2H, Gate3L, Gate3H for driving the circuits B1-B3 are made identical to the driving gate signals Gate4L, Gate4H for driving the driving inverter circuit B4 and the MOSFETs are held in the ON state even after a lapse of the time period t which is equal to one-half the period of resonance determined by Lr and Cr during voltage-lowering operation, reverse currents would occur in the LC series circuits, resulting in a reduction in the amount of transferred energy.

Thus, in this embodiment, the rectification gate signal generating portion 130A generates the gate signals Gate1L, Gate1H, Gate2L, Gate2H, Gate3L, Gate3H as the rectification gate signals in the same way as the gate signals Gate0AL, Gate0AH, Gate0BL, Gate0BH and the circuits B1-B3 are referred to also as the rectifier circuits.

Next, the working is described.

The capacitance values of the smoothing capacitors Cs0-Cs4 are set at sufficiently large values as compared to the capacitance values of the capacitors Cr01-Cr34 of the LC series circuits.

As the voltage V2 input from across the voltage terminals VH and Vcom is lowered to the voltage V1 which is approximately ⅛ times the voltage V2 and the voltage V1 thus lowered is output from across the voltage terminals VL and Vcom as mentioned earlier, the voltage V2 has a larger value than 8×V1.

Figure 22:
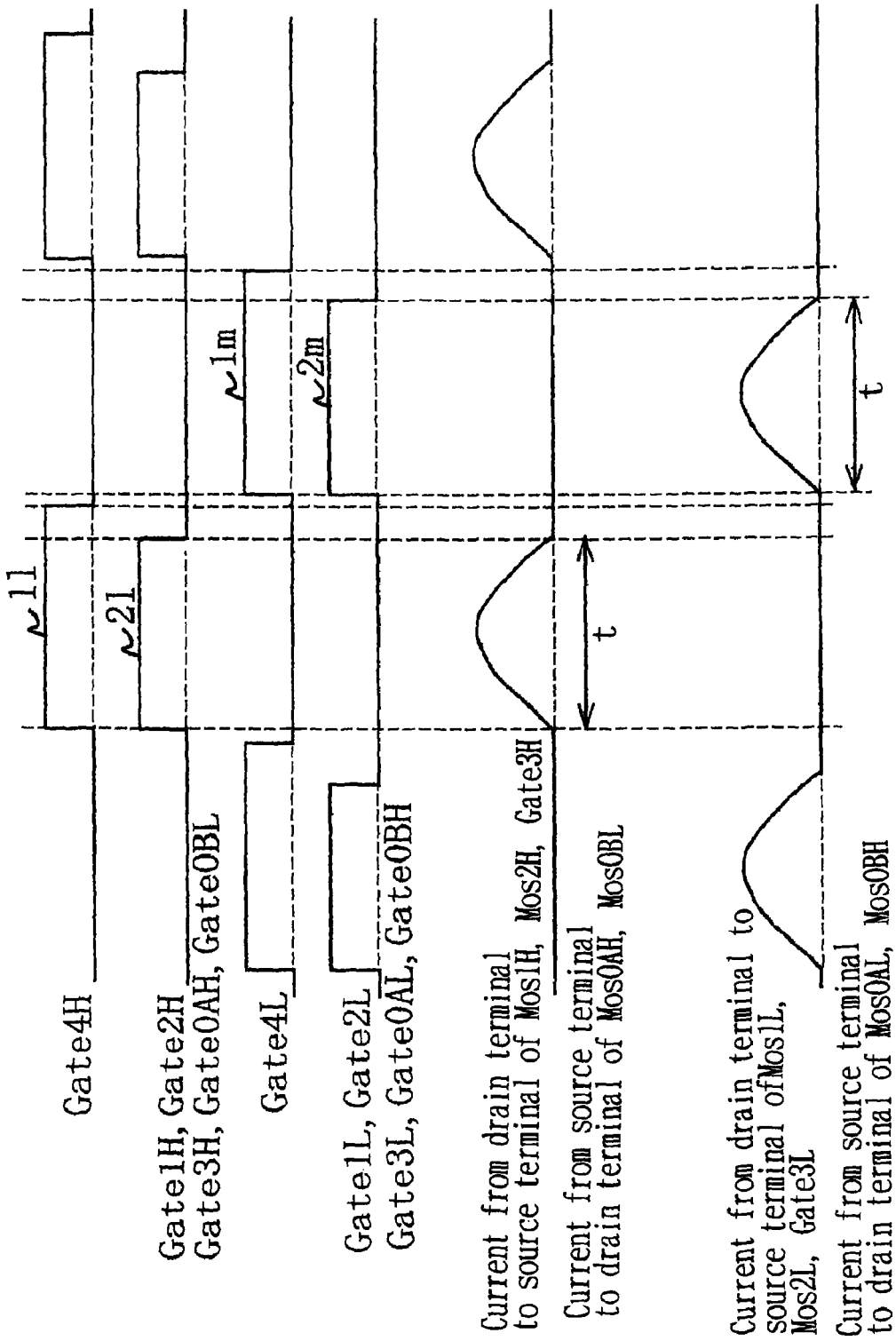
FIG. 22 is a diagram showing gate signals and current waveforms at individual points according to the tenth embodiment of the present invention.

FIG. 22 shows the driving gate signals Gate4L, Gate4H, the rectification gate signals Gate1L, Gate1H, Gate2L, Gate2H, Gate3L, Gate3H, Gate0AL, Gate0AH, Gate0BL, Gate0BH, currents flowing from the drains to the sources of Mos1H, Mos2H, Mos3H, currents flowing from the sources to the drains of Mos0AH, Mos0BL, currents flowing from the drains to the sources of Mos1L, Mos2L, Mos3L, and currents flowing from the sources to the drains of Mos0AL, Mos0BH.

As shown in FIG. 22, the driving gate signals Gate4L, Gate4H are ON/OFF signals having a period T which is slightly longer than the period of resonance 2t determined by the LC series circuit of Lr and Cr and a duty cycle of about 50%. In the Figure, 1l and 1m indicate pulses (hereinafter referred to as driving pulses) of the driving gate signals Gate4L, Gate4H, respectively.

The rectification gate signals Gate1H-Gate3H, Gate0AH, Gate0BL and the rectification gate signals Gate1L-Gate3L, Gate0AL, Gate0BH of the rectifier circuits B0-B3 are ON/OFF signals containing pulses (hereinafter referred to as rectification pulses 2l, 2m) which are generated within the time period t from rise timings of the driving pulses 1l, 1m. Here, rise timings of the rectification pulses 2l, 2m are set to coincide with those of the driving pulses 1l, 1m, respectively, and pulsewidths of the rectification pulses 2l, 2m are set to generally coincide with the time period t.

When Mos4H of the driving inverter circuit B4 and Mos0AH, Mos0BL, Mos1H, Mos2H, Mos3H of the rectifier circuits B0-B3 are brought into the ON state by the driving pulse 1l and the rectification pulse 2l, part of energy stored in the smoothing capacitors Cs4, Cs3, Cs2, Cs1 is transferred to the capacitors Cr34, Cr23, Cr12, Cr01 through paths shown below, respectively.

Cs1⇒Cs2⇒Cs3⇒Cs4⇒Mos4H⇒Lr34⇒Cr34⇒Lr23⇒Cr23⇒
Lr12⇒Cr12⇒Lr01⇒Cr01⇒Tr
Cs1⇒Cs2⇒Cs3⇒Mos3H⇒Lr23⇒Cr23⇒Lr12⇒Cr12⇒Lr01⇒
Cr01⇒Tr
Cs1⇒Cs2⇒Mos2H⇒Lr12⇒Cr12⇒Lr01⇒Cr01⇒Tr
Cs1⇒Mos1H⇒Lr01⇒Cr01⇒Tr

Due to currents flowing in the aforementioned fashion, a voltage appears in the primary winding of the transformer Tr in the positive voltage direction thereof and the energy is transferred to the smoothing capacitor Cs0 through a path shown below.

Tr⇒Mos0AH⇒Cs0⇒Mos0BL

Subsequently, when Mos4L of the driving inverter circuit B4 and Mos0AL, Mos0BH, Mos1L, Mos2L, Mos3L of the rectifier circuits B0-B3 are brought into the ON state by the driving pulse 1m and the rectification pulse 2m, the energy stored in the capacitors Cr34, Cr23, Cr12, Cr01 is transferred to the smoothing capacitors Cs3, Cs2, Cs1 through paths shown below, respectively.

Cr01⇒Lr01⇒Cr12⇒Lr12⇒Cr23⇒Lr23⇒Cr34⇒Lr34⇒ Mos4L ⇒Cs3⇒Cs2⇒Cs1⇒Tr
Cr01⇒Lr01⇒Cr12⇒Lr12⇒Cr23⇒Lr23⇒Mos3L⇒ Cs2⇒Cs1 ⇒Tr
Cr01⇒Lr01⇒Cr12⇒Lr12⇒Mos2L⇒Cs1⇒Tr
Cr01⇒Lr01⇒Mos1L⇒Tr

Due to currents flowing in the aforementioned fashion, a voltage appears in the primary winding of the transformer Tr in the negative voltage direction thereof and the energy is transferred to the smoothing capacitor Cs0 through a path shown below.

Tr⇒Mos0BH⇒Cs0⇒Mos0AL

The energy is transferred from the smoothing capacitors Cs1, Cs2, Cs3, Cs4 to the smoothing capacitor Cs0 as a result of charging and discharging operation of the capacitors Cr01, Cr12, Cr23, Cr34 as discussed above. The voltage V2 input from across the voltage terminals VH and Vcom is lowered to the voltage V1 which is approximately ⅛ times the voltage V2 and the voltage V1 thus lowered is output from across the voltage terminals VL and Vcom0. Also, the inductors Lr12, Lr23, Lr34 are series-connected to the capacitors Cr01, Cr12, Cr23, Cr34, respectively, to configure the LC series circuits. This configuration utilizes the resonance phenomenon for transferring the energy, making it possible to efficiently transfer a large amount of energy.

Since the rectification pulses 2l, 2m are generated within the time period t from the rise timings of the driving pulses 1l, 1m, respectively, in this embodiment as well, currents are interrupted after flowing during the time period t which is equal to one-half the period of resonance of the LC series circuits and, thus, the currents do not flow in the reverse direction. Therefore, it is possible to effectively use the resonance phenomenon of the LC series circuits. Moreover, as the conduction loss can be reduced by use of the MOSFETs in the rectifier circuits B0-B3, it is possible to realize a DC/DC power converting apparatus having a high conversion efficiency. Additionally, since the pulsewidth of the rectification pulses 2l, 2m is set to generally coincide with the time period t in this embodiment, it is possible to further decrease the conduction loss.

Furthermore, since the control circuit 13g has the driving gate signal generating portion 130B and the rectification gate signal generating portion 130A to separately generate the driving gate signals and the rectification gate signals, it is possible to easily control the MOSFETs of the rectifier circuits B0-B3 separately from the MOSFETs of the driving inverter circuit B4 and realize the above-described desirable operation as well as a DC/DC power converting apparatus having a high conversion efficiency in a reliable fashion.

While the gate signals for the driving inverter circuit B4 and the gate signals for the rectifier circuits B0-B3 are generated by the control circuit 13g in this tenth embodiment, the gate signals for the rectifier circuits B0-B3 may be generated by detecting the flowing currents as in the foregoing fifth, seventh and eighth embodiments.

Additionally, the eight-times boost-type or ⅛-times buck-type DC/DC power converting apparatuses have been described in the foregoing ninth and tenth embodiments, it goes without saying that the invention is also applicable to DC/DC power converting apparatuses having various voltage ratios configured with varying numbers of stages of rectifier circuits.

Eleventh Embodiment

While the boost-type DC/DC power converting apparatus for raising V1 to V2 has been described in the foregoing ninth embodiment and the buck-type DC/DC power converting apparatus for lowering V2 to V1 has been described in the foregoing tenth embodiment, the following discussion of the present embodiment illustrates a buck-boost DC/DC power converting apparatus having the functions of both the aforementioned ninth and tenth embodiments to realize bi-directional energy transfer.

A principal portion of the circuit configuration of the DC/DC power converting apparatus according to the present embodiment is the same as that of the ninth and tenth embodiments shown in FIG. 18. In this embodiment, the circuit B0 is used as a driving inverter circuit and the circuits B1-B4 are used as rectifier circuits in the voltage-boosting mode, while the circuit B4 is used as a driving inverter circuit and the circuits B0-B3 are used as rectifier circuits in the voltage-lowering mode.

In this embodiment, the buck-boost DC/DC power converting apparatus is realized by switching the rectification gate signals and the driving gate signals by a control circuit based on voltages at voltage terminals as shown in the third embodiment. Alternatively, the buck-boost DC/DC power converting apparatus may be realized by providing a circuit which generates rectification gate signals for voltage-boosting mode operation and a circuit which generates rectification gate signals for voltage-lowering mode operation by using detected currents, and switching the rectification gate signals and the driving gate signals by a gate signal switcher as shown in the sixth embodiment.

Twelfth Embodiment

Described in this embodiment is a DC/DC power converting apparatus in which input/output voltages are insulated from each other with the provision of a transformer, the DC/DC power converting apparatus having a circuit configuration different from the circuit configurations of the foregoing ninth to eleventh embodiments.

Figure 23:
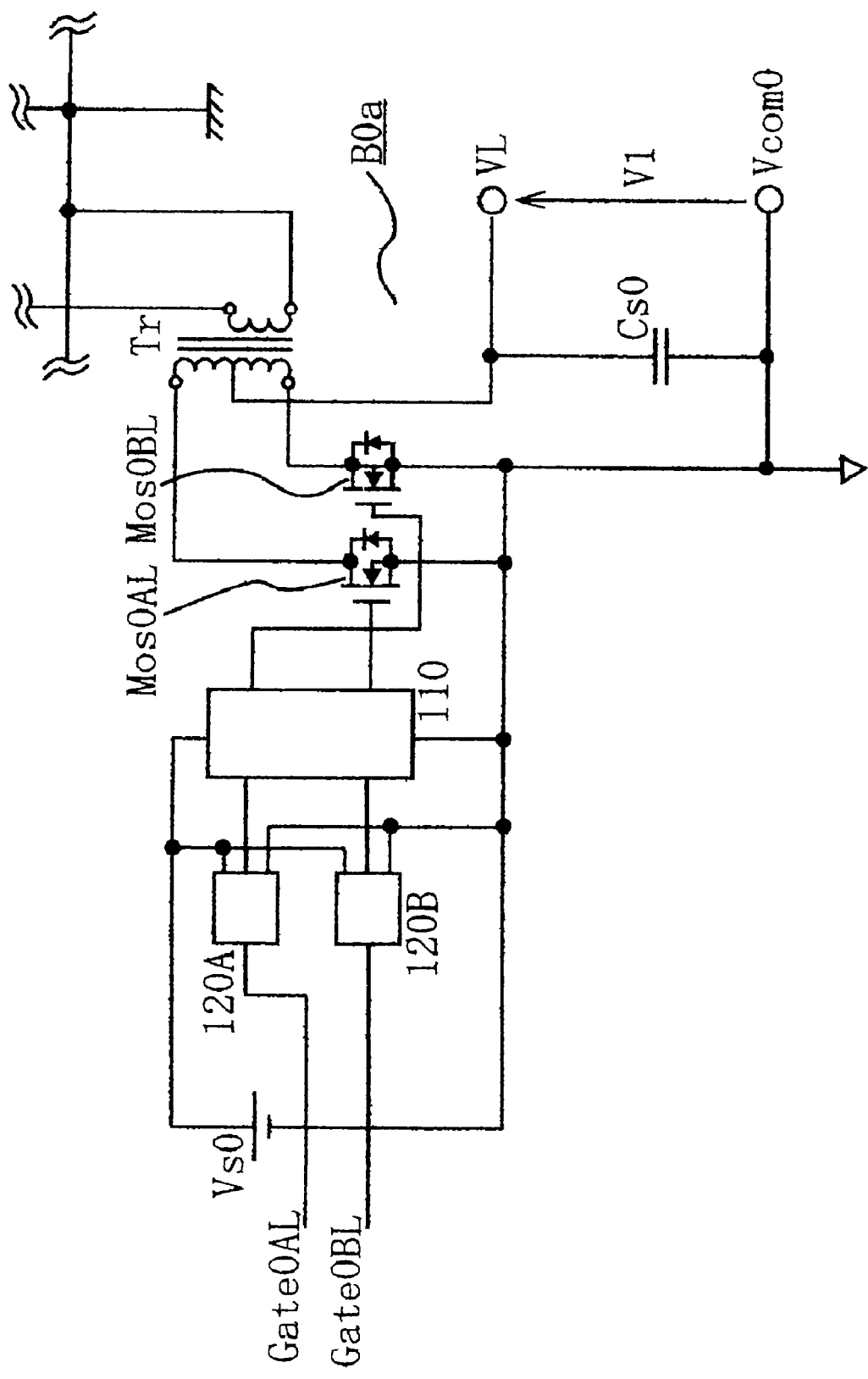
FIG. 23 is a fragmentary circuit diagram of a DC/DC power converting apparatus according to a twelfth embodiment of the present invention.

FIG. 23 shows a transformer Tr and a circuit B0a which is provided on a primary winding side of the transformer Tr, the transformer Tr and the circuit B0a constituting part of the circuit configuration of the DC/DC power converting apparatus according to the twelfth embodiment of the present invention. The remainder of the circuit configuration, that is, a portion thereof on a secondary winding side of the transformer Tr is the same as the ninth embodiment shown in FIG. 18.

As shown in FIG. 23, two windings including a first winding and a second winding are wound on the primary side of the transformer Tr, which has a first terminal at a starting point of the first winding, a second terminal to which an ending point of the first winding and a starting point of the second winding are connected and a third terminal at an ending point of the second winding. Three windings, including the secondary winding, are windings having the same number of turns.

The circuit B0a is configured with a smoothing capacitor Cs0 and two MOSFETs (Mos0AL, Mos0BL).

The second terminal of the transformer Tr on the primary side thereof is connected to the voltage terminal VL, the first terminal is connected to a drain terminal of Mos0AL, and the third terminal is connected to a drain terminal of Mos0BL. Source terminals of Mos0AL, Mos0BL are connected to the voltage terminal Vcom0. The smoothing capacitor Cs0 is disposed between the voltage terminals VL and Vcom0. ON/OFF operation of Mos0AL, Mos0BL is controlled by gate signals Gate0AL, Gate0BL through photocouplers 120A, 120B and a gate driving circuit 110, respectively.

The working is described hereinbelow.

The circuit B0a is used as a gate driving circuit and the circuits B1-B4 are used as rectifier circuits when raising a voltage by using the DC/DC power converting apparatus, while the circuit B4 is used as a gate driving circuit and the circuits B0a, B1-B3 are used as rectifier circuits in voltage-lowering mode.

During voltage-boosting mode operation, the voltage V1 is generated on the secondary side of the transformer Tr in a positive voltage direction thereof by turning on Mos0BL, and the voltage V1 is generated on the secondary side in a negative voltage direction thereof by turning on Mos0AL. The working of the apparatus is otherwise the same as the ninth embodiment. When a negative voltage occurs on the secondary side, Cs0 is charged through a path Tr⇒Cs0⇒Mos0BL, and when a positive voltage occurs on the secondary side, Cs0 is charged through a path Tr⇒Cs0⇒Mos0AL. The working of the apparatus is otherwise the same as the tenth embodiment.

Rectification pulses are generated within the time period t from rise timings of respective driving pulses to control ON/OFF operation of the individual MOSFETs in this embodiment as well. Consequently, currents are interrupted after flowing during the time period t which is equal to one-half the period of resonance of the LC series circuits and, thus, the currents do not flow in the reverse direction. Therefore, it is possible to effectively use the resonance phenomenon of the LC series circuits. Moreover, as the conduction loss can be reduced by use of the MOSFETs in the rectifier circuits, it is possible to realize a DC/DC power converting apparatus having a high conversion efficiency.

Also, the driving gate signals and the rectification gate signals are separately generated. Thus, it is possible to easily control the MOSFETs of the rectifier circuits separately from the MOSFETs of the driving inverter circuit and realize the above-described desirable operation as well as a DC/DC power converting apparatus having a high conversion efficiency in a reliable fashion.

While the single circuit B0 (B0a) is disposed on the primary side of the transformer Tr, the plurality of circuits B1-B4 are disposed on the secondary side and the secondary winding of the transformer Tr is series-connected to the individual LC series circuits in the foregoing ninth to twelfth embodiments, the numbers of circuits disposed on the primary and secondary sides are not limited to those shown in these embodiments. What is essential is that each LC series circuit disposed between any adjacent circuits be connected in series with the primary or secondary winding of the transformer Tr.

Thirteenth Embodiment

Figure 24:
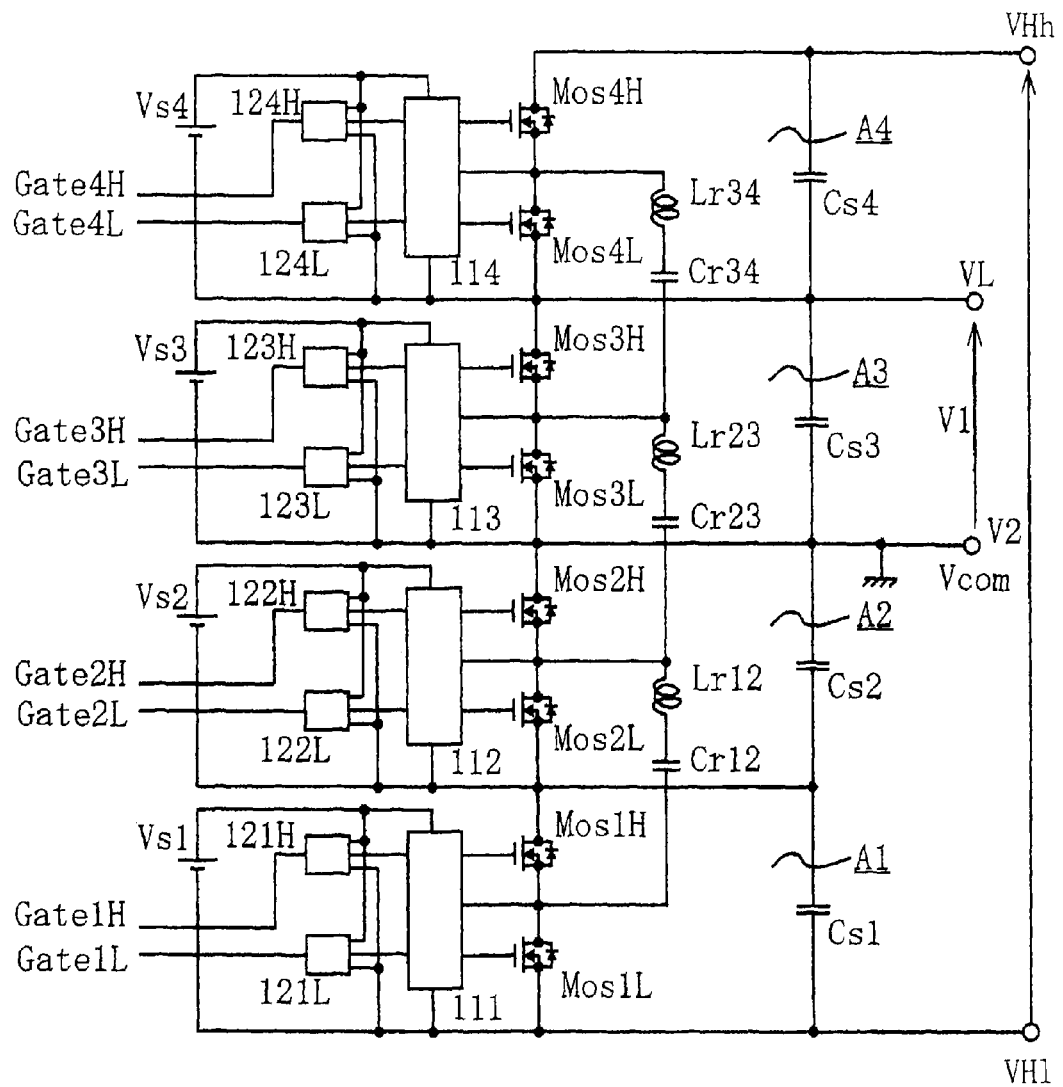
FIG. 24 is a diagram showing the circuit configuration of a principal portion of a DC/DC power converting apparatus according to a thirteenth embodiment of the present invention.
Figure 25:
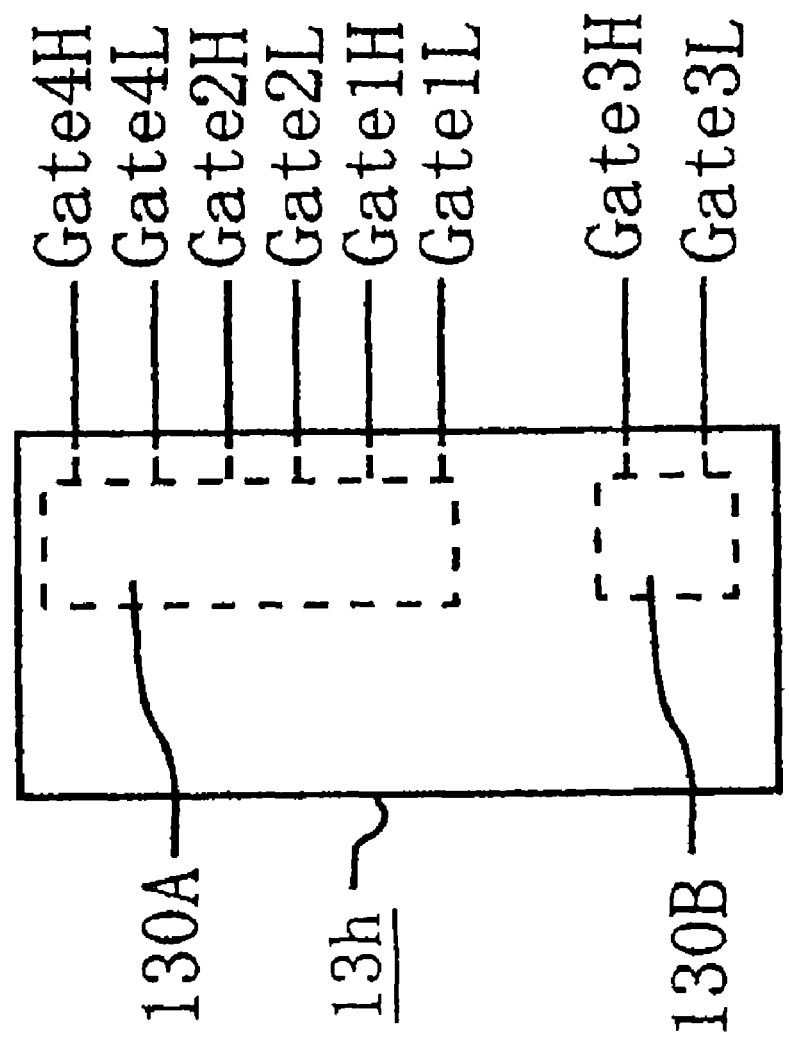
FIG. 25 is a diagram showing the circuit configuration of a gate signal generator of the DC/DC power converting apparatus according to the thirteenth embodiment of the present invention.

Next, a DC/DC power converting apparatus according to a thirteenth embodiment of the present invention is described. FIGS. 24 and 25 show the circuit configuration of the DC/DC power converting apparatus according to the thirteenth embodiment of the present invention. Particularly, FIG. 24 shows a principal portion of the apparatus and FIG. 25 shows a gate signal generator. As shown in FIG. 24, the DC/DC power converting apparatus has a function to convert a voltage V1 input from across voltage terminals VL and Vcom to a voltage V2, which is approximately four times as high as the voltage V1, and output the voltage V2 thus raised from across voltage terminals VHh and VH1. The thirteenth embodiment described below employs the same circuits as the circuits A1-A4 of the aforementioned first embodiment but differs from the first embodiment only in connections of the voltage terminals. Specifically, the positive voltage terminal VL on the low-voltage side is connected to a connecting point of smoothing capacitors Cs3 and Cs4, and the grounded negative voltage terminal Vcom on the low-voltage side is connected to a connecting point of smoothing capacitors Cs2 and Cs3. Also, the positive voltage terminal VHh on the high-voltage side is connected to the high-voltage side terminal of the smoothing capacitor Cs4, and the negative voltage terminal VH1 on the high-voltage side is connected to the low-voltage side terminal of the smoothing capacitor Cs1.

The circuit A3 is used as a driving inverter circuit for transferring energy input from across the voltage terminals VL and Vcom to the high-voltage side through ON/OFF operation of the MOSFETs (Mos3L, Mos3H). Also, the circuits A1, A2, A4 are used as rectifier circuits for rectifying a current driven by the driving inverter circuit A3 and transferring the energy to the high-voltage side.

As shown in FIG. 25, a control circuit 13h which constitutes the gate signal generator is provided with a driving gate signal generating portion 130B and a rectification gate signal generating portion 130A. The driving gate signals Gate3L, Gate3H for driving the driving inverter circuit A3 are generated by the driving gate signal generating portion 130B and the rectification gate signals Gate1L, Gate1H, Gate2L, Gate2H, Gate4L, Gate4H for driving the rectifier circuits A1, A2, A4 are generated by the rectification gate signal generating portion 130A.

Next, the working is described.

As the voltage V1 input from across the voltage terminals VL and Vcom is raised to the voltage V2 which is approximately four times as high as the voltage V1 and the voltage V2 thus raised is output from across the voltage terminals VHh and VH1, a load is connected between the voltage terminals VHh and VH1 and, thus, the voltage V2 has a smaller value than 4×V1. Under steady-state conditions, the smoothing capacitor Cs3 is charged to a voltage equal to the voltage V1 and each of the smoothing capacitors Cs1, Cs2, Cs4 is charged to a voltage equal to (V2-V1)/3 on average.

Like the driving gate signals Gate1H, Gate1L of the aforementioned first embodiment, the driving gate signals Gate3L, Gate3H are ON/OFF signals having a period T which is slightly longer than the period of resonance 2t determined by the LC series circuit of Lr and Cr and a duty cycle of about 50%. Also, as in the rectification gate signals Gate2L, Gate2H, Gate3L, Gate3H, Gate4L, Gate4H of the aforementioned first embodiment, rise timings of pulses of the rectification gate signals Gate1L, Gate1H, Gate2L, Gate2H, Gate4L, Gate4H are set to coincide with rise timings of respective pulses of the driving gate signals and fall timings of the pulses of the rectification gate signals are set to precede fall timings of the respective pulses of the driving gate signals (refer to FIG. 3).

When Mos1L, Mos2L, Mos3L, Mos4L which are the low-voltage side MOSFETs of the individual circuits A1-A4 are brought into the ON state, part of energy stored in the smoothing capacitor Cs3 is transferred to the capacitor Cr34 and energy charged into the capacitors Cr23, Cr12 is transferred to the smoothing capacitors Cs2, Cs1 through paths shown below, respectively, due to the presence of voltage differences. In Mos1L, Mos2L, Mos4L, currents flow from the sources to the drains through the parasitic diodes of the respective MOSFETs even when the rectification pulse is in the OFF state. Specifically, in each of the MOSFETs, a current flows during the time period t which is equal to one-half the period of resonance of the LC series circuit and, then, the current is interrupted by the reverse current preventing function of the parasitic diode.

Cs3⇒Mos4L⇒Lr34⇒Cr34⇒Mos3L
Cr23⇒Lr23⇒Mos3L⇒Cs2⇒Mos2L
Cr12⇒Lr12⇒Cr23⇒Lr23⇒Mos3L⇒Cs2⇒Cs1⇒Mos1L

Subsequently, when Mos1H, Mos2H, Mos3H, Mos4H which are the high-voltage side MOSFETs of the individual circuits A1-A4 are brought into the ON state, the energy charged into the capacitor Cr34 is transferred to the smoothing capacitor Cs4 and part of energy charged into the smoothing capacitors Cs2, Cs3 is transferred to the capacitors Cr12, Cr23 through paths shown below, respectively, due to the presence of voltage differences. In Mos1H, Mos2H, Mos4H, currents flow from the sources to the drains through the parasitic diodes of the respective MOSFETs even when the rectification pulse is in the OFF state. Specifically, in each of the MOSFETs, a current flows during the time period t which is equal to one-half the period of resonance of the LC series circuit and, then, the current is interrupted by the reverse current preventing function of the parasitic diode.

Cr34⇒Lr34⇒Mos4H⇒Cs4⇒Mos3H
Cs3⇒Mos3H⇒Lr23⇒Cr23⇒Mos2H
Cs2⇒Cs3⇒Mos3H⇒Lr23⇒Cr23⇒Lr12⇒Cr12⇒Mos1H

The energy is transferred from the smoothing capacitor Cs3 to the smoothing capacitors Cs1, Cs2, Cs4 as a result of charging and discharging operation of the capacitors Cr12, Cr23, Cr34 as discussed above. The voltage V1 input from across the voltage terminals VL and Vcom is raised to the voltage V2 which is approximately four times as high as the voltage V1 and the voltage V2 thus raised is output from across the voltage terminals VHh and VH1. Also, the inductors Lr12, Lr23, Lr34 are series-connected to the capacitors Cr12, Cr23, Cr34, respectively, to configure the LC series circuits. This configuration utilizes the resonance phenomenon for transferring the energy, making it possible to efficiently transfer a large amount of energy.

Also, while the low-voltage side voltage terminals VL, Vcom are connected to both terminals of the smoothing capacitor Cs1 of the circuit A1 in the aforementioned first embodiment, the voltage terminals VL, Vcom are connected to both terminals of the smoothing capacitor Cs3 of the circuit A3 which is located at a middle position between two other circuits and the voltage V1 is input from across the terminals of the smoothing capacitor Cs3 in this embodiment. Expressing the values of currents flowing through the LC series circuits Lr12Cr12, Lr23Cr23, Lr34Cr34 of the aforementioned first embodiment as $I12r$, $I23r$, $I34r$ and the values of currents flowing through the LC series circuits Lr12Cr12, Lr23Cr23, Lr34Cr34 of the present embodiment as $I12$, $I23$, $I34$, respectively, there exist the following relationships among these current values:

$I12r:I23r:I34r=3:2:1$
$I12:I23:I34=1:2:1$
$I12=I34=I34r$

As the voltage terminals VL, Vcom serving as input voltage terminals are connected to both terminals of the smoothing capacitor Cs3 of the circuit A3 which is located at the middle position between the two other circuits as discussed above, it is possible to reduce the value of the current $I12$ flowing through the LC series circuit Lr12Cr12 to one-third of the current value obtained in the case of the aforementioned first embodiment. This makes it possible to lower current ratings required for inductors Lr and capacitors Cr used for energy transfer and reduce the inductors Lr and capacitors Cr in size.

The present embodiment employs the MOSFETs in the rectifier circuits A1, A2, A4 so that it is possible to reduce conduction loss and improve power conversion efficiency as compared to the conventionally achieved levels.

Also, the MOSFETs of the rectifier circuits A1, A2, A4 are brought into the ON state simultaneously with the MOSFETs of the driving inverter circuit A3 and brought into the OFF state earlier than the MOSFETs of the driving inverter circuit A1 by a period of time not exceeding the time period t. It would be possible to minimize the conduction loss if the ON period of the MOSFETs of the rectifier circuits A1, A2, A4 is matched to the conduction period t of the MOSFETs. However, the MOSFETs of the rectifier circuits A1, A2, A4 conduct through the parasitic diodes if the ON state of the MOSFETs is terminated earlier as discussed above, so that it is possible to transfer the energy during this conduction period as well. It is also possible to avoid problems caused by a delay in control, for instance, and improve reliability.

Additionally, since the pulses of the rectification gate signals are generated within the time period t from the rise timings of the respective pulses of the driving gate signals, currents are interrupted after flowing during the time period t which is equal to one-half the period of resonance of the LC series circuits and, thus, the currents do not flow in the reverse direction. Therefore, it is possible to effectively use the resonance phenomenon of the LC series circuits. Moreover, as the conduction loss can be reduced by use of the MOSFETs, it is possible to realize a DC/DC power converting apparatus having a high conversion efficiency.

Furthermore, since the control circuit 13h has the driving gate signal generating portion 130B and the rectification gate signal generating portion 130A to separately generate the driving gate signals Gate3L, Gate3H and the rectification gate signals Gate1L, Gate1H, Gate2L, Gate2H, Gate4L, Gate4H, it is possible to easily control the MOSFETs of the rectifier circuits A1, A2, A4 separately from the MOSFETs of the driving inverter circuit A3 and realize the above-described desirable operation as well as a DC/DC power converting apparatus having a high conversion efficiency in a reliable fashion.

While the gate signals for the driving inverter circuit A3 and the gate signals for the rectifier circuits A1, A2, A4 are generated by the control circuit 13h in this thirteenth embodiment, the gate signals for the rectifier circuits A1, A2, A4 may be generated by detecting the flowing currents as in the foregoing fourth, seventh and eighth embodiments.

Fourteenth Embodiment

While the boost-type DC/DC power converting apparatus which raises the voltage V1 to the voltage V2 which is approximately four times as high as the voltage V1 has been described in the foregoing thirteenth embodiment, the following discussion of the present embodiment illustrates a buck-type DC/DC power converting apparatus which lowers the voltage V2 down to the voltage V1.

While a principal portion of the circuit configuration of the DC/DC power converting apparatus according to the present embodiment is the same as the circuit configuration shown in FIG. 24, the circuit A4 is used as a driving inverter circuit and the circuits A1, A2, A3 are used as rectifier circuits in this embodiment. Also, a control circuit which is a gate signal generator is the same as that of the aforementioned second embodiment shown in FIG. 5. In this embodiment, however, the voltage terminals VL, Vcom connected to both terminals of the smoothing capacitor Cs3 serve as output terminals from which the voltage V1 obtained from across the terminals of the smoothing capacitor Cs3 is output, and to which a load is connected.

Here again, while the circuit A3 among the rectifier circuits A1-A3 is used substantially for rectification, the circuits A1, A2 might be regarded as driving circuits because the circuits A1, A2 control the amount of transferred energy of the capacitors Cr12, Cr23 through ON/OFF operation of the MOSFETs (Mos1L, Mos1H, Mos2L, Mos2H). If, however, the gate signals Gate1L, Gate1H, Gate2L, Gate2H for driving the circuits A1, A2 are made identical to the driving gate signals Gate4L, Gate4H for driving the driving inverter circuit A4 and the MOSFETs are held in the ON state even after a lapse of the time period t which is equal to one-half the period of resonance determined by Lr and Cr during voltage-lowering operation, reverse currents would occur, resulting in a reduction in the amount of transferred energy.

Thus, in this embodiment, the rectification gate signal generating portion 130A generates the gate signals Gate1L, Gate1H, Gate2L, Gate2H as the rectification gate signals in the same way as the gate signals Gate3L, Gate3H and the circuits A1, A2 are referred to also as the rectifier circuits.

Next, the working is described.

The capacitance values of the smoothing capacitors Cs1, Cs2, Cs3, Cs4 are set at sufficiently large values as compared to the capacitance values of the capacitors Cr12, Cr23, Cr34 of the LC series circuits.

As the voltage V2 input from across the voltage terminals VHh and VH1 is lowered to the voltage V1 which is approximately ¼ times the voltage V2 and the voltage V1 thus lowered is output from across the voltage terminals VL and Vcom, a load is connected between the voltage terminals VL and Vcom and, thus, the voltage V2 has a larger value than 4×V1.

The driving gate signals Gate4H, Gate4L are ON/OFF signals having a period T which is slightly longer than the period of resonance 2t determined by the LC series circuit of Lr and Cr and a duty cycle of about 50%.

The rectification gate signals Gate1H, Gate2H, Gate3H fed into the high-voltage side MOSFETs of the rectifier circuits A1, A2, A3 and the rectification gate signals Gate1L, Gate2L, Gate3L fed into the low-voltage side MOSFETs are ON/OFF signals containing pulses which are generated within the time period t from rise timings of the driving gate signals Gate4H, Gate4L, respectively. Here, rise timings of pulses of the rectification gate signals are set to coincide with rise timings of respective pulses of the driving gate signals, and fall timings of the pulses of the rectification gate signals are set to precede fall timings of the respective pulses of the driving gate signals by the specific time periods τH, τL, or pulsewidths of the rectification pulses are set to generally coincide with the time period t.

Operation performed when ON periods (pulsewidths) of the rectification pulses are generally equal to the time period t is described.

When Mos4H, Mos1H, Mos2H, Mos3H which are the high-voltage side MOSFETs of the individual circuits A4, A1-A3 are brought into the ON state by the gate signals fed into the high-voltage side MOSFETs, part of energy stored in the smoothing capacitor Cs4 is transferred to the capacitor Cr34 and energy charged into the capacitors Cr12, Cr23 is transferred to the smoothing capacitors Cs2, Cs3 through paths shown below, respectively, due to the presence of voltage differences.

Cs4⇒Mos4H⇒Lr34⇒Cr34⇒Mos3H
Cr23⇒Lr23⇒Mos3H⇒Cs3⇒Mos2H
Cr12⇒Lr12⇒Cr23⇒Lr23⇒Mos3H⇒Cs3⇒Cs2⇒Mos1H

Subsequently, when Mos4L, Mos1L, Mos2L, Mos3L which are the low-voltage side MOSFETs of the individual circuits A4, A1-A3 are brought into the ON state by the gate signals fed into the low-voltage side MOSFETs, the energy charged into the capacitor Cr34 is transferred to the smoothing capacitor Cs3 and part of energy charged into the smoothing capacitors Cs2, Cs3 is transferred to the capacitors Cr12, Cr23 through paths shown below, respectively, due to the presence of voltage differences.

Cr34⇒Lr34⇒Mos4L⇒Cs3⇒Mos3L
Cs2⇒Mos3L⇒Lr23⇒Cr23⇒Mos2L
Cs1⇒Cs2⇒Mos3L⇒Lr23⇒Cr23⇒Lr12⇒Cr12⇒Mos1L

The energy is transferred from the smoothing capacitors Cs1, Cs2, Cs4 to the smoothing capacitor Cs3 as a result of charging and discharging operation of the capacitors Cr12, Cr23, Cr34 as discussed above. The voltage V2 input from across the voltage terminals VHh and VH1 is lowered to the voltage V1 which is approximately ¼ times the voltage V2 and the voltage V1 thus lowered is output from across the voltage terminals VL and Vcom. Also, the inductors Lr12, Lr23, Lr34 are series-connected to the capacitors Cr12, Cr23, Cr34, respectively, to configure the LC series circuits. This configuration utilizes the resonance phenomenon for transferring the energy, making it possible to efficiently transfer a large amount of energy.

As the voltage terminals VL, Vcom serving as the output terminals are connected to both terminals of the smoothing capacitor Cs3 of the circuit A3 which is located at the middle position between the two other circuits as discussed above, it is possible to reduce the value of the current I12 flowing through the LC series circuit Lr12Cr12 as in the foregoing thirteenth embodiment. It is therefore possible to lower current ratings required for inductors Lr and capacitors Cr used for energy transfer and reduce the inductors Lr and capacitors Cr in size.

Furthermore, since the pulses of the rectification gate signals are generated within the time period t from the rise timings of the respective pulses of the driving gate signals, currents are interrupted after flowing during the time period t which is equal to one-half the period of resonance of the LC series circuits and, thus, the currents do not flow in the reverse direction in this embodiment either. Therefore, it is possible to effectively use the resonance phenomenon of the LC series circuits. Moreover, as the conduction loss can be reduced by use of the MOSFETs in the rectifier circuits A1-A3, it is possible to realize a DC/DC power converting apparatus having a high conversion efficiency. Also, since the pulsewidth of the rectification pulses is set to generally coincide with the time period t in this embodiment, it is possible to further decrease the conduction loss.

Furthermore, since the driving gate signals and the rectification gate signals are separately generated, it is possible to easily control the MOSFETs of the rectifier circuits A1-A3 separately from the MOSFETs of the driving inverter circuit A4 and realize the above-described desirable operation as well as a DC/DC power converting apparatus having a high conversion efficiency in a reliable fashion.

Additionally, the gate signals for the rectifier circuits A1-A3 may be generated by detecting the flowing currents in this fourteenth embodiment too as in the foregoing fifth, seventh and eighth embodiments.

Furthermore, although the input/output voltage terminals VL, Vcom are connected to both terminals of the smoothing capacitor Cs3 in the foregoing thirteenth and fourteenth embodiments, the voltage terminals VL, Vcom may be connected to both terminals of the smoothing capacitor Cs2. This alternative configuration also makes it possible to decrease the values of currents flowing through the LC series circuits, yet obtaining the same advantageous effects as discussed in the thirteenth and fourteenth embodiments. Moreover, even when the number of stages of rectifier circuits is increased, it possible to obtain the same advantageous effects if the voltage terminals VL, Vcom are connected to both terminals of the smoothing capacitor Cs of a circuit located at a middle position between two other circuits.

Fifteenth Embodiment

While the boost-type DC/DC power converting apparatus for raising V1 to V2 has been described in the foregoing thirteenth embodiment and the buck-type DC/DC power converting apparatus for lowering V2 to V1 has been described in the foregoing fourteenth embodiment, the following discussion of the present embodiment illustrates a buck-boost DC/DC power converting apparatus having the functions of both the aforementioned thirteenth and fourteenth embodiments to realize bi-directional energy transfer.

A principal portion of the circuit configuration of the DC/DC power converting apparatus according to the present embodiment is the same as that of the thirteenth and fourteenth embodiments shown in FIG. 24. In this embodiment, the circuit A3 is used as a driving inverter circuit and the circuits A1, A2, A4 are used as rectifier circuits in the voltage-boosting mode, while the circuit A4 is used as a driving inverter circuit and the circuits A1-A3 are used as rectifier circuits in the voltage-lowering mode.

In this embodiment, the buck-boost DC/DC power converting apparatus is realized by inputting voltages at the voltage terminals VL, Vcom, VHh, VH1 into a control circuit and switching the rectification gate signals and the driving gate signals by the control circuit based on the voltages at the voltage terminals as in the aforementioned third embodiment. Alternatively, the buck-boost DC/DC power converting apparatus may be realized by providing a circuit which generates rectification gate signals for voltage-boosting mode operation and a circuit which generates rectification gate signals for voltage-lowering mode operation by using detected currents, and switching the rectification gate signals and the driving gate signals by a gate signal switcher shown in the sixth embodiment.

Sixteenth Embodiment

Figure 26:
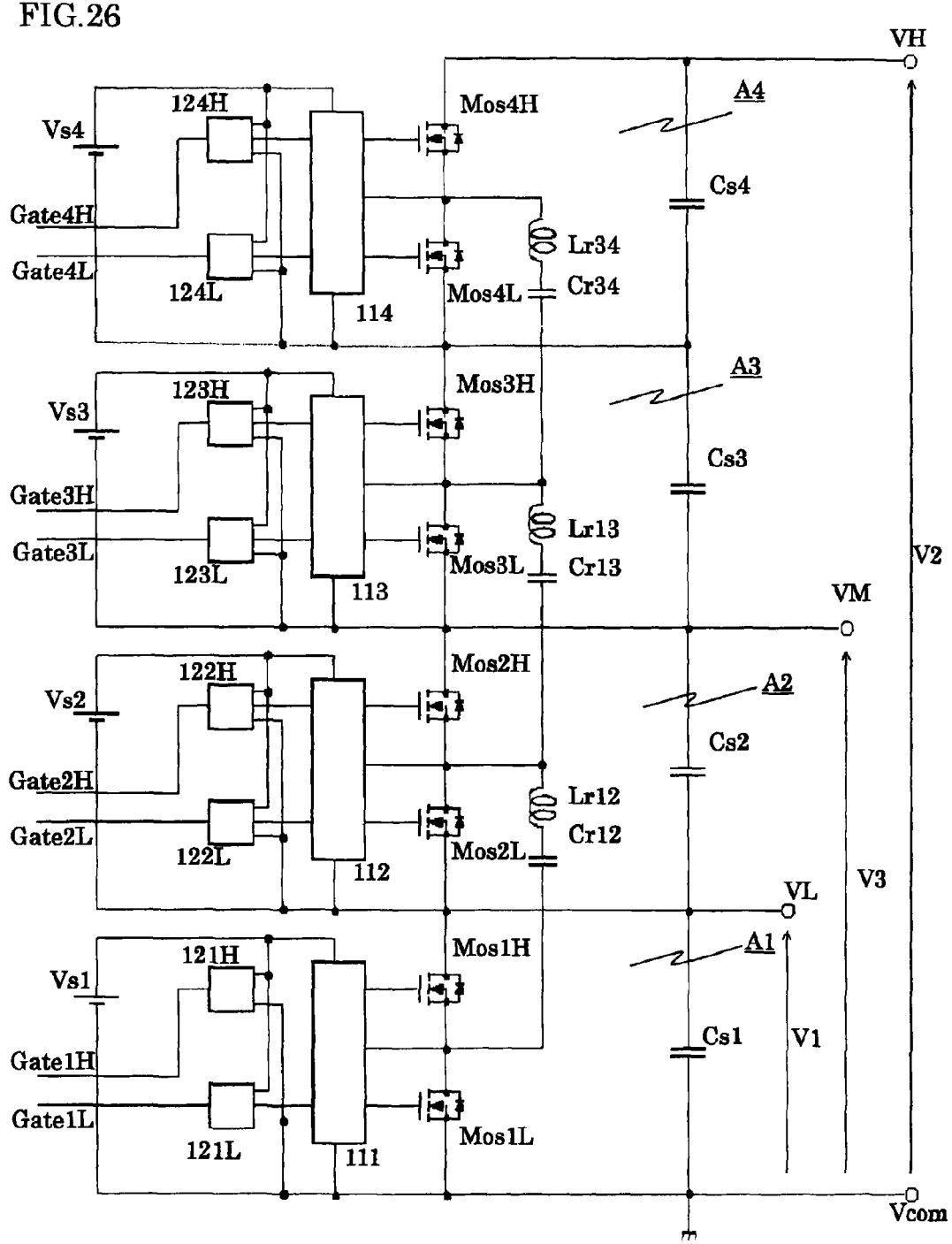
FIG. 26 is a diagram showing the circuit configuration of a principal portion of a DC/DC power converting apparatus according to a sixteenth embodiment of the present invention.

Next, a DC/DC power converting apparatus according to a sixteenth embodiment of the present invention is described. FIG. 26 shows the circuit configuration of a principal portion of the DC/DC power converting apparatus according to the sixteenth embodiment of the present invention.

Described in this sixteenth embodiment is the DC/DC power converting apparatus having a function to convert a voltage V1 input from across voltage terminals VL and Vcom to a voltage V2, which is approximately four times as high as the voltage V1, and output the voltage V2 thus raised from across voltage terminals VH and Vcom, and to convert the voltage V1 to a voltage V3, which is approximately twice as high as the voltage V1, and output the voltage V3 thus raised from across the voltage terminals VM and Vcom. In this embodiment, there are two pairs of input and output terminals. These are VL-Vcom and VH-Vcom, and VL-Vcom and VM-Vcom.

As shown in FIG. 26, the voltage terminal VM is connected to the high-voltage side terminal of the smoothing capacitor Cs2. The DC/DC power converting apparatus has otherwise the same circuit configuration as that of the first embodiment, including the gate signal generator.

While the present embodiment is intended to permit the same voltage-boosting operation as in the aforementioned first embodiment, the DC/DC power converting apparatus can output the voltage V3 in addition to the voltage V2 due to the provision of the voltage terminal VM.

There may be provided three pairs or more of input and output terminals. Provision of multiple pairs of input and output terminals will permit the DC/DC power converting apparatus to raise the input voltage to multilevel voltages, thus offering an improved degree of freedom in circuit design.

While the boost-type DC/DC power converting apparatus has been described in the present embodiment, the buck-type DC/DC power converting apparatus like the one shown in the second embodiment can also output the voltage V3 in addition to the voltage V1 if provided with an intermediate voltage terminal VM. The bi-directional DC/DC power converting apparatus like the one shown in the third embodiment can also output the voltage V3 in addition to the voltage V1 if provided with an intermediate voltage terminal VM.

Multiple pairs of input and output terminals may also be provided in the aforementioned fourth to fifteenth embodiments in the same way as described above, yet offering the same advantageous effects as in the individual embodiments.

While power MOSFETs in which a parasitic diode is formed between the source and the drain are used as semiconductor switching devices in each driving inverter circuit and rectifier circuit in the foregoing individual embodiments, other types of semiconductor switching devices, like IGBTs, which can be turned on and off through a control electrode may be used instead. The semiconductor switching devices to be used in this case are of a type in which diodes connected in reverse parallel perform the function of the parasitic diodes of the power MOSFETs, whereby the same advantageous effects are achieved through the same control operation as in the foregoing individual embodiments.

Additionally, it goes without saying that the present invention as discussed in the foregoing individual embodiments is also applicable to DC/DC power converting apparatuses having various voltage ratios configured with varying numbers of stages of rectifier circuits.

Seventeenth Embodiment

Described hereinbelow are the power supplies Vsk (Vs0-Vs4) provided for driving the MOSFETs, the gate driving circuits, the photocouplers, and so on, in the plurality of circuits (A1-A4, B0-B4) which constitute the DC/DC power converting apparatuses of the foregoing individual embodiments.

Figure 27:
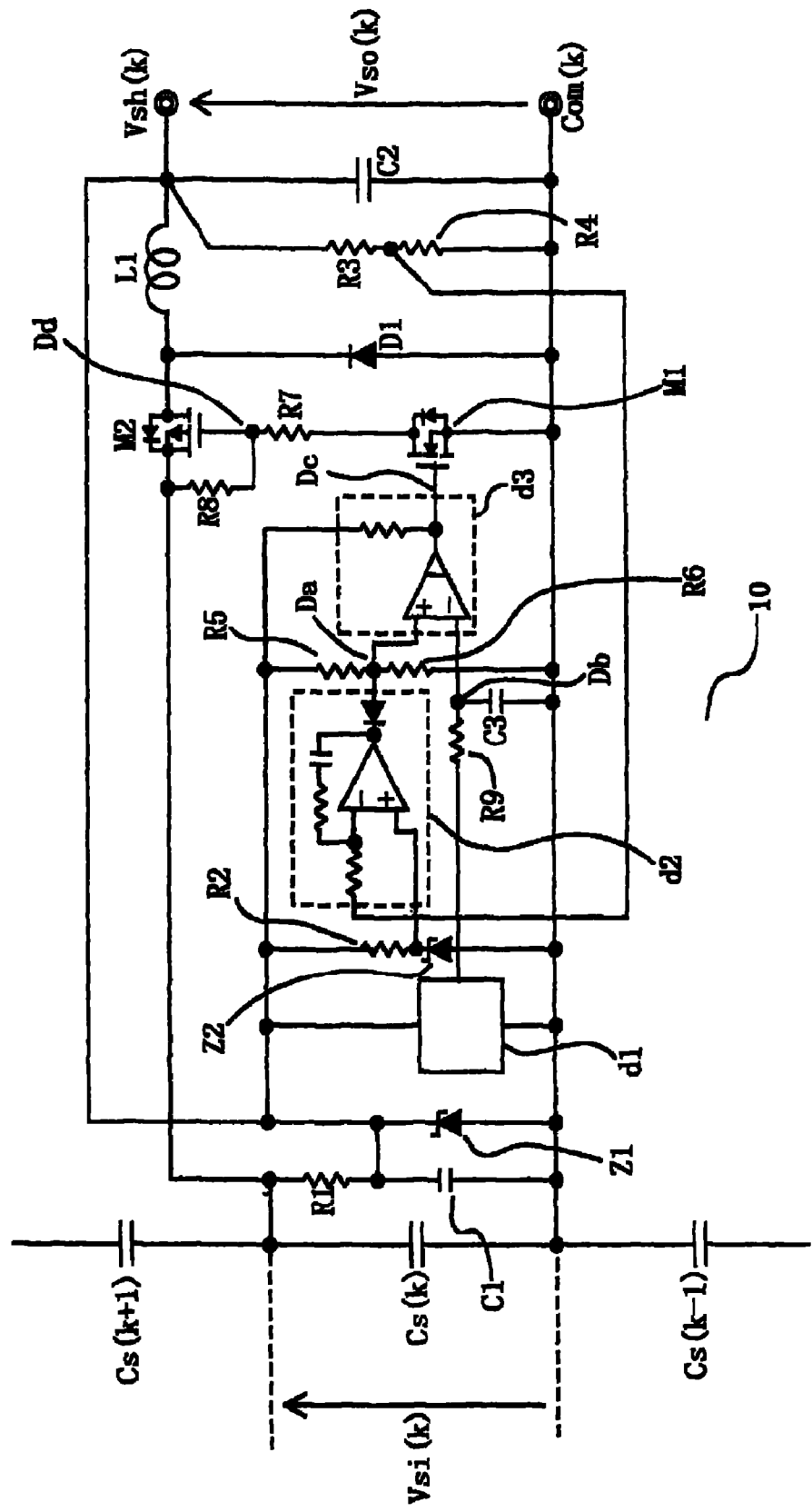
FIG. 27 is a diagram showing the configuration of a power supply Vsk of each circuit according to a seventeenth embodiment of the present invention.

FIG. 27 is a diagram showing the configuration of the power supply Vsk. Using a voltage produced across the smoothing capacitor Cs(k) (Cs0-Cs4) in each of the circuits (A1-A4, B0-B4) as an input voltage Vsi(k), the power supply Vsk of each circuit produces an output voltage Vso(k) between output terminals Vsh(k) and Com(k).

Designated by Com(k) is a reference voltage of the voltages Vso(k) and Vsi(k). A high-voltage side terminal of the smoothing capacitor Cs(k) is connected to a source terminal of a p-type MOSFET M2, and a drain terminal of the MOSFET M2 is connected to a cathode terminal of a diode D1 and one terminal of a choke coil L1. An anode terminal of the diode D1 is connected to the reference voltage Com(k), the other terminal of the choke coil L1 is connected to one terminal of a capacitor C2, and the other terminal of the capacitor C2 is connected to the reference voltage Com(k). The capacitor Cs(k), the capacitor C2, the MOSFET M2, the diode D1 and the choke coil L1 together constitute a non-insulated buck-type DC/DC converter 10, through which the input voltage Vsi(k) is converted to the output voltage Vso(k).

A capacitor C1, the capacitor C2 and a Zener diode Z1 are connected parallel with one another, with an anode terminal side of the Zener diode Z1 connected to the reference voltage Com(k), and a cathode terminal side of the Zener diode Z1 connected to the terminal of the choke coil L1. The output voltage Vso(k) is produced by this parallel-connected unit of C1, C2, Z1. The voltage Vso(k) is supplied to a clock generator circuit d1, an error amplifier circuit d2 and a comparator circuit d3 to operate the individual circuits d1-d3. The Figure does not show how the voltage Vso(k) is supplied to the error amplifier circuit d2 and the comparator circuit d3.

An output of the clock generator circuit d1 is input into one of inputs of the comparator circuit d3 through a sawtooth wave generator configured with a resistor R9 and a capacitor C3. A target voltage produced by a combination of a resistor R2 and a Zener diode Z2 is input into one of inputs of the error amplifier circuit d2, and a measured voltage of Vso(k) is divided by resistors R3 and R4 and the divided voltage is input into the other of the inputs of the error amplifier circuit d2. Also, an output of the error amplifier circuit d2 is input into the other of the inputs of the comparator circuit d3 and a connecting point therebetween is connected to a connecting point of resistors R5 and R6. The other terminal of the resistor R5 is connected to the output terminal Vsh(k) at the voltage of Vso(k) and the other terminal of the resistor R6 is connected to the reference voltage Com(k).

An output terminal of the comparator circuit d3 is connected to a gate terminal of an n-type MOSFET M1, and a source terminal and a drain terminal of the MOSFET M1 are connected to the reference voltage Com(k) and one terminal of a resistor R7, respectively. The other terminal of the resistor R7 is connected to a gate terminal of the MOSFET M2 and one terminal of a resistor R8. Also, the other terminal of the resistor R8 is connected to the source terminal of the MOSFET M2.

The working of the power supply Vsk thus configured is now described. In the case of voltage-lowering operation as shown in the aforementioned second embodiment, an energy source is connected between VH and Vcom, so that a voltage appears across the smoothing capacitor Cs(k), thus causing the power supply Vsk to operate.

In the case of voltage-boosting operation as shown in the aforementioned first embodiment, on the other hand, the energy source is connected between VL and Vcom, so that the apparatus is under conditions where a voltage appears across the smoothing capacitor Cs1 but no voltage appears across the other smoothing capacitors Cs(k) at the beginning of operation. The voltage across the smoothing capacitor Cs1, however, causes the power supply Vs1 to operate and, thus, the MOSFETs of the circuit A1 to turn on and off, so that the parasitic diodes in the MOSFETs of the circuits A2-A4 operate and energy is transferred to the smoothing capacitors Cs2, Cs3, Cs4. Although power conversion efficiency achieved by this operation using the parasitic diodes is not good enough, the time required for energy transfer to the individual smoothing capacitors Cs(k) is no more than 1 second. The voltage appears across the individual smoothing capacitors Cs(k) in this way and the individual power supplies Vsk operate.

The working is described in detail below. When the voltage is produced across the smoothing capacitor Cs(k), the capacitors C1, C2 are charged through a resistor R1. The voltage translates into a Zener voltage of the Zener diode Z1 which is 16V in this embodiment. As this voltage is supplied, the parallel-connected unit of C1, C2, Z1 produces the output voltage Vso(k), which is supplied to the clock generator circuit d1, the error amplifier circuit d2 and the comparator circuit d3. As a consequence, the individual circuits d1-d3 operate, thus causing the power supply Vsk to operate.

Since the resistor R1 has a relatively large resistance value to suppress power loss, energy supplied through the resistor R1 before operation of the power supply Vsk is not sufficient to cause the MOSFETs in the individual circuits to operate. When the power supply Vsk begins to operate, the non-insulated DC/DC converter 10 operates to convert the voltage Vsi(k) to the voltage Vso(k) and the amount of energy thereby supplied is sufficient for operating the MOSFETs in the individual circuits.

Figure 28:
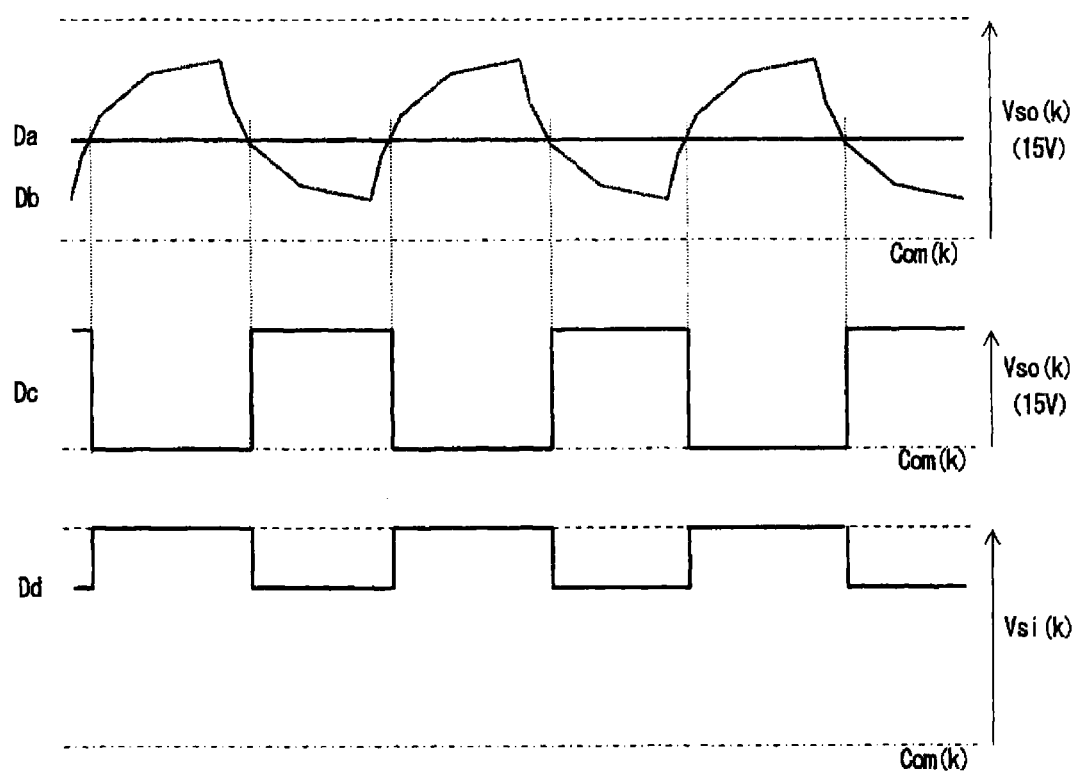
FIG. 28 is a diagram showing voltage waveforms at individual points of the power supply Vsk according to the seventeenth embodiment of the present invention.

FIG. 28 shows a voltage Da at an input terminal of the comparator circuit d3 on a side of the error amplifier circuit d2, a voltage Db at an input terminal of the comparator circuit d3 on a side of the clock generator circuit d1, a voltage Dc at the output terminal of the comparator circuit d3, and a gate voltage Dd of the MOSFET M2. The error amplifier circuit d2 outputs the voltage Da so that the voltage between the two input terminals becomes zero. Specifically, the error amplifier circuit d2 determines the voltage Da in such a manner that the output voltage Vso(k) (15V) matches the target voltage (15V) determined by the Zener diode Z2. The voltage Db is a sawtooth-shaped voltage which is formed by passing a rectangular-shaped voltage fed from the clock generator circuit d1 through a CR circuit. The rectangular-shaped voltage Dc is formed by the comparator circuit d3 based on a comparison between the voltages Da and Db. When the output voltage Vso(k) is decreased, for example, the voltage Da becomes lower and, as a result, a high-voltage period of the rectangular-shaped voltage Dc becomes shorter. The MOSFET M1 turns on and off due to the rectangular-shaped voltage Dc, and the voltage at the gate terminal of the MOSFET M2 varies between low and high levels with reference to the voltage at the source terminal of the MOSFET M1. Since the MOSFET M2 is a p-type MOSFET, the MOSFET M2 is in the ON state when the gate voltage is low and the MOSFET M2 is in the OFF state when the gate voltage is high. The voltage between the gate and source terminals of the MOSFET M2 is kept within a maximum rating due to voltage division by the resistors R7 and R8. As the MOSFET M2 performs ON/OFF operation with an ON period thereof controlled as discussed above, energy is transferred from the smoothing capacitor Cs(k) and the voltage Vso(k) between the output terminals Com(k) and Vsh(k) is controlled to match the specific voltage (15V).

In this embodiment, the power supplies Vsk for driving the individual circuits constituting the DC/DC power converting apparatus are configured to supply electric power from each of the smoothing capacitors Cs(k) in the individual circuits through the non-insulated type DC/DC converter 10. For this reason, there is no need for wires, connectors or the like for wiring between an input voltage portion and each power supply Vsk and it is not necessary to insulate wirings between the individual power supplies Vsk with a transformer, so that a compact power supply configuration featuring a high conversion efficiency will be obtained. This makes it possible to achieve an increase in efficiency and a reduction in size of the DC/DC power converting apparatus.

While the DC/DC converter 10 having a voltage-lowering circuit configuration has been described in the aforementioned embodiment on the assumption that the input voltage Vsi(k) is 20V or higher, a voltage-boosting DC/DC converter 10 is used if the input voltage Vsi(k) as low as 10V or lower, for example.

Furthermore, while the reference voltage of the power supplies Vsk for driving the individual circuits of the DC/DC power converting apparatus is Com(k) and control portions like the gate driving circuits in the individual circuits are configured to operate with the reference voltage Com(k) in the aforementioned embodiment, the embodiment may be modified such that the control portions like the gate driving circuits in the individual circuits are configured to operate with reference to the voltage at the voltage terminal Vcom and the MOSFET M2 is driven with reference to the voltage Vcom with the reference voltage of the power supplies Vsk set at Vcom. Although this approach makes wire routings more or less complex, a power supply configuration having a high conversion efficiency will be obtained.

INDUSTRIAL APPLICABILITY

The present invention is widely applicable to DC/DC power converting apparatuses configured to utilize charging and discharging operation of capacitors for energy transfer with smoothing capacitors arranged in parallel in each of multiple circuits including a driving inverter circuit and rectifier circuits.

The invention claimed is:

1. A DC/DC power converting apparatus comprising:
a plurality of circuits, each including series-connected high-voltage side and low-voltage side switches including semiconductor switching devices whose ON/OFF operation is controlled by control electrodes and a smoothing capacitor including positive and negative terminals between which said high-voltage and said low-voltage side switches are connected, are connected in series, and using a connection point of said high-voltage side and low-voltage side switches in each of said circuits as an intermediate terminal, each including a capacitor and an inductor, connected between the intermediate terminal of adjacent two of said circuits,
wherein at least a particular one of said plurality of circuits is used as a driving inverter circuit and any other one the other of said plurality of circuits is used as a rectifier circuit, and DC/DC conversion is performed through charging and discharging operation of the capacitor of each of the elementary series circuits.

2. The DC/DC power converting apparatus as recited in claim 1, wherein said individual circuits are provided with power supplies for operating said circuits, wherein each of said power supplies electric power from the smoothing capacitor in each of said circuits through a DC/DC converter.

3. The DC/DC power converting apparatus as recited in claim 1 further comprising a transformer, wherein said plurality of circuits include a first circuit connected to a primary winding of said transformer and a second circuit connected to a secondary winding of said transformer, and each of said elementary series circuits is connected to said primary winding or said secondary winding in series.

4. The DC/DC power converting apparatus as recited in claim 1, wherein input/output voltage terminals are connected to positive and negative terminals of the smoothing capacitor of a particular one of said plurality of circuits, and said particular circuit is located at a middle position between two other ones of said plurality of circuits with both ends of said particular circuit connected to said two other circuits.

5. The DC/DC power converting apparatus as recited in claim 1, wherein each of said semiconductor switching devices is a power MOSFET having a parasitic diode located between a source and a drain, or a semiconductor switching device including diodes connected in reverse parallel.

6. The DC/DC power converting apparatus as recited in claim 5, further comprising driving gate signal generating means for generating a driving gate signal for controlling the ON/OFF operation of said semiconductor switching devices in said driving inverter circuit, and rectification gate signal generating means for generating a rectification gate signal for controlling the ON/OFF operation of said semiconductor switching devices in said rectifier circuit separately from the driving gate signal.

7. The DC/DC power converting apparatus as recited in claim 6, said elementary series circuits have the same period of resonance which is determined by capacitance and inductance of each elementary series circuit, and the rectification gate signal is made up of pulses which are generated within a period equal to one-half the period of resonance from rise timings of individual pulses of the driving gate signal.

8. The DC/DC power converting apparatus as recited in claim 7, wherein rise timings of the individual pulses of the rectification gate signal coincide with the rise timings of the pulses of the driving gate signal, and fall timings of the pulses of the rectification gate signal precede fall timings of the pulses of the driving gate signal by a specific period of time.

9. The DC/DC power converting apparatus as recited in claim 7, wherein the individual pulses of the rectification gate signal has a pulsewidth which generally coincides with one-half the period of resonance.

10. The DC/DC power converting apparatus as recited in claim 7, further comprising current sensing means for detecting an output current from said intermediate terminal of any of said rectifier circuits or a current flowing through any of said elementary series circuits, wherein said rectification gate signal generating means generates the rectification gate signal according to the current detected by said current sensing means.

11. The DC/DC power converting apparatus as recited in claim 10, wherein said current sensing means detects a voltage across both terminals of said capacitor or the inductor of each of said elementary series circuits and detects a current flowing through each of said elementary series circuits from the detected voltage.

12. The DC/DC power converting apparatus as recited in claim 1, comprising multiple pairs of input/output terminals of said DC/DC power converting apparatus that are connected to terminals of pertinent ones of said smoothing capacitors.

* * * * *